(12) United States Patent  
Chen

(10) Patent No.: US 10,737,803 B2
(45) Date of Patent: Aug. 11, 2020

(54) STABILIZING PLATFORM

(71) Applicant: SZ DJI OSMO TECHNOLOGY CO., LTD., Shenzhen (CN)

(72) Inventor: Zihan Chen, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 63 days.

(21) Appl. No.: 15/916,618

(22) Filed: Mar. 9, 2018

(65) Prior Publication Data

US 2018/0194490 A1 Jul. 12, 2018

Related U.S. Application Data

(63) Continuation of application No. PCT/CN2015/089462, filed on Sep. 11, 2015.

(51) Int. Cl.
*F16M 13/02* (2006.01)
*F16M 11/18* (2006.01)
(Continued)

(52) U.S. Cl.
CPC ........... *B64D 47/08* (2013.01); *B64C 39/024* (2013.01); *F16M 11/06* (2013.01);
(Continued)

(58) Field of Classification Search
CPC .... B62K 11/007; B62K 1/00; B62K 2207/04; B62K 15/00; B62K 21/12; B62K 2207/02;
(Continued)

(56) References Cited

U.S. PATENT DOCUMENTS 6,263,160 B1   7/2001  Lewis
2012/0263445 A1  10/2012  Beasley
(Continued)

FOREIGN PATENT DOCUMENTS

CN   101734377 A   6/2010
CN   102627145 A   8/2012
(Continued)

OTHER PUBLICATIONS

The World Intellectual Property Organization (WIPO) International Search Report and Written Opinion for PCT/CN2015/089462 dated Jun. 6, 2016 11 Pages.
(Continued)

*Primary Examiner* — Dave Czekaj
*Assistant Examiner* — Samuel D Fereja
(74) *Attorney, Agent, or Firm* — Anova Law Group, PLLC

(57) ABSTRACT

A carrier for controlling torque delivery to a payload includes a carrier component configured to rotate about a carrier axis, a payload support structure coupled to the carrier component and configured to support the payload, and a rotational device coupled to the payload support structure. The rotational device includes a non-rotating portion directly coupled to the payload support structure and a rotating portion configured to rotate freely to provide a supplemental torque to the payload support structure to compensate for a torque transmission delay from the carrier component to the payload support structure when the carrier component rotates about the carrier axis.

9 Claims, 21 Drawing Sheets

(51) Int. Cl.
  *H04N 5/232* (2006.01)
  *B64D 47/08* (2006.01)
  *B64C 39/02* (2006.01)
  *G03B 17/56* (2006.01)
  *F16M 11/20* (2006.01)
  *F16M 11/12* (2006.01)
  *F16M 11/06* (2006.01)

(52) U.S. Cl.
  CPC ........... *F16M 11/123* (2013.01); *F16M 11/18* (2013.01); *F16M 11/205* (2013.01); *F16M 13/02* (2013.01); *G03B 17/563* (2013.01); *H04N 5/2328* (2013.01); *H04N 5/23258* (2013.01); *B64C 2201/027* (2013.01); *B64C 2201/127* (2013.01); *B64C 2201/146* (2013.01); *F16M 2200/041* (2013.01); *F16M 2200/044* (2013.01); *F16M 2200/06* (2013.01)

(58) Field of Classification Search
  CPC ............ F16M 11/18; F16M 2200/044; F16M 11/105; F16M 13/02; F16M 2200/041; F16M 11/10; F16M 11/2604; F16M 13/04; F16M 11/041; F16M 11/2071; F16M 11/123; F16M 13/00; F16M 2200/042; F16M 11/2014; F16M 11/24; F16M 11/046; F16M 11/048; F16M 11/08; F16M 11/2021; F16M 11/205; F16M 11/42; F16M 13/022; F16M 2200/04; F16M 2200/063; F16M 11/04; F16M 11/043; F16M 11/06; F16M 11/12; F16M 11/2028; F16M 11/2085; F16M 11/2092; F16M 11/28; F16M 11/425; F16M 13/005; F16M 13/027; F16M 2200/028; F16M 2200/045; F16M 2200/047; F16M 2200/048; F16M 2200/06; B64C 39/024; B64C 2201/127; B64C 2201/027; B64C 2201/146; B64C 2201/128; B64C 2201/024; B64C 2201/042; B64C 2201/108; B64C 19/00; B64C 2201/021; B64C 2201/104; B64C 2201/123; B64C 2201/126; B64C 2201/141; B64C 27/08; B64C 27/12; B64C 39/064; G03B 17/561; G03B 15/006; G03B 17/563; G03B 2205/0007; G03B 37/02; B64D 47/08; B64D 11/06; B64D 11/0619; B64D 1/12; B64D 1/22; B64D 35/06; B64D 3/00; B64D 43/00; B64D 9/00; H04N 5/2328; H04N 5/23258; H04N 5/2253; H04N 5/232; H04N 5/23267; H04N 7/183; H04N 5/00; H04N 5/222; H04N 5/2251

See application file for complete search history.

(56) References Cited

U.S. PATENT DOCUMENTS

| | | | |
|---|---|---|---|
| 2014/0037278 A1* | 2/2014 | Wang | F16M 11/10 396/55 |
| 2014/0267805 A1* | 9/2014 | Webb | H04N 5/2328 348/208.2 |
| 2016/0229556 A1 | 8/2016 | Zhou et al. | |
| 2016/0327847 A1* | 11/2016 | Yang | B64D 47/08 |

FOREIGN PATENT DOCUMENTS

| | | |
|---|---|---|
| CN | 103939718 A | 7/2014 |
| CN | 203686509 U | 7/2014 |
| CN | 104508346 A | 4/2015 |
| CN | 104615152 A | 5/2015 |
| JP | 2001041395 A | 2/2001 |
| JP | 2001235793 A | 8/2001 |
| WO | 2008128491 A1 | 10/2008 |
| WO | 2010138033 A1 | 12/2010 |

OTHER PUBLICATIONS

The World Intellectual Property Organization (WIPO) International Search Report for PCT/CN2016/076585 dated Jun. 15, 2016 6 Pages.

* cited by examiner

STABILIZING PLATFORM

CROSS-REFERENCE TO RELATED APPLICATION

This application is a continuation application of International Application No. PCT/CN2015/089462, filed on Sep. 11, 2015, the entire contents of which are incorporated herein by reference.

BACKGROUND

In the fields of videography, photography and/or surveillance, a carrier is typically used for carrying a payload device such as an imaging device (e.g., video camera, camera) or the like. The carrier may be mounted onto a movable object (e.g., an aircraft, vehicle, ship, robot or a human). When the movable object is in motion, the carrier may be subject to movement such as high-frequency vibration and/or low-frequency shake, causing similar movement of the payload device and affecting operation of the payload device. When the payload device is an imaging device, sudden or abrupt movements of the carrier may translate to poor-quality images acquired by the imaging device.

SUMMARY

In some instances, the carrier may comprise a stabilizing platform for providing stability to the payload device. The stabilizing platform may form part of the carrier. The carrier may include one or more joints or structures for carrying the payload device. For example, the stabilizing platform may comprise a payload support structure for carrying the payload device, and one or more carrier components for connecting the payload support structure to a movable object. Such stabilizing platforms may provide stability to the payload device by detecting posture changes in the payload device and reverse compensating the detected posture changes. For example, when an attitude of the movable object changes, the motion of the one or more carrier components in the stabilizing platform can be coordinated using motors to ensure that an attitude of the payload support structure does not change with the attitude of the movable object.

However, existing stabilizing platforms may have large inertia and/or low structural rigidity, particularly when there are a large number of carrier components and/or motors, and when the carrier components have large moments of inertia. This can lead to torque transmission delays during the actuation of the carrier components, which may reduce a response speed of the stabilizing platform. As such, existing stabilizing platforms with serially connected carrier components may be inadequate for providing quick and dynamic adjustment of payload device postures, for example, to counteract the various posture changes of the movable object. In particular, when the payload device is an imaging device, it may be difficult to provide high-quality images because of the delayed response time of the stabilizing platform.

Accordingly, there exists a considerable need for apparatus and method(s) that can mitigate torque transmission delays in a stabilizing platform of a carrier, and that can provide stability and rapid response to posture adjustments. The present disclosure addresses this need and provides related advantages as well.

Methods and apparatus for providing stability to a payload device are provided herein. For instance, in some aspects of the disclosure, a carrier for controlling torque delivery to a payload may be provided. The carrier may comprise: at least one carrier component configured for rotation about a carrier axis; a payload support structure coupled to the carrier component, wherein the payload support structure is configured to support the payload; and at least one rotational device coupled to the payload support structure, wherein the rotational device comprises a non-rotating portion directly coupled to the payload support structure and a rotating portion configured to rotate freely to provide a supplemental torque to the payload support structure, and wherein the supplemental torque is provided to compensate for a torque transmission delay from the carrier component to the payload support structure when the carrier component rotates about the carrier axis.

A system for controlling torque delivery to a payload may be provided in accordance with an additional aspect of the disclosure. The system may comprise: an unmanned aerial vehicle; and a carrier that is mounted on the unmanned aerial vehicle. The carrier may be configured to control torque delivery to a payload. The carrier may comprise: at least one carrier component configured for rotation about a carrier axis; a payload support structure coupled to the carrier component, wherein the payload support structure is configured to support the payload; and at least one rotational device coupled to the payload support structure, wherein the rotational device comprises a non-rotating portion directly coupled to the payload support structure and a rotating portion configured to rotate freely to provide a supplemental torque to the payload support structure, and wherein the supplemental torque is provided to compensate for a torque transmission delay from the carrier component to the payload support structure when the carrier component rotates about the carrier axis.

According to an aspect of the disclosure, a method for controlling torque delivery to a payload may be provided. The method may comprise: rotating at least one carrier component about a carrier axis, wherein the carrier component is coupled to a payload support structure that is configured to support the payload; and applying a supplemental torque to the payload support structure using at least one rotational device coupled to the payload support structure, wherein the rotational device comprises a non-rotating portion directly coupled to the payload support structure and a rotating portion configured to rotate freely to provide the supplemental torque, and wherein the supplemental torque is provided to compensate for a torque transmission delay from the carrier component to the payload support structure when the carrier component rotates about the carrier axis.

According to another aspect of the disclosure, a method for controlling torque delivery to a payload may be provided. The method may comprise: applying a predetermined torque to the payload support structure via at least one actuator and at least one carrier component, wherein the payload support structure is coupled to the actuator and the carrier component, and wherein the payload support structure is configured to support the payload; and applying a supplemental torque to the payload support structure via at least one rotational device disposed on the payload support structure, wherein the rotational device comprises a non-rotating portion directly coupled to the payload support structure and a rotating portion configured to rotate freely to provide the supplemental torque to the payload support structure, and wherein the supplemental torque is configured to compensate for a torque transmission delay of the predetermined torque from the actuator and the carrier component to the payload support structure.

An apparatus for controlling torque delivery to a payload may be provided in accordance with an additional aspect of the disclosure. The apparatus may comprise one or more processors that are, individually or collectively, configured to: apply a first signal to generate a predetermined torque to the payload support structure via at least one actuator and at least one carrier component, wherein the payload support structure is coupled to the actuator and the carrier component, and wherein the payload support structure is configured to support the payload; and apply a second signal to generate a supplemental torque to the payload support structure via at least one rotational device disposed on the payload support structure, wherein the rotational device comprises a non-rotating portion directly coupled to the payload support structure and a rotating portion configured to rotate freely to provide the supplemental torque to the payload support structure, and wherein the supplemental torque is configured to compensate for a torque transmission delay of the predetermined torque from the actuator and the carrier component to the payload support structure.

Further aspects of the disclosure may be directed to a non-transitory computer-readable medium storing instructions that, when executed, causes a computer to perform a method for controlling torque delivery to a payload. The method may comprise: applying a first signal to generate a predetermined torque to the payload support structure via at least one actuator and at least one carrier component, wherein the payload support structure is coupled to the actuator and the carrier component, and wherein the payload support structure is configured to support the payload; and applying a second signal to generate a supplemental torque to the payload support structure via at least one rotational device disposed on the payload support structure, wherein the rotational device comprises a non-rotating portion directly coupled to the payload support structure and a rotating portion configured to rotate freely to provide the supplemental torque to the payload support structure, and wherein the supplemental torque is configured to compensate for a torque transmission delay of the predetermined torque from the actuator and the carrier component to the payload support structure.

According to another aspect of the disclosure, a carrier for controlling torque delivery to a payload may be provided. The carrier may comprise: at least one carrier component configured for rotation about a carrier axis; the payload coupled to the carrier component, wherein the carrier component is configured to support the payload; and at least one rotational device coupled to the payload, wherein the rotational device comprises a non-rotating portion directly coupled to the payload and a rotating portion configured to rotate freely to provide a supplemental torque to the payload, and wherein the supplemental torque is provided to compensate for a torque transmission delay from the carrier component to the payload when the carrier component rotates about the carrier axis.

A system for controlling torque delivery to a payload may be provided in accordance with a further aspect of the disclosure. The system may comprise: an unmanned aerial vehicle; and a carrier that is mounted on the unmanned aerial vehicle. The carrier may be configured to control torque delivery to a payload. The carrier may comprise: at least one carrier component configured for rotation about a carrier axis; the payload coupled to the carrier component, wherein the carrier component is configured to support the payload; and at least one rotational device coupled to the payload, wherein the rotational device comprises a non-rotating portion directly coupled to the payload and a rotating portion configured to rotate freely to provide a supplemental torque to the payload, and wherein the supplemental torque is provided to compensate for a torque transmission delay from the carrier component to the payload when the carrier component rotates about the carrier axis.

According to another aspect of the disclosure, a method for controlling torque delivery to a payload may be provided. The method may comprise: rotating at least one carrier component about a carrier axis, wherein the carrier component is coupled to the payload and configured to support the payload; and applying a supplemental torque to the payload using at least one rotational device coupled to the payload, wherein the rotational device comprises a non-rotating portion directly coupled to the payload and a rotating portion configured to rotate freely to provide the supplemental torque, and wherein the supplemental torque is provided to compensate for a torque transmission delay from the carrier component to the payload when the carrier component rotates about the carrier axis.

According to a further aspect of the disclosure, a method for image acquisition is provided. The method can comprise remotely operating the unmanned aerial vehicle (UAV) to approach an object, the UAV being coupled to the apparatus discussed herein; and controlling the apparatus to stabilize a device held by the frame assembly of the apparatus so as to improve quality of images captured by the device.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Figure 1:
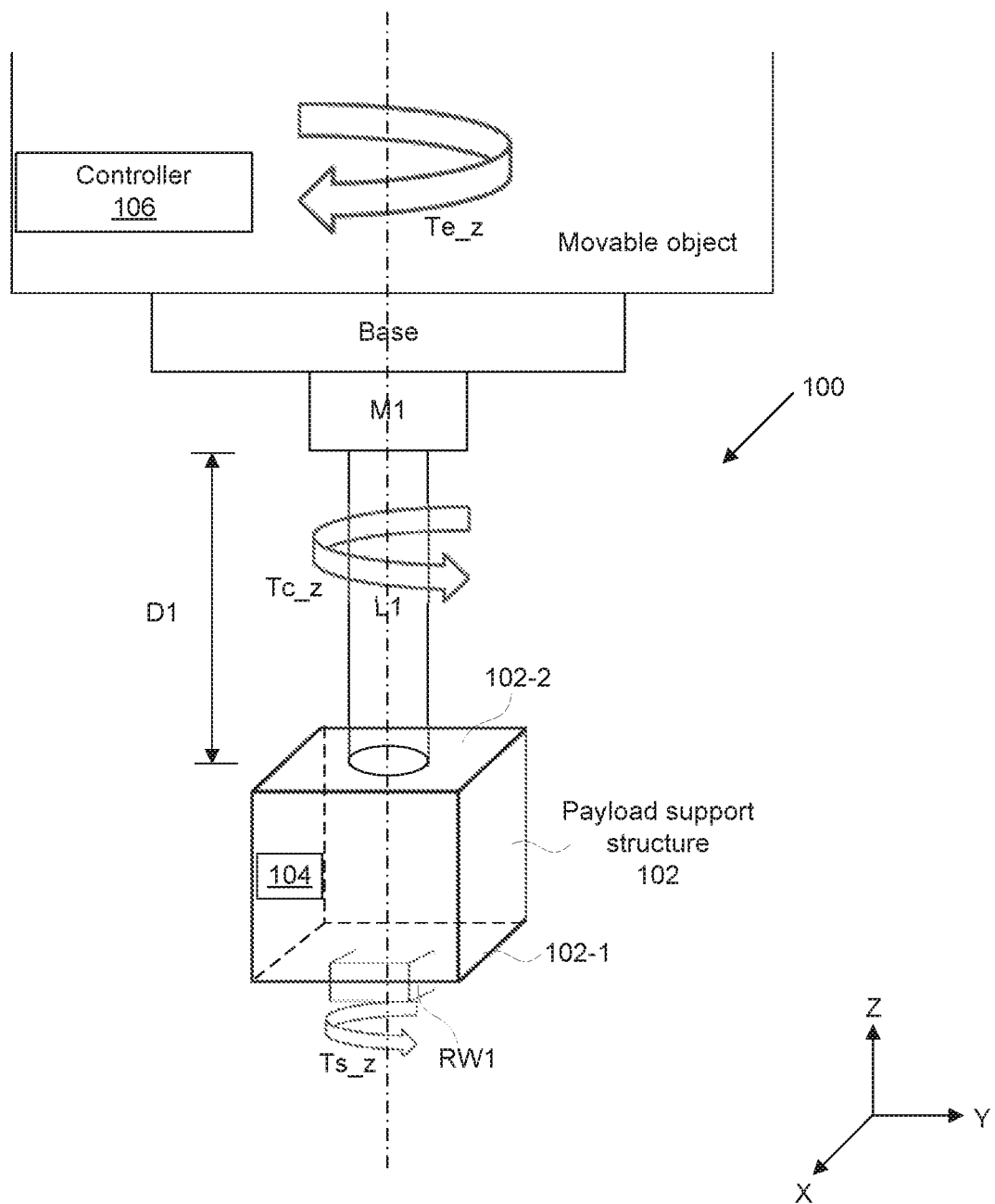
FIG. 1 illustrates a schematic view of a stabilizing platform in accordance with an embodiment.

Methods and apparatus for stabilizing a payload device are provided. In some embodiments, the payload devices may include imaging devices (including but not limited to video camera or camera) and non-imaging devices (including but not limited to microphone, sample collector). A stabilizing platform, such as a camera mount or a gimbal mount, may be provided for supporting and stabilizing one or more payload devices. The stabilizing platform may comprise a frame assembly configured to hold the payload device, a motor assembly, and a controller assembly.

The frame assembly may comprise a payload support structure for carrying one or more payload devices, and one or more carrier components for connecting the payload support structure to a movable object. In some instances, the frame assembly may be connected to a base of a movable object. The movable object may be a vehicle (e.g., an aircraft, vehicle, ship, robot or a human). The base may be rigidly affixed to the movable object. In some cases, the base may form part of a housing of the movable object. In some embodiments, N number of carrier components may be connected serially between the base and the payload support structure, such that the payload support structure is configurable to move in N degrees of freedom relative to the base, where N is an integer greater than or equal to one. When an attitude of the movable object changes, the motion of one or more of the carrier components may be coordinated using one or more motors (e.g., direct drive motors) to ensure that an attitude of the payload support structure remains in a relatively stable configuration (for optimal operation of the payload device), regardless of changing attitudes of the movable object. Such stabilization platforms may provide stability to the payload device by detecting posture changes in the payload device and reverse compensating the detected posture changes.

The controller assembly may include a sensing system configured to detect or obtain state information associated with the payload device. The state information may include velocity, orientation, attitude, gravitational forces, acceleration, position, and/or any other physical state experienced by the payload device. For example, the state information may include an angular and/or linear position, velocity and/or acceleration, (which may include an orientation or inclination of the payload device). In some embodiments, the sensing system may include an inertial measurement member comprising one or more gyroscopes, velocity sensors, accelerometers, magnetometers, and the like. In other embodiments, other types of state-detecting sensors may be used instead of or in addition to the inertial measurement member.

The controller assembly may also include a controller for calculating posture information associated with the payload device based on the state information obtained by the sensing system. For example, detected angular velocity and/or linear acceleration of the payload device may be used to calculate the attitude of the payload device with respect a pitch, roll and/or yaw axis of the payload device.

Based on the calculated posture of the payload device, one or more motor signals may be generated to control the motor assembly. The motor assembly may be configured to directly drive the frame assembly to rotate around at least one or a pitch, roll or yaw axis of the payload device so as to adjust the posture of the payload device (e.g., the shooting angle of an imaging device). The motor assembly can comprise one or more motors that are respectively coupled to one or more rotational axis (e.g., pitch, roll or yaw) of the payload device. In some embodiments, one or more of the rotational axes (e.g., pitch, roll and yaw) may intersect with the payload device.

In some embodiments, the rotation order of the payload device is selected to allow the payload device to be rotated without the problem of "gimbal lock" under ordinary operational circumstances for the payload device, such as when pointing straight down. For example, in one embodiment, the rotation order may be pitch, roll and yaw from the innermost to outermost rotational axis. In another embodiment, the rotation order may be pitch, roll and yaw from the outermost to the innermost rotational axis. Any rotation order (e.g., pitch/yaw/roll, roll/pitch/yaw, roll/yaw/pitch, yaw/roll/pitch, or yaw/pitch/roll from outermost to the innermost rotational axis, or from innermost to outermost rotational axis) of the payload device may be contemplated.

In the present disclosure, the motor assembly is configured to directly drive the frame assembly, causing the payload support structure supporting the payload device to rotate around one or more rotational axes. The use of direct-drive motors offers reduced energy consumption while allowing stepless control of the motor speed. Furthermore, using direct-drive motors, the response time can be reduced between the posture change of the movable object and the corresponding compensating change to the stabilizing platform due to faster response time of the electric motors. Thus, the pointing direction of the payload device may be quickly adjusted (e.g., to point at a moving target). In some cases, a predetermined position or posture of the payload device may be maintained. Further, the payload device may be stabilized against unwanted movement such as vibrations or shakes caused by the movable object or other external factors. In cases where the payload device is an imaging device, the quality of images acquired by the payload device can be improved.

As previously described, serial connection of the carrier components in existing stabilizing platforms may have some disadvantages, such as large inertia and low structural rigidity, particularly when there are a large number of serially connected carrier components and/or drive motors, and when the carrier components have large moments of inertia. This can lead to torque transmission delays during the actuation of the carrier components, which can reduce a response speed of the stabilizing platform and cause its performance to deteriorate. A slower response speed of stabilizing of a payload device, such as a camera, may result in less steady operation of the payload device in relation to the environment, such as less steady images captured by the camera.

Embodiments of the present disclosure can mitigate torque transmission delays in existing stabilizing platforms, by applying a supplemental torque to the payload support structure (and/or the payload device) to compensate for torque transmission delays. The disclosure can provide quick and dynamic adjustment of payload device postures, for example, to counteract the various posture changes of the carrier of the payload device. Accordingly, a response time of the stabilizing platform can be improved by applying one or more supplemental torques almost instantaneously to the payload support structure. In particular, when the payload device is an imaging device, high-quality images can be obtained as a result of the improved performance of the stabilizing platform.

According to some embodiments of the disclosure, a carrier comprising a stabilizing platform for controlling torque delivery to a payload is provided. The stabilizing platform may form part of the carrier. The carrier may include one or more joints or structures for carrying the payload device. The payload may comprise, for example, one or more payload devices. The one or more payload devices may be the same type of payload device or different types of payload devices. The stabilizing platform may comprise at least one carrier component configured for rotation about a carrier axis, a payload support structure coupled to the carrier component, and at least one rotational device coupled to the payload support structure. The payload support structure may be configured to support the payload. The rotational device may comprise a non-rotating portion directly coupled to the payload support structure and a rotating portion configured to rotate freely to provide a supplemental torque to the payload support structure. The supplemental torque may be provided to compensate for a torque transmission delay from the carrier component to the payload support structure when the carrier component rotates about the carrier axis.

The rotational device may reduce the amount of torque transmission delay. For instance, the rotational device may reduce the amount of torque transmission delay by at least 1%, 3%, 5%, 10%, 15%, 20%, 25%, 30%, 35%, 40%, 45%, 50%, 60%, 70%, 80%, or 90%, compared to not having the rotational device. The reduction of the amount of torque transmission delay may be on the order of at least 0.001 ms, 0.005 ms, 0.01 ms, 0.03 ms, 0.05 ms, 0.1 ms, 0.3 ms, 0.5 ms, 0.7 ms, 1 ms, 2 ms, 3 ms, 5 ms, 7 ms, 10 ms, 15 ms, 20 ms, 30 ms, 50 ms, or 100 ms, compared to not having the rotational device.

Various embodiments of the disclosure will be described in detail below with reference to the figures.

FIG. 1 illustrates a schematic view of carrier comprising a stabilizing platform 100 in accordance with an embodiment. The stabilizing platform may be configured to hold a payload device. In some embodiments, the carrier comprising the stabilizing platform may be configured to be mounted or otherwise coupled to a movable object. The movable object may be a motorized or non-motorized vehicle or vessel, robot, human, animal, or the like. In some embodiments, the stabilizing platform may be mounted to a manned or unmanned aerial vehicle (UAV). Any description herein of a UAV may apply to any type of movable object and vice versa.

Examples of payload devices may include a device that collects data (e.g., imaging device (for visible light, infrared, ultra-violet (UV), geo-thermal or any other type of emission); a device that detects one or more particles; a device that detects a field such as a magnetic field, electric field, radio field; radiation detector; microphone, any type of sensor as described in greater detail elsewhere herein), a device that provides an emission (e.g., light emitter, image emitter, heat emitter, radio emitter, wireless signal emitter particle emitter), a device that interacts with the environment (e.g., robotic arm, sample collector, liquid distributer, pesticide or fertilizer sprayer), or any other type of device or combinations thereof. A payload device can also include one or more sensors for surveying one or more targets. Any suitable sensor can be incorporated into the payload, such as an image capture device (e.g., a camera), an audio capture device (e.g., a parabolic microphone), an infrared imaging device, or an ultraviolet (UV) imaging device. The sensor can provide static sensing data (e.g., a photograph) or dynamic sensing data (e.g., a video). In some embodiments, the sensor provides sensing data for the target of the payload device. Alternatively or in combination, the payload device can include one or more emitters for providing signals to one or more targets. Any suitable emitter can be used, such as an illumination source or a sound source. In some embodiments, the payload device can include one or more transceivers, such as for communication with a module remote from the movable object. Optionally, the payload device can be configured to interact with the environment or a target. For example, the payload device can include a tool, instrument, or mechanism capable of manipulating objects, such as a robotic arm.

In some embodiments, the payload device may include an imaging device configured to acquire and/or transmit one or more images of objects within the imaging device's field of view. Examples of an imaging device may include a camera, a video camera, smartphone/cell phone with a camera, or any device having the ability to capture optical signals. A non-imaging device may include any other devices such as for collecting or distributing sound, particles, liquid, or the like. Examples of non-imaging devices may include a microphone, a loud speaker, a particle or radiation detector, a fire hose, and the like.

The payload device may be supported by the carrier. The carrier can be provided for the payload device and the payload device can be coupled to the movable object via the carrier, either directly (e.g., directly contacting the movable object) or indirectly (e.g., not contacting the movable object). In some embodiments, the payload device can be integrally formed with the carrier. Alternatively, the payload device can be releasably coupled to the carrier. In some embodiments, the payload device can include one or more payload elements, and one or more of the payload elements can be movable relative to the movable object and/or the carrier.

The carrier can provide support to the payload device (e.g., carry at least part of the weight of the payload device). The carrier can include a suitable mounting structure (e.g., a stabilizing gimbal platform) capable of stabilizing and/or directing the movement of the payload device. In some embodiments, the carrier can be configured to control the state of the payload device (e.g., position and/or orientation) relative to the movable object. For example, the carrier can be configured to move relative to the movable object (e.g., with respect to one, two, or three degrees of translation and/or one, two, or three degrees of rotation) such that the payload device maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, or a payload target object).

In some embodiments, the carrier can be configured to permit movement of the payload device relative to the carrier and/or the movable object. The movement can be a translation with respect to up to three degrees of freedom (e.g., along one, two, or three axes) or a rotation with respect to up to three degrees of freedom (e.g., about one, two, or three axes), or any suitable combination thereof.

Referring to FIG. 1, the stabilizing platform may comprise a frame assembly, a motor assembly, and a controller assembly.

Figure 20:
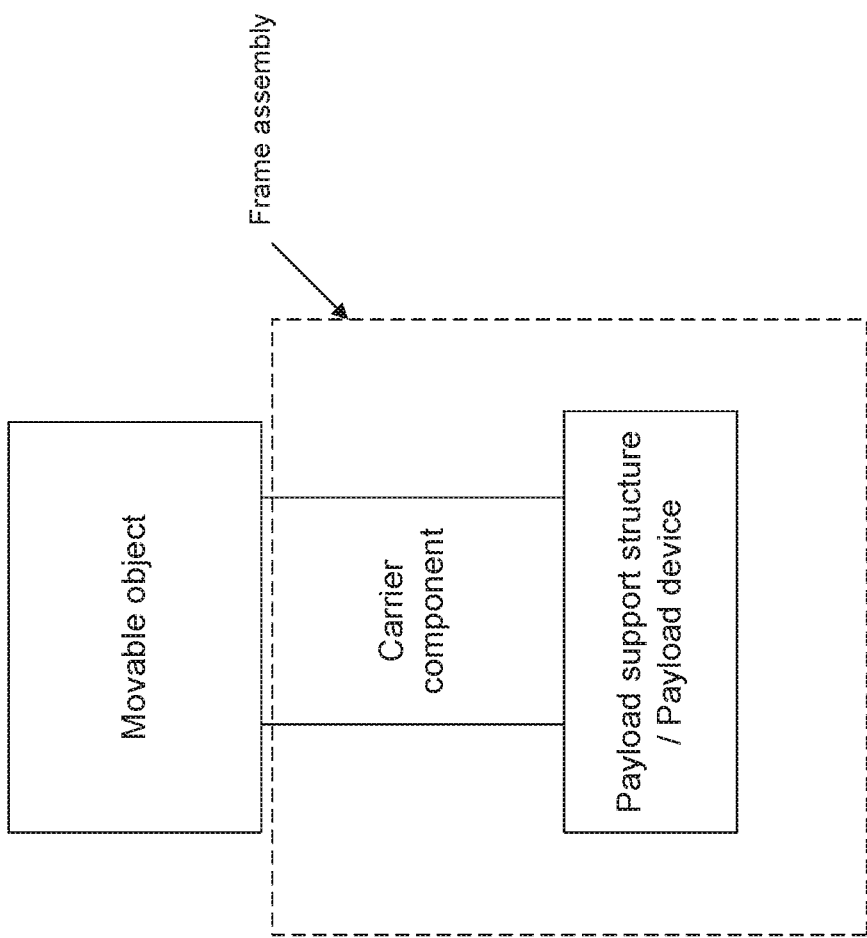
FIG. 20 is a block diagram of a frame assembly comprising a carrier component for connecting a payload support structure/payload to a movable object, in accordance with some embodiments.

The frame assembly may comprise a carrier component L1 and a payload support structure 102 coupled to each other. The carrier component L1 may be any frame member, connecting member, mounting arm, connecting arm, torsion arm, elongated arm, support frame, etc. that can be used to connect the payload support structure to a movable object. In some embodiments, the movable object may be an aerial vehicle such as an unmanned aerial vehicle (UAV). The carrier component L1 may be configured to connect the payload support structure and/or the payload to the movable object, for example as shown in FIG. 20. The carrier component L1 may be a single component. In some embodiments, the carrier component L1 may be provided in plural. The carrier component L1 may have any shape, and need not be limited to a linear shape. For example, the carrier component L1 can have any shape in a two-dimensional plane or in three-dimensional space. The carrier component L1 may be formed as a single monolithic structure. In some embodiments, the carrier component L1 may comprise a plurality of pieces that move relative to one another. Any type of structure (two-dimensional or three-dimensional) of the carrier component L1 may be contemplated.

In the example of FIG. 1, one end of the carrier component L1 may be coupled to the movable object, and another end of the carrier component L1 may be coupled to the payload support structure. The carrier component L1 may be coupled to the movable object and the payload support structure using any coupling mechanism, such as fasteners, actuation elements, joints, hinges, bolts, screws, etc. The carrier component L1 may be formed having any shape and/or size. The carrier component L1 may be formed having a regular shape (e.g., cylindrical, rectangular block, circular or rectangular plate, etc.) or any irregular shape. Any dimension (e.g., length, width, thickness, diameter, circumference, or area) of the carrier component L1 may be contemplated.

In the example of FIG. 1, the stabilizing platform may be a one-axis stabilizing platform that provides a single axis of rotation for a payload device mounted in (or on) the payload support structure. The payload support structure is configured to support the payload device (e.g., an imaging device). In some cases, the payload support structure can protect the payload device from damage such as external impact. For instance, the payload support structure may surround one or more portions of the payload device. The payload support structure can protect the payload device from damage due to external impact. For example, the payload support structure may comprise a cage-like structure made of a rigid high strength metal (or metallic alloy) or flexible high strength polymer. The payload support structure may completely enclose or partially enclose the payload device. In some embodiments, the payload support structure may be partially or completely fluid proof. For example, the payload support structure may be water-proof and/or air/proof (i.e, a hermetic enclosure). In some embodiments, the payload support structure can prevent dust from coming into contact with the payload device and interfering with the operation of the payload device. In some embodiments, the payload support structure may simply comprise a joint or a connector to which the payload device can be affixed. In some other embodiments, the payload support structure may be designed specifically for a particular type of payload device, or configured to accept different types of payload devices. The payload device may be affixed to the payload support structure such that the payload device and the payload support structure are movable as a whole. For example, the payload support structure and the payload device disposed therein may move as a whole when a force/torque is applied to the payload support structure. The shape, size and other characteristics of the payload support structure are not limited to those shown in FIG. 1. For example, the shape of the payload support structure may be rectangular, prismatic, spherical, ellipsoidal, or the like.

The motor assembly of FIG. 1 may comprise an actuator M1 for actuating the payload support structure via the carrier component L1, in response to and to correct for an external force that is exerted onto the payload support structure. The external force may be any translational force or rotational force that is exerted onto the movable object about any axis (e.g., X axis, Y axis, Z axis), and that is subsequently transmitted to the payload support structure (and/or payload device). In some embodiments, the external force may be applied about a plurality of different axes. In the example of FIG. 1, the external force may be an external torque Te_z that is applied to the movable object about the positive Z axis in a clockwise direction. The direction of the Z axis is indicated in the tri-coordinate global XYZ system on the bottom right corner of FIG. 1. In some instances, the external torque Te_z may be applied to the center of mass of the movable object about its yaw axis. The application of the external torque Te_z to the movable object exerts a corresponding torque onto the payload support structure, since the payload support structure is coupled to the movable object.

The external force/torque may be generated by external disturbances, such as wind effects, temperature changes, or external impacts on the movable object and/or the payload support structure. The external force/torque can also be generated as a result of certain motion characteristics of the movable object (e.g., sudden acceleration, deceleration, circular flight motion, pitch/roll/yaw, tilt, etc.). The external force/torque can affect the orientation (e.g., attitude) of the payload support structure, and the stability of the payload device disposed within the payload support structure. When the payload support structure is carrying a payload such as an imaging device, the external force/torque may affect the quality of images captured by the imaging device. The external force/torque may cause the payload support structure to shift outside of a target location. For example, when the payload device is an imaging device, external disturbances can result in certain objects moving out of the field-of-view of the imaging device, and may also cause the imaging device to lose its focus of the objects.

To maintain the stability of the payload device, the actuator M1 may be configured to generate a correction torque $Tc\_z$ to counteract/offset the external torque $Te\_z$, upon detection of the external torque $Te\_z$. The external torque $Te\_z$ can be detected using a sensing system, and the correction torque $Tc\_z$ may be generated via a controller configured to control the actuator M1, as described later in the specification. In some embodiments, the correction torque $Tc\_z$ may be substantially equal and opposite in direction to the external torque $Te\_z$. For example, when the external torque $Te\_z$ is applied to the movable object in a clockwise direction about the Z axis, the actuator M1 may apply the correction torque $Tc\_z$ to the payload support structure in a counter clockwise direction about the Z axis. The correction torque $Tc\_z$ can help to prevent the payload support structure from moving in the direction of the external torque, thus maintaining the position and stability of the payload support structure.

However, in some cases, there may be a transmission delay in the correction torque $Tc\_z$ when the correction torque $Tc\_z$ is being transmitted from the actuator M1 via the carrier component L1 to the payload support structure. The transmission delay is present because it takes time for the correction torque $Tc\_z$ to be transmitted from the actuator M1 through the carrier component L1 to the payload support structure. The transmission of the correction torque $Tc\_z$ may occur via sequential deformation of parts (e.g., deformation of a rotating portion of the actuator M1 first, followed by deformation of the carrier component L1 in a direction of the correction torque, and subsequent deformation of the payload support structure). Such deformation may occur when two surfaces are mated together (e.g., an exterior surface of the rotating portion of the actuator M1 may be mated to an interior surface of the carrier component L1), with the correction torque causing one surface to rotate while the other surface is resisting against the rotation motion.

The torque transmission delay may be influenced by the size of the parts in the stabilizing platform, the number of serially connected parts, and the manner in which the parts are connected together, as described later in the specification. In the example of FIG. 1, the torque transmission delay may increase when the carrier component L1 and/or the payload support structure have large moments of inertia. The moment of inertia (also known as angular mass or rotational inertia) of a rigid body determines the torque needed for a desired angular acceleration about a rotational axis. The moment of inertia depends on the body's mass distribution and the chosen axis, with larger moments requiring more torque to change the body's rotation. In some embodiments, when the payload device is a heavy object or vibration-sensitive object, the carrier component L1 and/or the payload support structure may need to have large masses for enhanced structural support and/or vibration dampening purposes. In those embodiments, transmission of the correction torque $Tc\_z$ through the various parts of the stabilizing platform may be delayed since deformation of each part takes a longer time and occurs sequentially (from actuator M1 to carrier component L1 to payload support structure). Under such circumstances, a response speed (performance) of the stabilizing platform may be reduced.

To improve the stabilizing performance of the stabilizing platform, a rotational device may be used to compensate for the transmission delay in the correction torque. As shown in FIG. 1, the motor assembly may further comprise a rotational device RW1 to compensate for the transmission delay in the correction torque $Tc\_z$. The rotational device RW1 may be disposed directly on the payload support structure. The rotational device RW1 may be any device that is capable of compensating for (or mitigating) torque transmission delays. In the example of FIG. 1, the rotational device RW1 may be configured to provide a supplemental torque $Ts\_z$ to the payload support structure in a counter clockwise direction about the Z axis. The supplemental torque $Ts\_z$ may be applied in the same direction as the correction torque $Tc\_z$, and in an opposite direction to the external torque $Te\_z$, in order to counteract the external torque $Te\_z$. The supplemental torque $Ts\_z$ can be used to maintain the position and stability of the payload support structure during the transmission delay of the correction torque $Tc\_z$ (i.e., prior to the correction torque $Tc\_z$ reaching the payload support structure).

Unlike the correction torque $Tc\_z$ which suffers from transmission delay through the various parts of the stabilizing platform, the effect of the supplemental torque $Ts\_z$ can be transmitted almost instantaneously in real-time to the payload support structure, since the rotational device RW1 is disposed directly on the payload support structure. The supplemental torque $Ts\_z$ can be used in complementary with the correction torque $Tc\_z$. For example, the supplemental torque $Ts\_z$ can be used to counteract the external torque $Te\_z$ at the payload support structure, when the payload support structure first experiences the external torque $Te\_z$, and before the correction torque $Tc\_z$ reaches the payload support structure. When the correction torque $Tc\_z$ from the actuator M1 reaches the payload support structure, the supplemental torque $Ts\_z$ may then be reduced or removed.

In some embodiments, the supplemental torque $Ts\_z$ can continue to be used in conjunction with the correction torque $Tc\_z$ to mitigate the effects of the external torque $Te\_z$, even after the correction torque $Tc\_z$ has reached the payload support structure. For example, the supplemental torque $Ts\_z$ can be used to increase the sensitivity of the stabilizing platform, by providing minute torque corrections to the payload support structure in real-time or near real-time, in response to changes in the external torque $Te\_z$. These minute torque corrections from the rotational device RW1 can be used to supplement or augment the correction torque $Tc\_z$ provided by the actuator M1. These real-time (or near real-time) minute torque corrections are particularly useful when the external torque/disturbance is occurring at a high frequency, that necessitates increased sensitivity and response speed of the stabilizing platform. An example of such external torque/disturbance may be vibration/jitter of the movable object caused by moving parts in the movable object's propulsion unit.

The actuator M1 and the rotational device RW1 may be selected from a group comprising of: rotational motors, servo motors, direct-drive rotational motors, direct current (DC) brush motors, DC brush less motors, DC torque motors, linear solenoids stepper motors, ultrasonic motors, geared motors, speed-reduced motors, hydraulic actuators, pneumatic actuators, or piggybacked motor combinations.

For example, the motor assembly may include direct-drive motors (e.g., compact motors or miniaturized motors). Direct-drive motors typically require relatively less energy, thereby promoting energy efficiency and environmental protection. Direct-drive motors may also be controlled in a stepless fashion, reducing the response time, and enabling fast and timely adjustment in response to various posture changes of the movable object.

In some embodiments, at least one of the actuator M1 or the rotational device RW1 may be implemented using a brushless DC electric motor. Brushless DC motors have the following benefits: (1) reliable performance, reduced wear and/or malfunction rate, and a longer service life (about six times) than that of a brushed motor due to commutation with electronics instead of mechanical commutators (2) low no-load current because brushless DC motors are static motors; (3) high efficiency; and (4) small size. In various embodiments, other types of motors may be used instead of or in addition to brushless DC motors.

In some embodiments, the size (e.g., motor size) of the actuator M1 for providing the correction torque $Tc\_z$ can be reduced, since the rotational device RW1 can provide the supplemental torque $Ts\_z$ to supplement the correction torque $Tc\_z$. The size of an actuator depends on the torque output and moment of inertia. Accordingly, the actuator M1 need not provide all of the torque for counteracting the external disturbance, since some of the torque may be provided by the rotational device RW1.

As shown in FIG. 1, the carrier component L1 may be rotatably coupled to the movable object by the actuator M1. In some embodiments, the actuator M1 may be affixed to a base of the carrier. The base may be a base plate or mounting structure that can be rigidly affixed to a portion (e.g., a bottom portion) of the movable object. In some cases, the base may form part of a housing of the movable object. In some alternative embodiments, the base may be omitted, and the actuator M1 may be directly mounted to the body or housing of the movable object.

The actuator M1 may comprise a non-rotating portion coupled to the base and a rotating portion coupled to the carrier component L1. In some other embodiments, the non-rotating portion of the actuator M1 may be coupled to the carrier component L1 and the rotating portion may be coupled to the base. When the actuator M1 is a motor, the non-rotating portion may correspond to a stator of the motor, and the rotating portion may correspond to a rotor of the motor.

The carrier component L1 may be configured to rotate about the Z axis extending along an axis of rotation of the rotating portion of the actuator M1. The axis of rotation may be parallel to the yaw axis of the movable object. In some cases, the axis of rotation may coincide with the yaw axis of the movable object. In the example of FIG. 1, the payload support structure is rigidly coupled to the carrier component L1. Since the payload support structure is rigidly coupled to the carrier component L1, the payload support structure (and the payload device disposed therein) can rotate about the Z axis when the carrier component L1 rotates. The actuator M1 may be configured to rotate the carrier component L1 about the Z axis in response to a signal transmitted from the controller assembly to the actuator M1. Accordingly, the actuator M1 may be configured to directly drive the carrier component L1 and the payload support structure to rotate about the Z axis relative to the base/movable object. Specifically, the actuator M1 can apply the correction torque $Tc\_z$ to drive the carrier component L1 and the payload support structure, so as to counteract the external torque $Te\_z$.

In some embodiments, the axis of rotation of the carrier component L1 may extend through a center of mass of the movable object. In other embodiments, the axis of rotation of the carrier component L1 may be offset from a parallel imaginary line extending through a center of mass of the movable object. In some embodiments, the axis of rotation of the carrier component L1 may extend through a center of mass of the payload support structure. In other embodiments, the axis of rotation of the carrier component L1 may be offset from a parallel imaginary line extending through a center of mass of the payload support structure. Any arrangement of the movable object, base, carrier component L1, and the payload support structure relative to one another may be contemplated.

In the embodiment of FIG. 1, the rotational device RW1 may be disposed on a portion 102-1 of the payload support structure. The portion 102-1 may be opposite to a portion 102-2 of the payload support structure to which an end of the carrier component L1 is attached. However, the placement of the rotational device RW1 need not be limited to the configuration illustrated in FIG. 1. The rotational device RW1 may be disposed on any portion of the payload support structure other than portion 102-1. For example, in some embodiments, the rotational device RW1 may be disposed on the portion 102-2. In some further embodiments, the rotational device RW1 may be disposed on one or more portions of the payload support structure that are orthogonal to, or oblique to, the portions 102-1 and 102-2. In some embodiments, the rotational device RW1 may be disposed such that the axis of rotation of the rotational device RW1 is parallel to the axis of rotation of the actuator M1 and/or the axis of rotation of the carrier component L1. In some embodiments, the axes of rotation for one or more of the above (rotational device RW1, actuator M1, and carrier component L1) may be co-axial.

In some embodiments, a plurality of rotational devices may be disposed respectively on a plurality of portions of the payload support structure. Any number of rotational devices and their arrangement on the payload support structure may be contemplated, as described with reference to the figures later in the specification. In some embodiments, the rotational device(s) may be disposed within the payload support structure instead of an exterior surface(s) of the payload support structure. In some further embodiments, the rotational device(s) may be disposed directly on the payload device itself. In some particular embodiments, the payload support structure may be omitted, and the rotational device(s) may be disposed directly on the payload device. As an example, the rotational device RW1 may be disposed directly on the payload device.

The rotational device RW1 may be configured to provide the supplemental torque $Ts\_z$ to the payload support structure. The supplemental torque $Ts\_z$ may be directly and almost instantaneously provided by the rotational device RW1 to the payload support structure.

The rotational device RW1 may reduce the amount of torque transmission delay. For instance, the rotational device RW1 may reduce the amount of torque transmission delay by at least 1%, 3%, 5%, 10%, 15%, 20%, 25%, 30%, 35%, 40%, 45%, 50%, 60%, 70%, 80%, or 90%, compared to not having the rotational device RW1. The reduction of the amount of torque transmission delay may be on the order of at least 0.001 ms, 0.005 ms, 0.01 ms, 0.03 ms, 0.05 ms, 0.1 ms, 0.3 ms, 0.5 ms, 0.7 ms, 1 ms, 2 ms, 3 ms, 5 ms, 7 ms, 10 ms, 15 ms, 20 ms, 30 ms, 50 ms, or 100 ms, compared to not having the rotational device RW1. In some embodiments, the supplemental torque Ts_z may be provided by the rotational device RW1 to the payload support structure within less than or equal to about: 0.001 ms, 0.005 ms, 0.01 ms, 0.03 ms, 0.05 ms, 0.1 ms, 0.3 ms, 0.5 ms, 0.7 ms, 1 ms, 2 ms, 3 ms, 5 ms, 7 ms, 10 ms, 15 ms, 20 ms, 30 ms, 50 ms, or 100 ms.

In the example of FIG. 1, a rotating portion of the rotational device RW1 is not directly coupled to the payload support structure, such that the rotating portion of the rotational device RW1 can rotate freely relative to the payload support structure or the payload device. The free rotation of the rotating portion of the rotational device RW1 can generate the supplemental torque Ts_z, as described below.

In some embodiments, the rotational device RW1 may comprise a non-rotating portion directly coupled to the payload support structure and the rotating portion configured to rotate freely to provide the supplemental torque to the payload support structure. In some embodiments, the rotational device RW1 may be a rotational motor comprising a stator and a rotor. The stator may correspond to the non-rotating portion of the rotational device RW1, and the rotor may correspond to the rotating portion of the rotational device RW1. The stator of the rotational device RW1 may be directly coupled to the payload support structure. For example, the stator of the rotational device RW1 may be rigidly and directly attached to the payload support structure, so that the supplemental torque Ts_z can be directly transmitted from the stator to the payload support structure without transmitting through any intervening parts. In some other embodiments, the stator of the rotational device RW1 may be directly coupled to the payload device. For example, the stator of the rotational device RW1 may be rigidly and directly attached to the payload device, so that the supplemental torque Ts_z can be directly transmitted from the stator to the payload device without transmitting through any intervening parts. The rotor of the rotational device RW1 may be configured to rotate freely about the Z axis. The axis of rotation of the rotational device RW1's rotor may be parallel to the yaw axis of the movable object. In some embodiments, the axis of rotation of the rotational device RW1 may coincide with the yaw axis of the movable object. In the example of FIG. 1, the rotor is configured to rotate freely in the clockwise direction about the Z axis, which consequently generates the supplemental torque Ts_z in the counter clockwise direction about the Z axis, based on the laws of conservation of angular momentum. Specifically, when the rotor rotates freely about the Z axis, the supplemental torque Ts_z may be directly transmitted to the payload support structure through the stator.

In some embodiments, the axis of rotation of the rotational device RW1 may be parallel to the axis of rotation of the carrier component L1. In some alternative embodiments, the axis of rotation of the rotational device RW1 need not be parallel to the axis of rotation of the carrier component L1. In some embodiments, the axis of rotation of the rotational device RW1 may extend through a center of mass of the payload support structure. In other embodiments, the axis of rotation of the rotational device RW1 may be offset from a parallel imaginary line extending through a center of mass of the payload support structure.

As described above, the supplemental torque Ts_z may be generated by the rotation of the rotor of the rotational device RW1. The supplemental torque Ts_z may be generated by applying an electric current having a first direction (e.g., either a positive electric current or a negative electric current) to the rotational device RW1, thereby causing the rotor to accelerate. The rotor may be configured to accelerate to a predetermined rotational speed.

In some cases, the external disturbance may be continuous (for example, continuous vibration of the movable object and/or the payload support structure during flight, air turbulence, etc.). In those cases, the external disturbance would exert a continuous force/torque on the movable object and the payload support structure. When the external torque Te_z is continuously applied to the movable object and the payload support structure, a continuous current may be supplied to the rotational device RW1, so as to achieve a continuous reaction torque (supplemental torque) against the external torque, in order to maintain an attitude and/or orientation of the payload support structure. However, when the external disturbance is continuous, the rotor of the rotational device RW1 may continue to rotate faster and faster as a result of the continuous current supply. When the rotation speed of the rotor reaches a predetermined rotation speed, a counter electromotive potential generated by the rotation may be substantially the same as a voltage supplied to the rotational device RW1. This phenomenon is known as "rotating speed saturation," and may result in failure of the rotational device RW1 to provide sufficient supplemental torque to counteract the external torque.

To avoid "rotating speed saturation," an electric current having a second direction opposite to the first direction may be applied to the rotational device RW1 to cause the rotor to decelerate, when the rotor exceeds the predetermined rotation speed. For example, a positive electric current may be first applied to the rotational device RW1 to cause the rotor to accelerate and to rotate in a clockwise direction. When the rotor exceeds the predetermined rotation speed, a negative electric current may be applied to the rotational device RW1 to cause the rotor to decelerate and to rotate in a counter-clockwise direction, thereby causing the rotor to slow down.

In some embodiments, the rotational device RW1 may be a reaction wheel comprising an actuator. A reaction wheel typically consists of a spinning mass with a substantial amount of inertia, and operates based on the conservation of angular momentum. In the example of FIG. 1, the reaction wheel may comprise an inertia wheel mounted onto the rotor and configured to rotate freely with the rotor. The rotor and the inertia wheel may be configured to rotate freely about the Z axis. The inertia wheel can be used to increase a length of time for which the supplemental torque Ts_z is provided to the payload support structure. The length of time for which the supplemental torque Ts_z is provided to the payload support structure may be a function of a mass of the inertia wheel. For example, the length of time for which the supplemental torque Ts_z is provided to the payload support structure may increase with the mass of the inertia wheel. The supplemental torque Ts_z may be generated by applying an electric current having a first direction to the rotational device RW1, thereby causing both the rotor and the inertia wheel to accelerate. The rotor and the inertia wheel may be configured to accelerate to a predetermined rotational speed.

The predetermined rotational speed may correspond to a speed at which "rotating speed saturation" occurs (i.e., when the counter electromotive potential generated by the rotation of the rotor and inertia wheel is substantially equal to the voltage supplied to the rotational device RW1). When the rotor and the inertia wheel exceed the predetermined rotation speed, an electric current having a second direction opposite to the first direction may be applied to the rotational device RW1 to cause the rotor and the inertia wheel to decelerate. For example, a positive electric current may be applied to the rotational device RW1 to cause the rotor and the inertia wheel to accelerate and rotate in a clockwise direction. When the rotor and the inertia wheel exceed the predetermined rotation speed, a negative electric current may be applied to the rotational device RW1 to cause the rotor and the inertia wheel to decelerate to rotate in a counter-clockwise direction, thereby causing the rotor and the inertia wheel to slow down.

The rotational device RW1 may be configured to provide the supplemental torque Ts_z to the payload support structure to compensate for the transmission delay in the correction torque Tc_z. As previously mentioned, the correction torque Tc_z may be generated by the actuator M1. The correction torque Tc_z may be generated and transmitted to the payload support structure when the actuator M1 rotates the carrier component L1 about the Z axis. In some embodiments, the supplemental torque Ts_z may be generated at substantially a same time as the correction torque Tc_z. For example, when the external disturbance exerting the external torque Te_z is detected by one or more inertial sensors in the controller assembly, both the correction torque Tc_z and the supplemental torque Ts_z may be generated at substantially the same time to counteract the external torque Te_z. For example, both the actuator M1 and the rotational device RW1 may be actuated at substantially the same time to generate the correction torque Tc_z and the supplemental torque Ts_z. However, the payload support structure may receive the supplemental torque Ts_z before receiving the correction torque Tc_z. For example, the payload support structure may receive the correction torque Tc_z later than the supplemental torque Ts_z due to torque transmission delay from: (1) the actuator M1 to the carrier component L1, and (2) from the carrier component L1 to the payload support structure. In other words, the supplemental torque Ts_z can be transmitted to the payload support structure before the correction torque Tc_z, even though both the correction torque Tc_z and the supplemental torque Ts_z may be generated at substantially the same time.

The torque transmission delay may be a result of a torsional deformation of a rotating portion of the actuator M1 and a torsional deformation of the carrier component L1. In some embodiments, the torque transmission delay may be in the range from several milliseconds to several seconds.

Referring to FIG. 1, a length of the transmission delay may be a function of a distance D1 measured between the actuator M1 and the payload support structure. For example, the transmission delay may increase when the distance D1 increases. In some cases, the distance D1 from the actuator M1 to the payload support structure may be determined based at least in part on a length of the carrier component L1. For the rotational device RW1 to effectively compensate for the transmission delay, a distance between the rotational device RW1 and the payload support structure should be minimal, and substantially less than the distance D1. For example, in the embodiment of FIG. 1, the rotational device RW1 is disposed directly on the payload support structure to minimize its distance from the payload support structure. Accordingly, the supplemental torque Ts_z can be directly and almost instantaneously transmitted to the payload support structure without any significant transmission delay.

The payload support structure may be configured to experience an effect of the supplemental torque Ts_z before experiencing an effect of the correction torque Tc_z. In some instances, the supplemental torque Ts_z may be reduced or removed, when the correction torque Tc_z is transmitted to and experienced at the payload support structure. In some embodiments, the supplemental torque Ts_z may be applied to the payload support structure for a time period corresponding to the transmission delay. When the correction torque Tc_z reaches the payload support structure at the end of the transmission delay, the supplemental torque Ts_z may be reduced or removed. The supplemental torque Ts_z may be reduced or removed by adjusting the electric current to the rotational device RW1, to cause the rotor and/or the inertia wheel of the rotational device RW1 to decelerate. The payload support structure may experience an effect of the supplemental torque Ts_z during the delay before experiencing an effect of the correction torque Tc_z. The supplemental torque Ts_z may be substantially equal to and applied in a same direction as the correction torque Tc_z. In some instances, the supplemental torque Ts_z may be less than the correction torque Tc_z. In some cases, the supplemental torque Ts_z may be substantially equal and opposite in direction to the external torque Te_z to mitigate the effect of the external disturbance on the payload support structure.

To further increase the stability of the payload support structure, in some embodiments, the center of gravity of the carrier component L1 and the payload support structure as a whole may be located on the yaw axis of the movable object. The stability of the payload support structure can be enhanced when the correction torque Tc_z and the supplemental torque Ts_z can be applied to counteract the external torque Te_z about a common axis (e.g., the yaw axis of the movable object). In addition, the carrier component L1 and the payload support structure can be in a dynamically balanced state, when the movable object is moving smoothly with little or no motor drive stabilization required.

In some embodiments, the frame assembly of the stabilizing platform may comprise one or more adjustment members for adjusting the dimensions or rotational axes of the frame assembly. Such adjustment members may allow the frame assembly to accommodate payload support structures of different dimensions, shapes and/or weight. In addition, the adjustment may be necessary, for example, to align a center of gravity with a rotational axis as discussed above. For example, the frame assembly can include one or more adjustment members (e.g., slits, holes) for adjusting the position of the payload support structure and/or the carrier component relative to the base/movable object. Such adjustment may be required, for example, to align the center of gravity of the payload support structure and the carrier component L1 as a whole with the yaw axis of the movable object. In some embodiments, the carrier component L1 can include one or more adjustment members for adjusting the position of the payload support structure relative to the carrier component L1 and the base/movable object. For example, the payload support structure can be positioned further from or closer to the base/movable object, depending on the size or shape of the payload support structure and/or the length of the carrier component L1. In some embodiments, the payload support structure may also include one or more adjustment members for changing the dimensions of the payload support structure, so as to accommodate payload devices of various sizes.

In some embodiments, additional support structure(s) may be optionally provided to further stabilize or modify the stabilizing platform. It is appreciated that such support structures may be optional, and may not be necessary in various embodiments of the present disclosure. Nevertheless, such additional support structure(s) may be appreciated and implemented by one of ordinary skill in the art.

Figure 2:
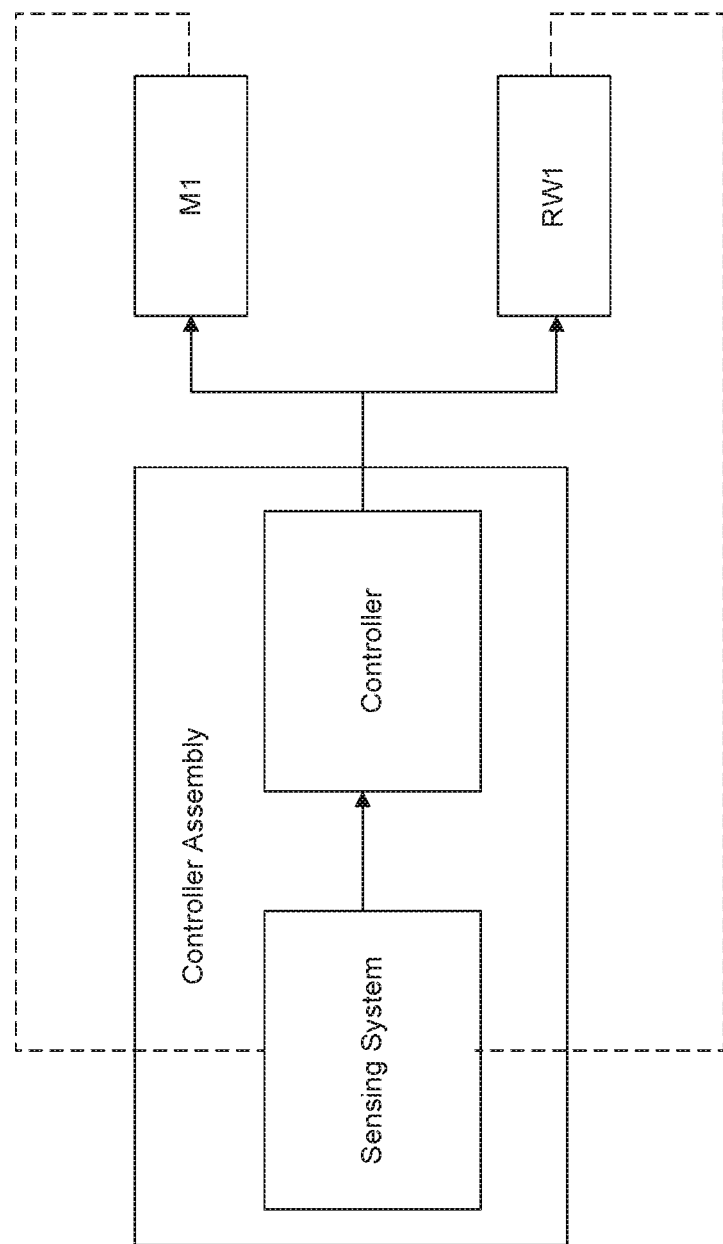
FIG. 2 illustrates a block diagram of a controller assembly and a motor assembly in the stabilizing platform of FIG. 1, in accordance with an embodiment.

In addition to the frame assembly and the motor assembly, the stabilizing platform further comprises the controller assembly. Referring to FIGS. 1 and 2, the controller assembly may comprise a sensing system 104 and a controller 106. The controller assembly may be in communication with the sensing system, and with the actuation elements (e.g., the actuator M1 and the rotational device RW1) of the motor assembly. The sensing system may be configured to measure or obtain state information associated with the payload device, the payload support structure, and/or with objects other than the payload support structure or the payload device, such as the frame assembly, the actuator M1, the rotational device RW1, the movable object, or the like. The state information may include angular and/or linear velocity and/or acceleration of any of the above objects, positional information (e.g., spatial disposition and/or orientation), and the like. Such state information may be relative or absolute. In some embodiments, the sensing system may be configured to measure or obtain state information associated with one or more of the above objects when the objects are subject to external disturbances (for example, weather and/or temperature changes, or impact by external matter such as debris or obstacles, etc.). In the example of FIG. 1, the sensing system may be provided on a portion of the payload support structure. It is noted that the sensing system can be provided anywhere on the stabilizing platform. In some other embodiments, the sensing system can be provided on the movable object itself. The sensing system may be provided on the payload device or the payload support structure. Any placement of the sensing system on the movable object, the stabilizing platform (e.g., the frame assembly, one or more elements in the motor assembly, the payload support structure), the payload device, or any combination thereof, may be contemplated. In various embodiments, the sensing system may be coupled to the payload device, the payload support structure, the frame assembly, the motor assembly, the movable object, or the like.

The sensing system may include one or more sensors that can sense the spatial disposition, velocity, and/or acceleration of the objects (e.g., with respect to up to three degrees of translation and up to three degrees of rotation). The sensing system may include an inertial measurement unit, motion sensors, proximity sensors, a compass, a global positioning system (GPS) transceiver, or other types of measurement components or sensors. For example, the sensing system may include one or more gyroscopes for detecting angular velocity and one or more accelerometer for detecting linear and/or angular acceleration of an object (e.g., payload device, payload support structure, frame assembly, and/or the movable object). In some embodiments, the linear or angular velocity/acceleration of the object may be detected based on positional differences of the object over time using the global positioning system (GPS), and/or by analyzing a sequence of image frames of the object captured over time to derive the spatial movement characteristics (e.g., instantaneous position, velocity, acceleration, attitude, orientation, etc.) of the object. Alternatively, the sensing system can be used to provide data regarding the environment surrounding the objects, such as weather conditions, proximity to potential obstacles, location of geographical features, location of manmade structures, and the like. In some embodiments, the sensing system may be configured to measure state information with respect to more than one rotational axis of the object. In some embodiments, the sensing system may obtain information that relate to at least two of the rotational axes. For example, the measurement member may obtain information related to both the pitch and roll axes of the object. In addition, the state information may pertain to all of the pitch, roll and yaw axes of the object.

In some embodiments, the controller may be configured to calculate posture information of the object based on the state information detected by the sensing system, and to provide one or more motor signals based on the posture information. Such posture information may include the pitch, roll, yaw axes of the object, orientation or inclination of the object with respect to the axes, velocity and/or acceleration, and the like. In some cases, the posture information may be calculated based on angular velocity information (e.g., as provided by the sensing system or from other sources). In other cases, the posture information may be calculated based on both angular velocity information and linear acceleration information. For example, the linear acceleration information may be used to modify and/or correct the angular velocity information.

Based on the calculated posture information, the controller may generate and transmit one or more motor signals to the actuation elements (e.g., the actuator M1 and/or the rotational device RW1) of the stabilizing platform. The motor signals can cause forward rotation, reverse rotation of the actuation elements, and can be used to adjust the speed/torque of the rotations to counteract the external disturbances/torque. In response to the one or more motor signals, the actuation elements (e.g., the actuator M1 and/or the rotational device RW1) can directly drive their respective portions of the frame assembly to rotate in response to the one or more motor signals. As a result, the payload device is allowed to rotate around at least one of the axis about which the external torque is exerted. Such rotation may be necessary for stabilizing the payload device and/or for maintaining a predetermined position or posture.

For example, in the embodiment of FIG. 1, when the payload support structure is subject to an external torque $Te\_z$, the controller may simultaneously apply electric currents to the actuator M1 and the rotational device RW1, to generate the correction torque $Tc\_z$ and the supplemental torque $Ts\_z$ to counteract the external torque $Te\_z$. The payload support structure may experience the effect of the supplemental torque $Ts\_z$ before the correction torque $Tc\_z$, due to transmission delay in the correction torque $Tc\_z$. The sensing system may be configured to detect the effect of each of the supplemental torque $Ts\_z$ and the correction torque $Tc\_z$ on the payload support structure. The correction torque $Tc\_z$ may reach the payload support structure at the end of the transmission delay. When the sensing system detects the effect of the correction torque $Tc\_z$ on the payload support structure, the controller may then reduce or remove the supplemental torque $Ts\_z$ by decreasing the current supplied to the rotational device RW1. Accordingly, the controller may be configured to modulate the correction torque $Tc\_z$ and the supplemental torque $Ts\_z$ from the actuator M1 and the rotational device RW1 in real-time, based on motion data from the sensing system, and the effects of the various torques on the payload support structure at various points in time. In particular, the sensitivity and performance of the stabilizing platform can be improved, by modulating the torques from the actuator M1 and the rotational device RW1 to achieve smooth torque control (to counteract the external torque).

As previously noted, conventional stabilizing systems may have significant torque transmission delays due to high inertia and/or low structural rigidity. As a result of the torque transmission delays, the phase margin of conventional closed-loop stabilizing systems may be reduced, thereby limiting the performance of the closed-loop control system. In contrast, the closed-loop control system in FIG. 2 has improved phase margin over conventional stabilizing systems, since the closed-loop control system in FIG. 2 comprises a rotational device configured to apply a supplemental torque to the payload support structure to compensate for the torque transmission delays.

Figure 3:
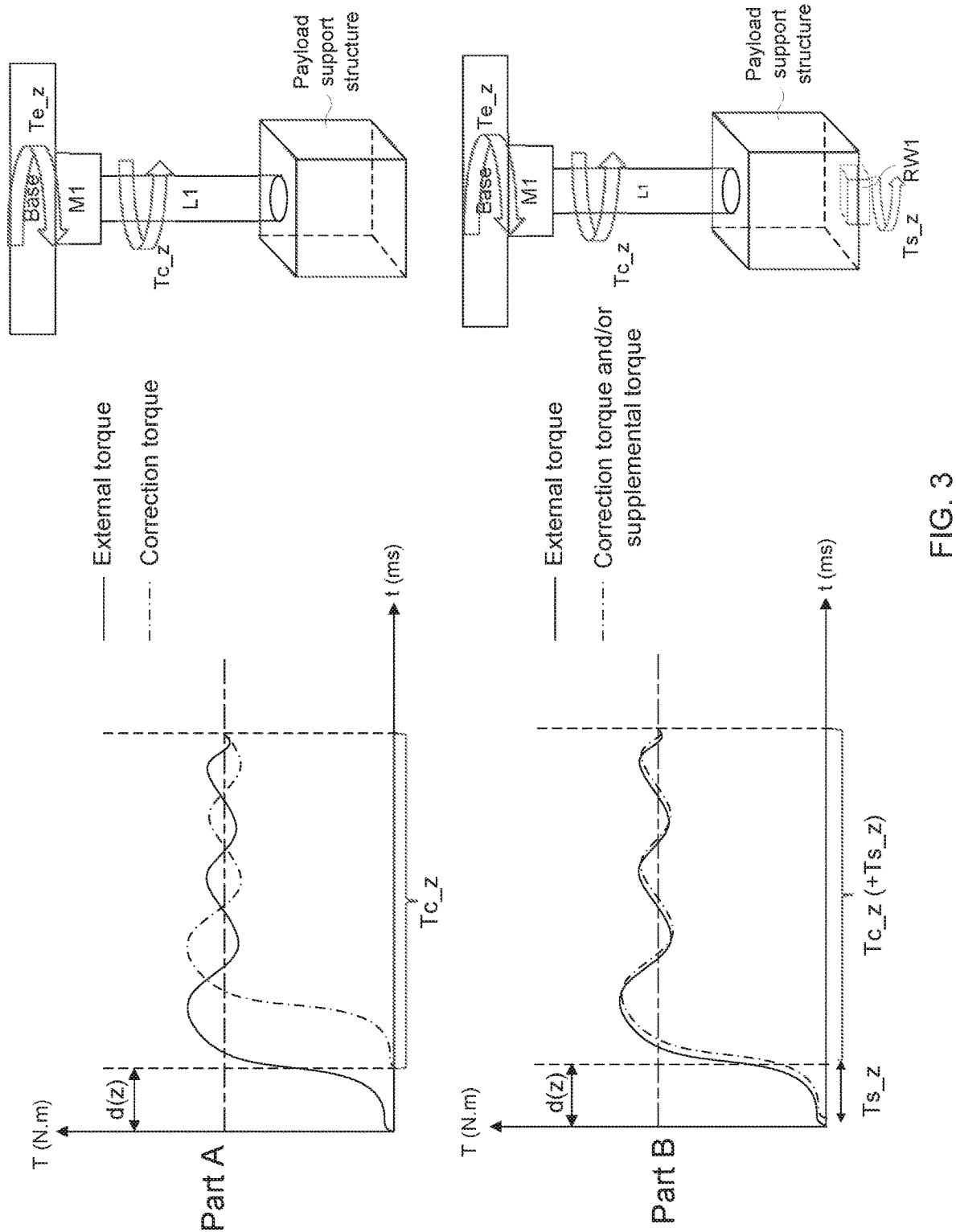
FIG. 3 illustrates an example of a difference in stabilizing performance between a first stabilizing platform and a second stabilizing platform, in accordance with some embodiments.

FIG. 3 illustrates an example of the difference in stabilizing performance between a first stabilizing platform and a second stabilizing platform. The first stabilizing platform is depicted in part A of FIG. 3, and does not include a rotational device RW1 for providing a supplemental torque to the payload support structure to compensate for torque transmission delays. The second stabilizing platform is depicted in part B of FIG. 3, and includes a rotational device RW1 for providing a supplemental torque to the payload support structure to compensate for torque transmission delays.

As previously described, the sensing system is configured to detect the effect of external disturbances (e.g., an external torque) on the payload support structure and/or the payload device. The external torque disturbance on the payload support structure and the corresponding stabilizing torque response of the stabilizing platform can be plotted as a function of time, as shown in FIG. 3

Referring to the torque T (N·m) versus time t (milliseconds) plots in FIG. 3, the solid curved line corresponds to the external torque on the payload support structure, and the dotted line corresponds to the correction torque and/or the supplemental torque on the payload support structure, plotted as a function of time.

Referring to part A of FIG. 3, when the sensing system first detects the external torque Te_z, the controller may control the actuator M1 to generate the correction torque Tc_z to counteract the external torque Te_z. However, for reasons relating to inertial and structural rigidity, there may be a transmission delay d(z) in the correction torque Tc_z. As a result, the correction torque Tc_z may be transmitted to and experienced at the payload support structure only after the delay d(z). In some instances, if the external torque is fluctuating rapidly (for example at a high frequency), the first stabilizing platform may not be able to adequately stabilize the payload support structure, since the response speed of the first stabilizing platform is reduced by the delay d(z). The reduction in response speed can cause the performance of the first stabilizing platform to deteriorate.

Referring to part B of FIG. 3, the rotational device RW1 may be disposed directly on the payload support structure to provide the supplemental torque Ts_z to compensate for the torque transmission delay d(z) from the actuator M1 to the payload support structure. As shown in part B of FIG. 3, the performance (response speed) of the second stabilizing platform may be improved over that of the first stabilizing platform. For example, when the sensing system detects the external torque Te_z, the controller may control both the actuator M1 and the rotational device RW1 to respectively generate the correction torque Tc_z and the supplemental torque Ts_z, to counteract the external torque Te_z. Since the rotational device RW1 is disposed directly on the payload support structure, the supplemental torque Ts_z provided by the rotational device RW1 can be almost instantaneously transmitted to the payload support structure. As shown in part B of FIG. 3, the supplemental torque Ts_z may be provided to the payload support structure for a duration of the delay d(z). At the end of the delay d(z), when the payload support structure starts to experience the effect of the correction torque Tc_z, the controller may then control the rotational device RW1 to reduce or remove the supplemental torque Ts_z, for example by reducing the current supplied to the rotational device RW1. In some embodiments, the controller may completely remove the supplemental torque Ts_z at the end of the delay d(z), and only apply the correction torque Tc_z to counteract the external torque Te_z starting from when the delay d(z) ends.

In some other embodiments, the controller may be configured to modulate both the supplemental torque Ts_z and the correction torque Tc_z to counteract the external torque Te_z, starting from when the delay d(z) ends. For example, the controller can control the rotational device RW1 to generate different amounts of supplemental torque as and when needed, depending on posture information/feedback from the sensing system. The different amounts of supplemental torque can be transmitted almost instantaneously to the payload support structure, and can be used to compensate for any subsequent delays in the correction torque. In some cases, the different amounts of supplemental torque may be minute, with the correction torque providing the bulk of the torque for counteracting/offsetting the external torque. The different amounts of supplemental torque can also be provided at a high frequency to the payload support structure almost instantaneously, and may be particularly useful when the external torque is fluctuating rapidly. As a result, the second stabilizing platform has improved performance over the first stabilizing platform, since the response speed of the second stabilizing platform is substantially unaffected by the transmission delay d(z) in the correction torque Tc_z.

In the example of FIG. 1, the centers of mass of the carrier component L1 and the payload support structure may lie along a common axis (e.g., the yaw axis of the movable object). In some embodiments, the centers of mass of the carrier component L1 and the payload support structure may lie on an axis other than the yaw axis of the movable object, for example as shown by the embodiments in FIG. 4.

Figure 4:
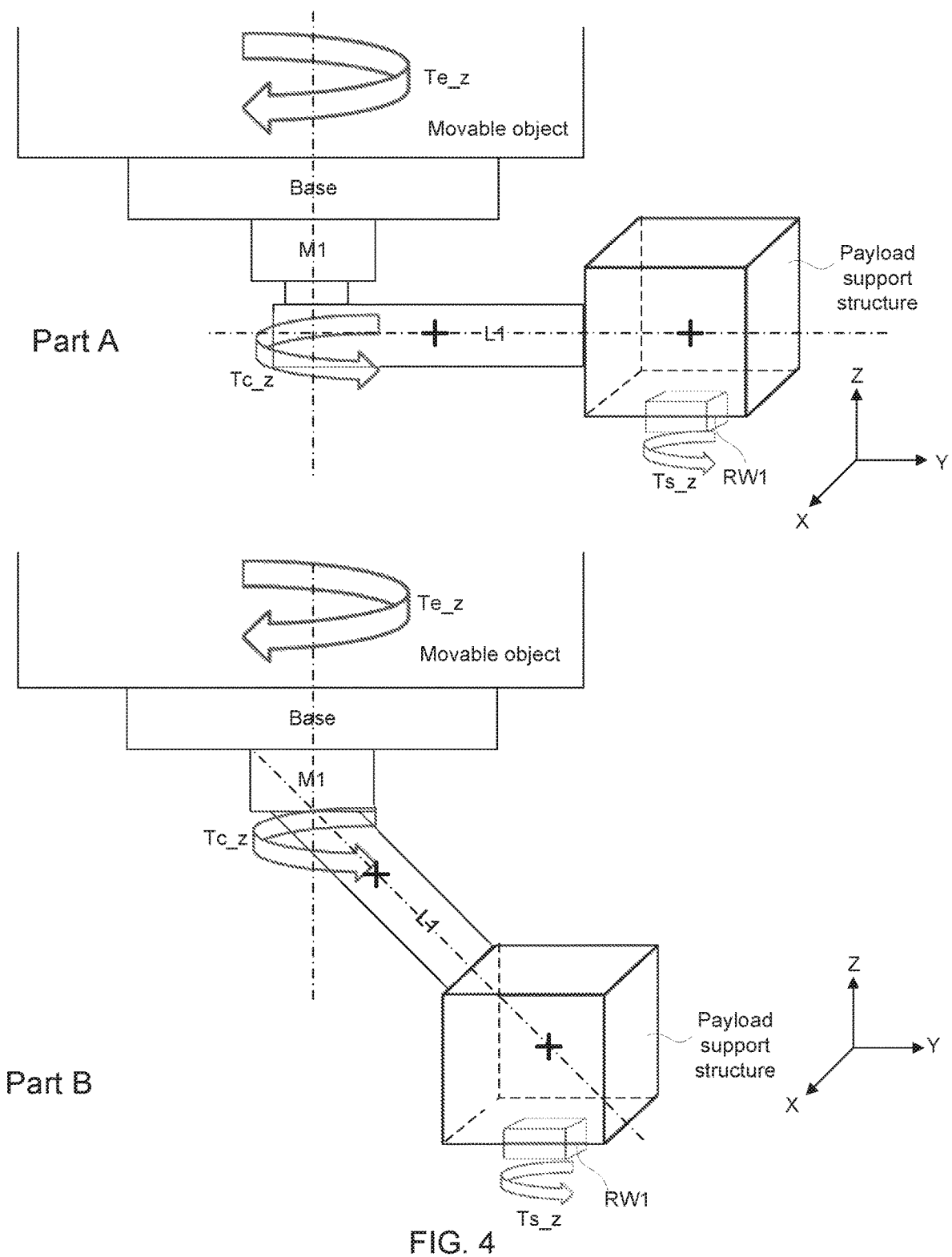
FIG. 4 illustrates a schematic view of stabilizing platforms in accordance with some embodiments.

Referring to part A of FIG. 4, the centers of mass (denoted by the '+' symbol) of the carrier component L1 and the payload support structure may lie along the Y axis orthogonal to the Z axis. In some embodiments, the axis on which the centers of mass of the carrier component L1 and the payload support structure lie may intersect with the yaw axis of the movable object. In some other embodiments, the axis on which the centers of mass of the carrier component L1 and the payload support structure lie need not intersect with the yaw axis of the movable object. In those other embodiments, the axis on which the centers of mass of the carrier component L1 and the payload support structure lie may be laterally offset from the yaw axis by a distance in the X-Y plane.

In some embodiments, the axis on which the centers of mass of the carrier component L1 and the payload support structure lie need not be orthogonal to the Z axis or the yaw axis. For example, as shown in part B of FIG. 4, the centers of mass of the carrier component L1 and the payload support structure may lie along another axis that is oblique to the yaw axis or the Z axis.

In the examples of FIGS. 1 and 4, the centers of mass of the carrier component L1 and the payload support structure may lie along a same axis. However, the disclosure is not limited thereto. In some embodiments, the centers of mass of the carrier component L1 and the payload support structure may respectively lie on different axes. The different axes may be parallel with, orthogonal to, or oblique to each other, may intersect with each other, or need not intersect with each other. Any spatial configuration of the carrier component L1 and the payload support structure relative to the movable object may be contemplated.

Figure 5:
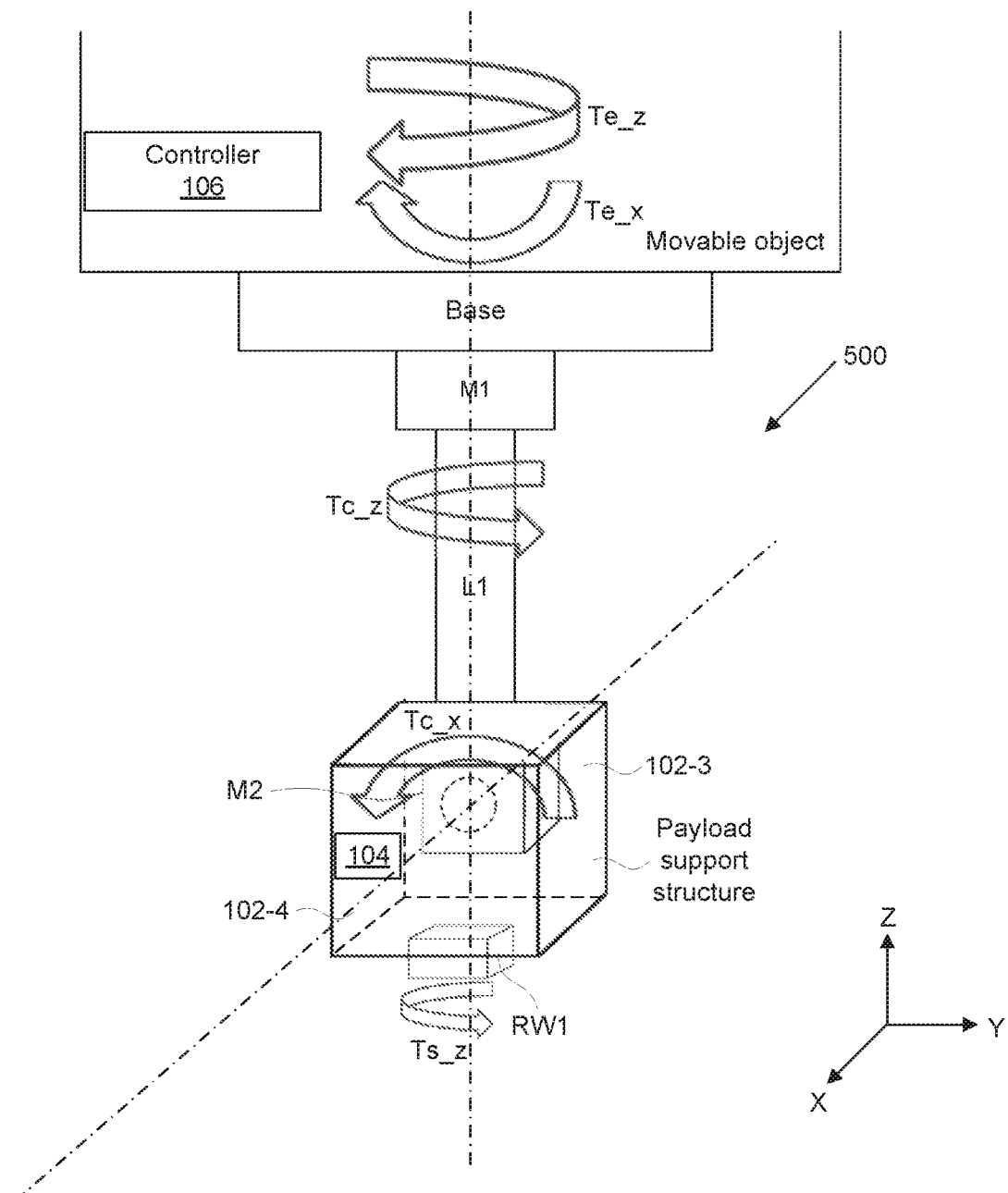
FIG. 5 illustrates a schematic view of a stabilizing platform in accordance with another embodiment.

FIG. 5 illustrates a schematic view of a stabilizing platform 500 in accordance with another embodiment. The stabilizing platform may be configured to hold a payload device such as an imaging device or a non-imaging device. The stabilizing platform 500 of FIG. 5 is similar to the stabilizing platform 100 of FIG. 1 except for the following differences. In the example of FIG. 1, the stabilizing platform 100 is a one-axis stabilizing platform that provides a single axis of rotation for a payload device mounted in (or on) the payload support structure. The payload support structure in the stabilizing platform 100 may be affixed or rigidly coupled to the carrier component L1, such that the carrier component L1 and the payload support structure move as a whole when actuated by the actuator M1.

In contrast, in the example of FIG. 5, the stabilizing platform 500 is a two-axis stabilizing platform that provides two axes of rotation for a payload device mounted in (or on) the payload support structure. The two axes of rotation may be orthogonal to each other. The payload support structure in the stabilizing platform 500 may be rotatably coupled to the carrier component L1, instead of being rigidly affixed to the carrier component L1. For example, the payload support structure in the stabilizing platform 500 may be rotatably coupled to the carrier component L1 by another actuator M2. The actuator M2 may be configured to generate a correction torque Tc_x to counteract an external torque Te_x. As shown in FIG. 5, the external torque Te_x may be applied to the movable object about its roll axis (X-axis) in a clockwise direction. In some embodiments, both the external torque Te_z and the external torque Te_x may be applied to the movable object, at either substantially the same time or at different times. For example, in one embodiment, the external torque Te_z may be applied to the movable object before the external torque Te_x. In another embodiment, the external torque Te_x may be applied to the movable object before the external torque Te_z. The external torque Te_z and the external torque Te_x may be applied to the movable object for a same time duration, or for different time durations. For example, in one embodiment, the external torque Te_z may be applied to the movable object for a shorter time duration than the external torque Te_x. In another embodiment, the external torque Te_z may be applied to the movable object for a longer time duration than the external torque Te_x. The external torque Te_z and the external torque Te_x may have the same force magnitude, or different force magnitudes. For example, in one embodiment, the external torque Te_z may have a greater force magnitude than the external torque Te_x. In another embodiment, the external torque Te_z may have a lower force magnitude than the external torque Te_x. Any order, time duration, force magnitude, point of application, or other parameters of the external torques may be contemplated.

The external torque Te_x may be similar to the external torque Te_z except for their directions (and in some instances, their magnitudes). As previously described, the external forces/torques may be generated by external disturbances, such as wind effects, temperature changes, or external impacts on the payload support structure. The external disturbances may cause the payload support structure to shift outside of a target location. In some instances, the external torques may be generated as a result of certain motion characteristics of the movable object (e.g., sudden acceleration, deceleration, circular flight motion, pitch/roll/yaw, tilt, etc.). The external torques can affect the orientation (e.g., attitude) of the payload support structure, and the stability of the payload device disposed within the payload support structure. When the payload support structure is carrying a payload such as an imaging device, the external torques may affect the quality of images captured by the imaging device.

The actuator M2 may comprise a non-rotating portion coupled to the carrier component L1 and a rotating portion coupled to the payload support structure. In some other embodiments, the non-rotating portion of the actuator M2 may be coupled to the payload support structure and the rotating portion may be coupled to the carrier component L1. When the actuator M2 is a motor, the non-rotating portion may correspond to a stator of the motor, and the rotating portion may correspond to a rotor of the motor.

The actuator M2 may be configured to rotate the payload support structure about the X axis in response to a signal transmitted from the controller assembly to the actuator M2. Accordingly, the actuator M2 may be configured to directly drive the payload support structure to rotate relative to the base/movable object. Specifically, the actuator M2 can apply the correction torque Tc_x to drive the payload support structure to counteract the external torque Te_x. In some embodiments, the correction torque Tc_x may be substantially equal and opposite in direction to the external torque Te_x. For example, when the external torque Te_x is applied to the movable object in a clockwise direction about the X axis, the actuator M2 may apply the correction torque Tc_x to the payload support structure in a counter clockwise direction about the X axis. Specifically, the correction torque Tc_x can help to prevent the payload support structure from moving in the direction of the external torque Te_x, so as to maintain the position and stability of the payload support structure.

The axis of rotation of the actuator M2 may be parallel to the roll axis of the movable object, and may be orthogonal to the yaw axis of the movable object. In some embodiments, the actuator M2 may be configured to rotate the payload support structure about another axis (not shown) that is oblique to the yaw axis. In some embodiments, the axis of rotation of the actuator M2 may extend through a center of mass of the payload support structure. In some alternative embodiments, the axis of rotation of the actuator M2 may be offset from a parallel imaginary line extending through a center of mass of the payload support structure. Any arrangement of the actuators M1 and M2, movable object, base, carrier component L1, and/or the payload support structure relative to one another may be contemplated.

Similar to the stabilizing platform 100 in FIG. 1, the stabilizing platform 500 in FIG. 5 may be subject to torque transmission delays in the correction torque Tc_z from the actuator M1 to the payload support structure. However, in the example of FIG. 5, there may be negligible delay in the correction torque Tc_x since the actuator M2 is coupled directly to the payload support structure. Accordingly, the correction torque Tc_x can be transmitted almost instantaneously from the actuator M2 to the payload support structure.

In the embodiment of FIG. 5, the actuator M2 may be disposed on a portion 102-3 of the payload support structure. The portion 102-3 may be orthogonal to the portion 102-1 of the payload support structure. However, the placement of the actuator M2 need not be limited to the configuration illustrated in FIG. 5. For example, the actuator M2 may be disposed on portions of the payload support structure other than portion 102-3.

In some embodiments, another rotational device (in additional to the rotational device RW1) for providing another supplemental torque may be disposed on a portion 102-4 of the payload support structure that is opposite to the portion 102-3. The additional rotation device may be provided on the portion 102-4 if there is a transmission delay in the correction torque Tc_x. Any number of rotational devices and their arrangement on the payload support structure of FIG. 5 may be contemplated. In some embodiments, the rotational device(s) may be disposed within the payload support structure instead of an exterior surface of the payload support structure. In some further embodiments, the rotational device(s) may be disposed directly on the payload device itself.

Figure 6:
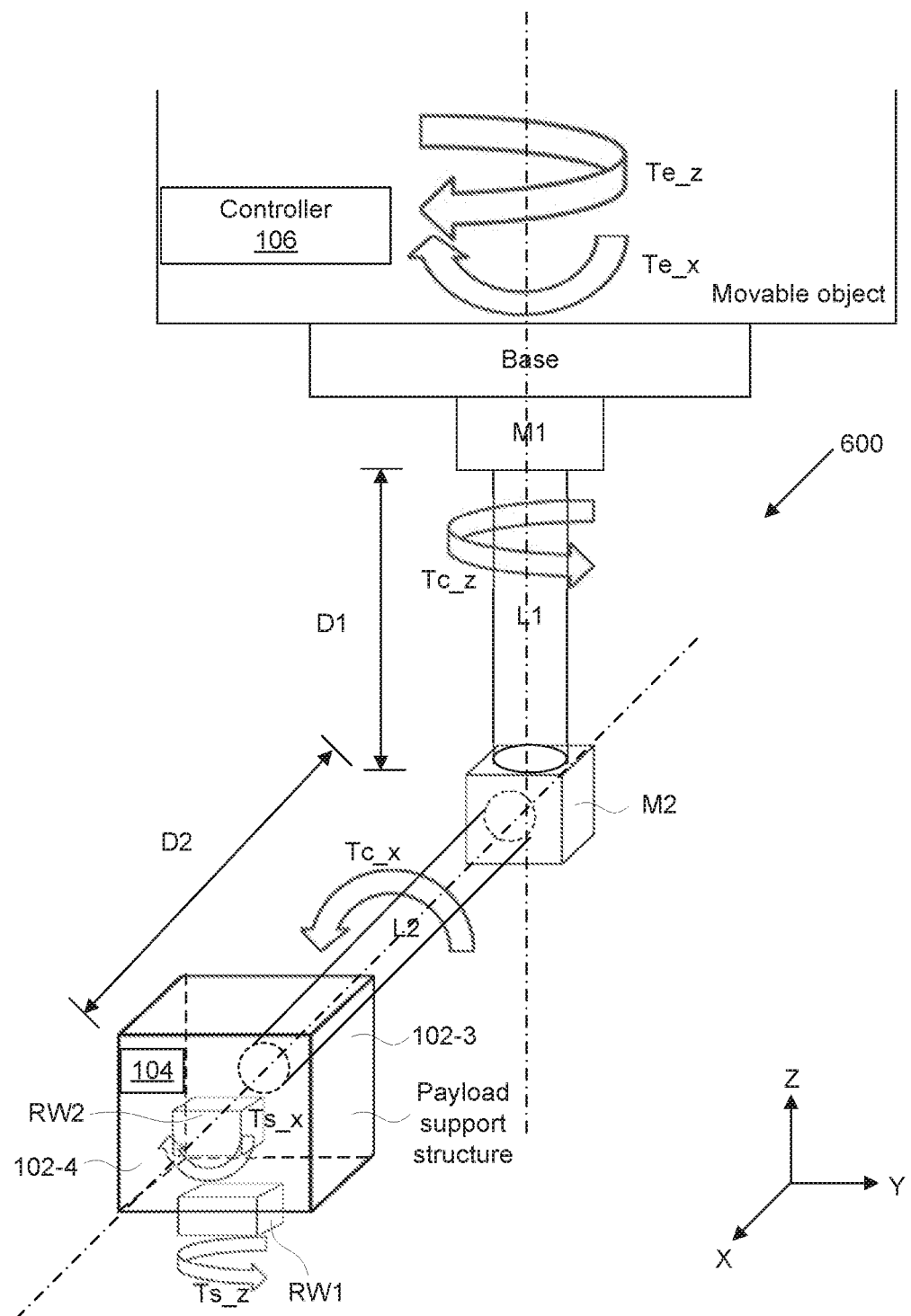
FIG. 6 illustrates a schematic view of a stabilizing platform in accordance with another embodiment.

FIG. 6 illustrates a schematic view of a stabilizing platform 600 in accordance with another embodiment. The stabilizing platform may be configured to hold a payload device such as an imaging device or a non-imaging device. The stabilizing platform 600 of FIG. 6 is similar to the stabilizing platform 500 of FIG. 5 in that the stabilizing platform 600 is also a two-axis stabilizing platform that provides two axes of rotation for a payload device mounted in (or on) the payload support structure. However, there are some differences between the stabilizing platform 500 and the stabilizing platform 600. In the embodiment of FIG. 6, the stabilizing platform 600 may include a carrier component L2 coupled between the actuator M2 and the payload support structure. The payload support structure may be affixed or rigidly coupled to the carrier component L2, such that the carrier component L2 and the payload support structure move as a whole when actuated by the actuator M2. The stabilizing platform 600 may further include a rotational device RW2 configured to generate a supplemental torque Ts_x about the X axis. The rotational device RW2 may be any device that is capable of compensating for (or mitigating) torque transmission delays. The supplemental torque Ts_x can be used to compensate for the transmission delay of the correction torque Tc_x from the actuator M2 to the payload support structure.

The rotational device RW2 may be disposed directly on the payload support structure. In the example of FIG. 6, the rotational device RW2 may be configured to provide the supplemental torque Ts_x to the payload support structure in a clockwise direction about the positive X axis. The supplemental torque Ts_x may be applied in the same direction as the correction torque Tc_x, and in an opposite direction to the external torque Te_x, in order to counteract the external torque Te_x. The supplemental torque Ts_x can be used to maintain the position and stability of the payload support structure during the transmission delay of the correction torque Tc_x (i.e., before the correction torque Tc_x reaches the payload support structure).

Unlike the correction torque Tc_x which suffers from transmission delay through the various parts of the stabilizing platform, an effect of the supplemental torque Ts_x can be transmitted almost instantaneously in real-time to the payload support structure, since the rotational device RW2 is disposed directly on the payload support structure. The supplemental torque Ts_x can be used in complementary with the correction torque Tc_x. For example, the supplemental torque Ts_x can be used to counteract the external torque Te_x at the payload support structure, when the payload support structure first experiences the external torque Te_x, and before the correction torque Tc_x from the actuator M2 reaches the payload support structure. When the correction torque Tc_x from the actuator M2 reaches the payload support structure, the supplemental torque Ts_x can be reduced or removed, for example by decreasing a current supplied to the rotational device RW2.

In some embodiments, the supplemental torque Ts_x may be used in conjunction with the correction torque Tc_x to mitigate the effects of the external torque Te_x, even after the correction torque Tc_x has reached the payload support structure. For example, the supplemental torque Ts_x can be used to increase the sensitivity of the stabilizing platform, by providing minute torque corrections to the payload support structure in real-time or near real-time, in response to the external torque Te_x. These minute torque corrections from the rotational device RW2 can be used to supplement or augment the correction torque Tc_x provided by the actuator M2. These real-time (or near real-time) minute torque corrections are particularly useful when the external torque/disturbance is occurring at a high frequency, that necessitates increased sensitivity and response speed of the stabilizing platform. An example of such external torque/disturbance may be vibration/jitter of the movable object caused by moving parts in the movable object's propulsion unit.

As shown in FIG. 6, the carrier component L2 may be rotatably coupled to the carrier component L1 by the actuator M2. The actuator M2 may comprise a non-rotating portion coupled to the carrier component L1 and a rotating portion coupled to the carrier component L2. In some alternative embodiments, the non-rotating portion of the actuator M2 may be coupled to the carrier component L2 and the rotating portion may be coupled to the carrier component L1. When the actuator M2 is a motor, the non-rotating portion may correspond to a stator of the motor, and the rotating portion may correspond to a rotor of the motor.

The carrier component L2 may be configured to rotate about the X axis extending along an axis of rotation of the rotating portion of the actuator M2. The axis of rotation may be parallel to the roll axis of the movable object. In some cases, the axis of rotation may coincide with the roll axis of the movable object. In the example of FIG. 6, the payload support structure is rigidly coupled to the carrier component L2. Since the payload support structure is rigidly coupled to the carrier component L2, the payload support structure (and the payload device disposed therein) can rotate about the X axis when the carrier component L2 rotates. The actuator M2 may be configured to rotate the carrier component L2 about the X axis in response to a signal transmitted from the controller assembly to the actuator M2. Accordingly, the actuator M2 may be configured to directly drive the carrier component L2 and the payload support structure to rotate about the X axis relative to the base/movable object. Specifically, the actuator M2 can apply the correction torque Tc_x to drive the carrier component L2 and the payload support structure, so as to counteract the external torque Te_x.

In other embodiments, the axis of rotation of the carrier component L2 may be offset from a parallel imaginary line extending through a center of mass of the movable object. In some embodiments (not shown), the axis of rotation of the carrier component L2 may extend through a center of mass of the movable object. In some embodiments, the axis of rotation of the carrier component L2 may extend through a center of mass of the payload support structure. In other embodiments, the axis of rotation of the carrier component L2 may be offset from a parallel imaginary line extending through a center of mass of the payload support structure. Any arrangement of the movable object, base, carrier component L1, carrier component L2, and the payload support structure relative to one another may be contemplated.

In the embodiment of FIG. 6, the rotational device RW2 may be disposed on the portion 102-4 of the payload support structure. The portion 102-4 may be opposite to the portion 102-3 of the payload support structure to which an end of the carrier component L2 is attached. However, the placement of the rotational device RW2 need not be limited to the configuration illustrated in FIG. 6. The rotational device RW2 may be disposed on any portion of the payload support structure other than portion 102-4. For example, in some embodiments, the rotational device RW2 may be disposed on the portion 102-3. In some further embodiments, the rotational device RW2 may be disposed on one or more portions of the payload support structure that are orthogonal or oblique to the portions 102-3 and 102-4. In some embodiments, a plurality of rotational devices may be disposed respectively on a plurality of portions of the payload support structure. Any number of rotational devices and their arrangement on the payload support structure may be contemplated. In some embodiments, the rotational device(s) may be disposed within the payload support structure instead of an exterior surface(s) of the payload support structure. In some further embodiments, the rotational device(s) may be disposed directly on the payload device itself.

The rotational device RW2 may be configured to provide the supplemental torque Ts_x to the payload support structure. The supplemental torque Ts_x may be directly and almost instantaneously provided by the rotational device RW2 to the payload support structure.

The rotational device RW2 may reduce the amount of torque transmission delay. For instance, the rotational device RW2 may reduce the amount of torque transmission delay by at least 1%, 3%, 5%, 10%, 15%, 20%, 25%, 30%, 35%, 40%, 45%, 50%, 60%, 70%, 80%, or 90%, compared to not having the rotational device RW2. The reduction of the amount of torque transmission delay may be on the order of at least 0.001 ms, 0.005 ms, 0.01 ms, 0.03 ms, 0.05 ms, 0.1 ms, 0.3 ms, 0.5 ms, 0.7 ms, 1 ms, 2 ms, 3 ms, 5 ms, 7 ms, 10 ms, 15 ms, 20 ms, 30 ms, 50 ms, or 100 ms, compared to not having the rotational device RW2. In some embodiments, the supplemental torque Ts_x may be provided by the rotational device RW2 to the payload support structure within less than or equal to about: 0.001 ms, 0.005 ms, 0.01 ms, 0.03 ms, 0.05 ms, 0.1 ms, 0.3 ms, 0.5 ms, 0.7 ms, 1 ms, 2 ms, 3 ms, 5 ms, 7 ms, 10 ms, 15 ms, 20 ms, 30 ms, 50 ms, or 100 ms.

In the example of FIG. 6, a rotating portion of the rotational device RW2 is not directly coupled to the payload support structure, such that the rotating portion of the rotational device RW2 can rotate freely relative to the payload support structure or the payload device. The free rotation of the rotating portion of the rotational device RW2 can generate the supplemental torque Ts_x, as described below.

In some embodiments, the rotational device RW2 may comprise a non-rotating portion directly coupled to the payload support structure and the rotating portion configured to rotate freely to provide the supplemental torque to the payload support structure. In some embodiments, the rotational device RW2 may be a rotational motor comprising a stator and a rotor. The stator may correspond to the non-rotating portion of the rotational device RW2, and the rotor may correspond to the rotating portion of the rotational device RW2. The stator of the rotational device RW2 may be directly coupled to the payload support structure. For example, the stator of the rotational device RW2 may be rigidly and directly attached to the payload support structure, so that the supplemental torque Ts_x can be directly transmitted from the stator to the payload support structure without transmitting through any intervening parts. In some other embodiments, the stator of the rotational device RW2 may be directly coupled to the payload device. For example, the stator of the rotational device RW2 may be rigidly and directly attached to the payload device, so that the supplemental torque Ts_x can be directly transmitted from the stator to the payload device without transmitting through any intervening parts. The rotor of the rotational device RW2 may be configured to rotate freely about the X axis. The axis of rotation of the rotational device RW2's rotor may be parallel to the roll axis of the movable object. In some embodiments, the axis of rotation of the rotational device RW2 may coincide with the roll axis of the movable object. In the example of FIG. 6, the rotor is configured to rotate freely in the counter clockwise direction about the X axis, which consequently generates the supplemental torque Ts_x in the clockwise direction about the X axis, based on the laws of conservation of angular momentum. Specifically, when the rotor rotates freely about the X axis, the supplemental torque Ts_x may be directly transmitted to the payload support structure through the stator.

In some embodiments, the axis of rotation of the rotational device RW2 may be parallel to the axis of rotation of the carrier component L2. In some alternative embodiments, the axis of rotation of the rotational device RW2 need not be parallel to the axis of rotation of the carrier component L2. In some embodiments, the axis of rotation of the rotational device RW2 may extend through a center of mass of the payload support structure. In other embodiments, the axis of rotation of the rotational device RW2 may be offset from a parallel imaginary line extending through a center of mass of the payload support structure.

As described above, the supplemental torque Ts_x may be generated by the rotation of the rotor of the rotational device RW2. The supplemental torque Ts_x may be generated by applying an electric current having a first direction (e.g., either a positive electric current or a negative electric current) to the rotational device RW2, thereby causing the rotor to accelerate. The rotor may be configured to accelerate to a predetermined rotational speed.

In some cases, the external disturbance may be continuous (for example, continuous vibration of the movable object and/or the payload support structure during flight, air turbulence, etc.). In those cases, the external disturbance would exert a continuous force/torque on the movable object and the payload support structure. When the external torque Te_x is continuously applied to the movable object and the payload support structure, a continuous current may be supplied to the rotational device RW2, so as to achieve a continuous reaction torque (supplemental torque) against the external torque, in order to maintain an attitude and/or orientation of the payload support structure. However, when the external disturbance is continuous, the rotor of the rotational device RW2 may continue to rotate faster and faster as a result of the continuous current supply. When the rotation speed of the rotor reaches a predetermined rotation speed, a counter electromotive potential generated by the rotation may be substantially the same as a voltage supplied to the rotational device RW2. This phenomenon is known as "rotating speed saturation," and may result in failure of the rotational device RW2 to provide sufficient supplemental torque to counteract the external torque.

To avoid "rotating speed saturation," an electric current having a second direction opposite to the first direction may be applied to the rotational device RW2 to cause the rotor to decelerate, when the rotor exceeds the predetermined rotation speed. For example, a positive electric current may be applied to the rotational device RW2 to cause the rotor to accelerate and to rotate in a clockwise direction. When the rotor exceeds the predetermined rotation speed, a negative electric current may be applied to the rotational device RW2 to cause the rotor to decelerate and to rotate in a counter-clockwise direction, thereby causing the rotor to slow down.

In some embodiments, the rotational device RW2 may be a reaction wheel comprising an actuator. In the example of FIG. 6, the reaction wheel may comprise an inertia wheel mounted onto the rotor and configured to rotate freely with the rotor. The rotor and the inertia wheel may be configured to rotate freely about the X axis. The inertia wheel can be used to increase a length of time for which the supplemental torque Ts_x is provided to the payload support structure. The length of time for which the supplemental torque Ts_x is provided to the payload support structure may be a function of a mass of the inertia wheel. For example, the length of time for which the supplemental torque Ts_x is provided to the payload support structure may increase with the mass of the inertia wheel. The supplemental torque Ts_x may be generated by applying an electric current having a first direction to the rotational device RW2, thereby causing both the rotor and the inertia wheel to accelerate. The rotor and the inertia wheel may be configured to accelerate to a predetermined rotational speed.

The predetermined rotational speed may correspond to a speed at which "rotating speed saturation" occurs (i.e., when the counter electromotive potential generated by the rotation of the rotor and inertia wheel is substantially equal to the voltage supplied to the rotational device RW2). When the rotor and the inertia wheel exceed the predetermined rotation speed, an electric current having a second direction opposite to the first direction may be applied to the rotational device RW2 to cause the rotor and the inertia wheel to decelerate. For example, a positive electric current may be applied to the rotational device RW2 to cause the rotor and the inertia wheel to accelerate and rotate in a clockwise direction. When the rotor and the inertia wheel exceed the predetermined rotation speed, a negative electric current may be applied to the rotational device RW2 to cause the rotor and the inertia wheel to decelerate to rotate in a counter-clockwise direction, thereby causing the rotor and the inertia wheel to slow down.

The rotational device RW2 may be configured to provide the supplemental torque Ts_x to the payload support structure to compensate for the transmission delay in the correction torque Tc_x. As previously mentioned, the correction torque Tc_x may be generated by the actuator M2. The correction torque Tc_x may be generated and transmitted to the payload support structure when the actuator M2 rotates the carrier component L2 about the X axis. In some embodiments, the supplemental torque Ts_x may be generated at substantially a same time as the correction torque Tc_x. For example, when the external disturbance exerting the external torque Te_x is detected by one or more inertial sensors in the controller assembly, both the correction torque Tc_x and the supplemental torque Ts_x may be generated at substantially the same time to counteract the external torque Te_x. However, the payload support structure may receive the supplemental torque Ts_x before receiving the correction torque Tc_x. For example, the payload support structure may receive the correction torque Tc_x later than the supplemental torque Ts_x due to torque transmission delay from: (1) the actuator M2 to the carrier component L2, and (2) from the carrier component L2 to the payload support structure. In other words, the supplemental torque Ts_x can be transmitted to the payload support structure before the correction torque Tc_x, even though both the correction torque Tc_x and the supplemental torque Ts_x may be generated at substantially the same time.

The torque transmission delay may be a result of a torsional deformation of a rotating portion of the actuator M2 and a torsional deformation of the carrier component L2. In some embodiments, the torque transmission delay may be in the range from several milliseconds to several seconds.

Referring to FIG. 6, a length of the transmission delay may be a function of a distance D2 measured between the actuator M2 and the payload support structure. For example, the transmission delay may increase when the distance D2 increases. In some cases, the distance D2 from the actuator M2 to the payload support structure may be determined based at least in part on a length of the carrier component L2. For the rotational device RW2 to effectively compensate for the transmission delay, a distance between the rotational device RW2 and the payload support structure should be minimal, and substantially less than the distance D2. For example, in the embodiment of FIG. 6, the rotational device RW2 is disposed directly on the payload support structure to minimize its distance from the payload support structure. Accordingly, the supplemental torque Ts_x can be directly and almost instantaneously transmitted to the payload support structure without any significant transmission delay.

The payload support structure may be configured to experience an effect of the supplemental torque Ts_x before experiencing an effect of the correction torque Tc_x. In some instances, the supplemental torque Ts_x may be reduced or removed, when the correction torque Tc_x is transmitted to and experienced at the payload support structure. In some embodiments, the supplemental torque Ts_x may be applied to the payload support structure for a time period corresponding to the transmission delay. When the correction torque Tc_x reaches the payload support structure at the end of the transmission delay, the supplemental torque Ts_x may be reduced or removed. The supplemental torque Ts_x may be reduced or removed by adjusting the electric current to the rotational device RW2, to cause the rotor and/or the inertia wheel of the rotational device RW2 to decelerate. The payload support structure may experience an effect of the supplemental torque Ts_x during the delay before experiencing an effect of the correction torque Tc_x. The supplemental torque Ts_x may be substantially equal to and applied in a same direction as the correction torque Tc_x. In some instances, the supplemental torque Ts_x may be less than the correction torque Tc_x. In some cases, the supplemental torque Ts_x may be substantially equal and opposite in direction to the external torque Te_x, so as to mitigate effects of the external disturbance on the payload support structure.

Figure 7:
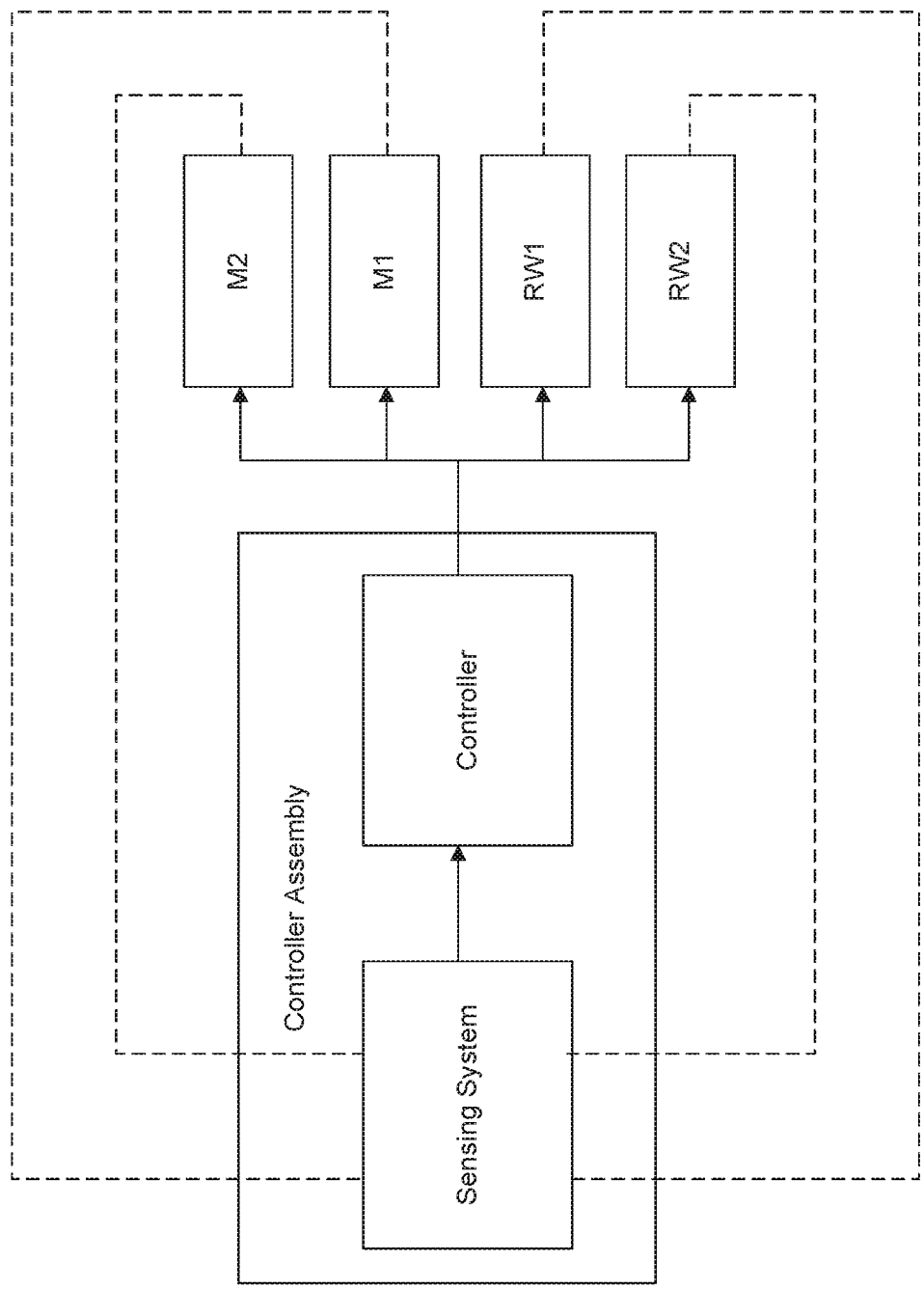
FIG. 7 illustrates a block diagram of a controller assembly and a motor assembly in the stabilizing platform of FIG. 6, in accordance with an embodiment.

In addition to the frame assembly and the motor assembly, the stabilizing platform 600 may further comprise the controller assembly. Referring to FIGS. 6 and 7, the controller assembly may comprise the sensing system 104 and the controller 106. The controller assembly may be in communication with the sensing system, and with the actuation elements (e.g., the actuators M1 and M2, and the rotational devices RW1 and RW2) of the motor assembly. The sensing system may be configured to measure or obtain state information associated with the payload device, the payload support structure, and/or with objects other than the payload support structure or the payload device, such as the frame assembly, the actuators M1 and M2, the rotational devices RW1 and RW2, the movable object, and the like. The state information may include angular and/or linear velocity and/or acceleration of any of the above objects, positional information, and the like. Such state information may be relative or absolute. In some embodiments, the sensing system may be configured to measure or obtain state information associated with one or more of the above objects when the objects are subject to external disturbances (for example, weather and/or temperature changes, or impact by external matter such as debris or obstacles, etc.). In the example of FIG. 6, the sensing system may be provided on a portion of the payload support structure. It is noted that the sensing system can be provided anywhere on the stabilizing platform. In some other embodiments, the sensing system can be provided on the movable object itself. Any placement of the sensing system on the movable object and/or the stabilizing platform may be contemplated. In various embodiments, the sensing system may be coupled to the payload device, the payload support structure, the frame assembly, the motor assembly, the movable object, or the like.

The sensing system can include one or more sensors that may sense the spatial disposition, velocity, and/or acceleration of the objects (e.g., with respect to up to three degrees of translation and up to three degrees of rotation). The sensing system may include an inertial measurement unit, motion sensors, proximity sensors, a compass, a global positioning system (GPS) transceiver, or other types of measurement components or sensors. For example, the sensing system may include one or more gyroscopes for detecting angular velocity and one or more accelerometer for detecting linear and/or angular acceleration of an object (e.g., payload device, payload support structure, frame assembly, and/or the movable object). Alternatively, the sensing system can be used to provide data regarding the environment surrounding the objects, such as weather conditions, proximity to potential obstacles, location of geographical features, location of manmade structures, and the like. In some embodiments, the sensing system may be configured to measure state information with respect to more than one rotational axis of the object. In some embodiments, the sensing system may obtain information that relate to at least two of the rotational axes. For example, the measurement member may obtain information related to both the pitch and roll axes of the object. In addition, the state information may pertain to all of the pitch, roll and yaw axes of the object.

In some embodiments, the controller may be configured to calculate posture information of the object based on the state information detected by the sensing system, and to provide one or more motor signals based on the posture information. Such posture information may include the pitch, roll, yaw axes of the object, orientation or inclination of the object with respect to the axes, velocity and/or acceleration, and the like. In some cases, the posture information may be calculated based on angular velocity information (e.g., as provided by the sensing system or from other sources). In other cases, the posture information may be calculated based on both angular velocity information and linear acceleration information. For example, the linear acceleration information may be used to modify and/or correct the angular velocity information.

Based on the calculated posture information, the controller may generate and transmit one or more motor signals to the actuation elements (e.g., the actuators M1 and M2, and/or the rotational devices RW1 and RW2) of the stabilizing platform. The motor signals can cause forward rotation, reverse rotation of the actuation elements, and can be used to adjust the speed/torque of the rotations to counteract the external disturbances/torque. In response to the one or more motor signals, the actuation elements (e.g., the actuators M1 and M2, and/or the rotational devices RW1 and RW2) can directly drive their respective portions of the frame assembly to rotate in response to the one or more motor signals. As a result, the payload device is allowed to rotate around at least one of the axis about which the external torque is exerted. Such rotation may be necessary for stabilizing the payload device and/or for maintaining a predetermined position or posture.

For example, in the embodiment of FIG. 6, when the payload support structure is subject to external torques $Te\_z$ and $Te\_x$, the controller may simultaneously apply electric currents to the actuators M1 and M2, and the rotational devices RW1 and RW2, to generate the correction torques $Tc\_z$ and $Tc\_x$ and the supplemental torques $Ts\_z$ and $Ts\_x$, to counteract the external torques. The payload support structure may experience the effect of the supplemental torques $Ts\_z$ and $Ts\_x$ before the correction torques $Tc\_z$ and $Ts\_x$, due to transmission delays in the correction torques. The sensing system may be configured to detect the effect of each of the supplemental torques $Ts\_z$ and $Ts\_x$ on the payload support structure.

The correction torque $Tc\_z$ may reach the payload support structure at the end of a first transmission delay. When the sensing system detects the effect of the correction torque $Tc\_z$ on the payload support structure, the controller may then reduce or remove the supplemental torque $Ts\_z$ by decreasing the current supplied to the rotational device RW1. Similarly, the correction torque $Tc\_x$ may reach the payload support structure at the end of a second transmission delay. When the sensing system detects the effect of the correction torque $Tc\_x$ on the payload support structure, the controller may then reduce or remove the supplemental torque $Ts\_x$ by decreasing the current supplied to the rotational device RW2. In the example of FIG. 6, the first transmission delay associated with the correction torque $Tc\_z$ may be longer than the second transmission delay associated with the correction torque $Tc\_x$, since the correction torque $Tc\_z$ has to be transmitted from the actuator M1 through the carrier component L1, actuator M2, and carrier component L2 before reaching the payload support structure. In contrast, the correction torque $Tc\_x$ only has to be transmitted from the actuator M2 through the carrier component L2 before reaching the payload support structure.

The controller may be configured to modulate the correction torques $Tc\_z$ and $Tc\_x$, and the supplemental torques $Ts\_z$ and $Ts\_x$, from the actuators M1 and M2 and the rotational devices RW1 and RW2, in real-time based on motion data from the sensing system, and the effects of the various torques on the payload support structure at different points in time. In particular, the sensitivity and performance of the stabilizing platform may be improved, by modulating the correction torques and the supplemental torques to achieve smooth torque control (to counteract the external torques).

As previously noted, conventional stabilizing systems may have significant torque transmission delays due to high inertia and/or low structural rigidity. As a result of the torque transmission delays, the phase margin of conventional closed-loop stabilizing systems may be reduced, thereby limiting the performance of the closed-loop control system.

In contrast, the closed-loop control system in FIG. 7 has improved phase margin over conventional stabilizing systems, since the closed-loop control system in FIG. 7 includes a plurality of rotational devices configured to apply supplemental torques to the payload support structure to compensate for the torque transmission delays.

Figure 8:
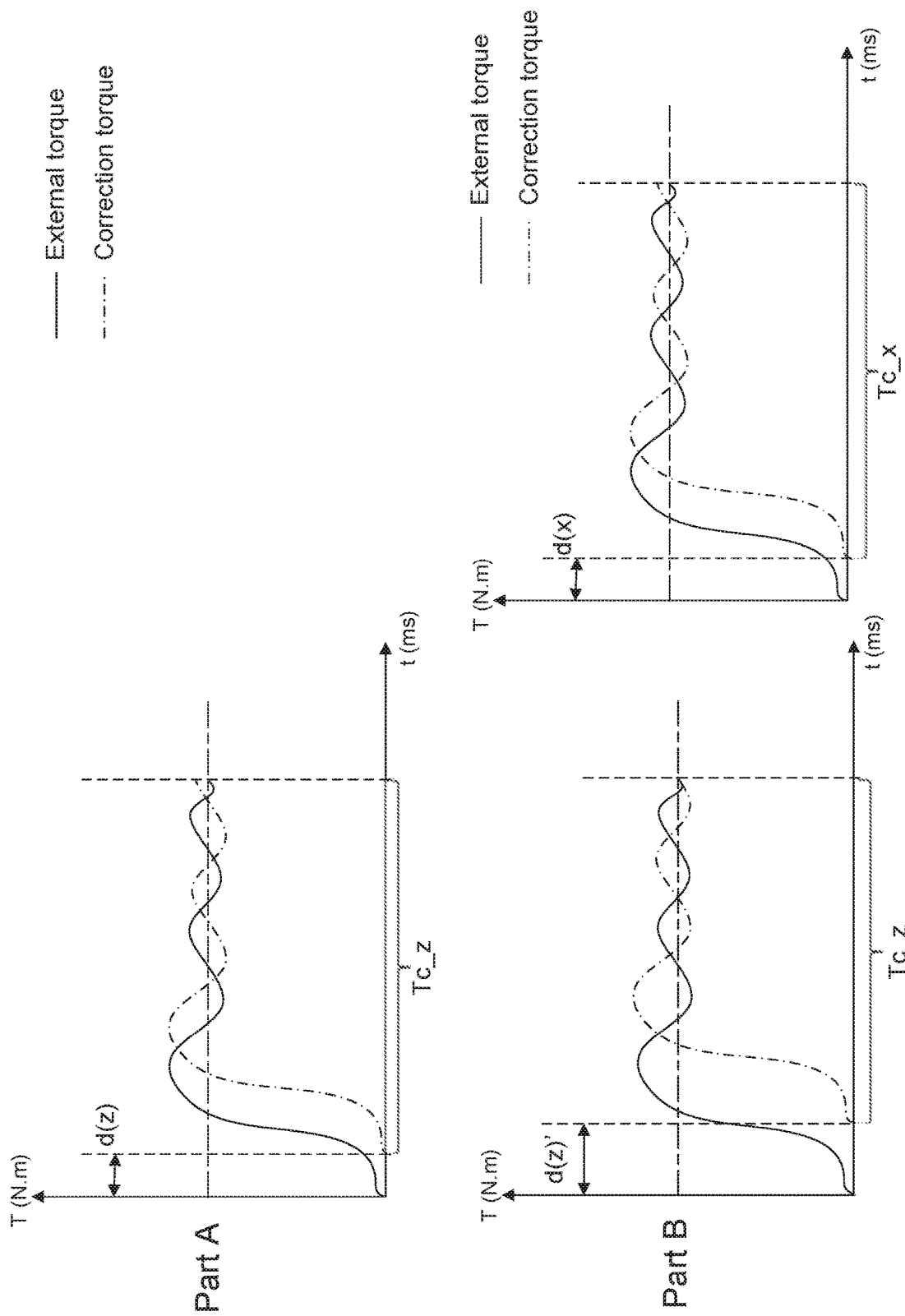
FIG. 8 illustrates the difference in transmission delays associated with the correction torques in the stabilizing platforms of FIG. 1 and FIG. 6, in accordance with some embodiments.

FIG. 8 illustrates the difference in transmission delays associated with the correction torques Tc_z and Tc_x in the stabilizing platforms of FIGS. 1 and 6. Specifically, Part A of FIG. 8 illustrates the transmission delay d(z) of the correction torque Tc_z in the stabilizing platform 100 of FIG. 1. Part B of FIG. 8 illustrates the transmission delay d(z)' of the correction torque Tc_z, and the transmission delay d(x) of the correction torque Tc_x, of the stabilizing platform 600 of FIG. 6. The difference in the transmission delays of the respective correction torques will be described as follows.

Referring back to FIGS. 1 and 6, it may be observed that the stabilizing platform 600 has higher inertia and lower structural rigidity than the stabilizing platform 100, since the stabilizing platform 600 comprises a larger number of serially connected carrier components and actuators. Comparing Parts A and B of FIG. 6, it may be observed that the transmission delay d(z)' of the stabilizing platform 600 is longer than the transmission delay d(z) of the stabilizing platform 100, since the correction torque Tc_z in the stabilizing platform 600 has to travel through additional parts (e.g., the actuators M1/M2 and carrier components L1/L2) before reaching the payload support structure. In addition, the transmission delay d(x) of the stabilizing platform 600 is shorter than the transmission delay d(z)', since the correction torque Tc_x travels a shorter distance (from the actuator M2 to the carrier component L2) before reaching the payload support structure.

Figure 9:
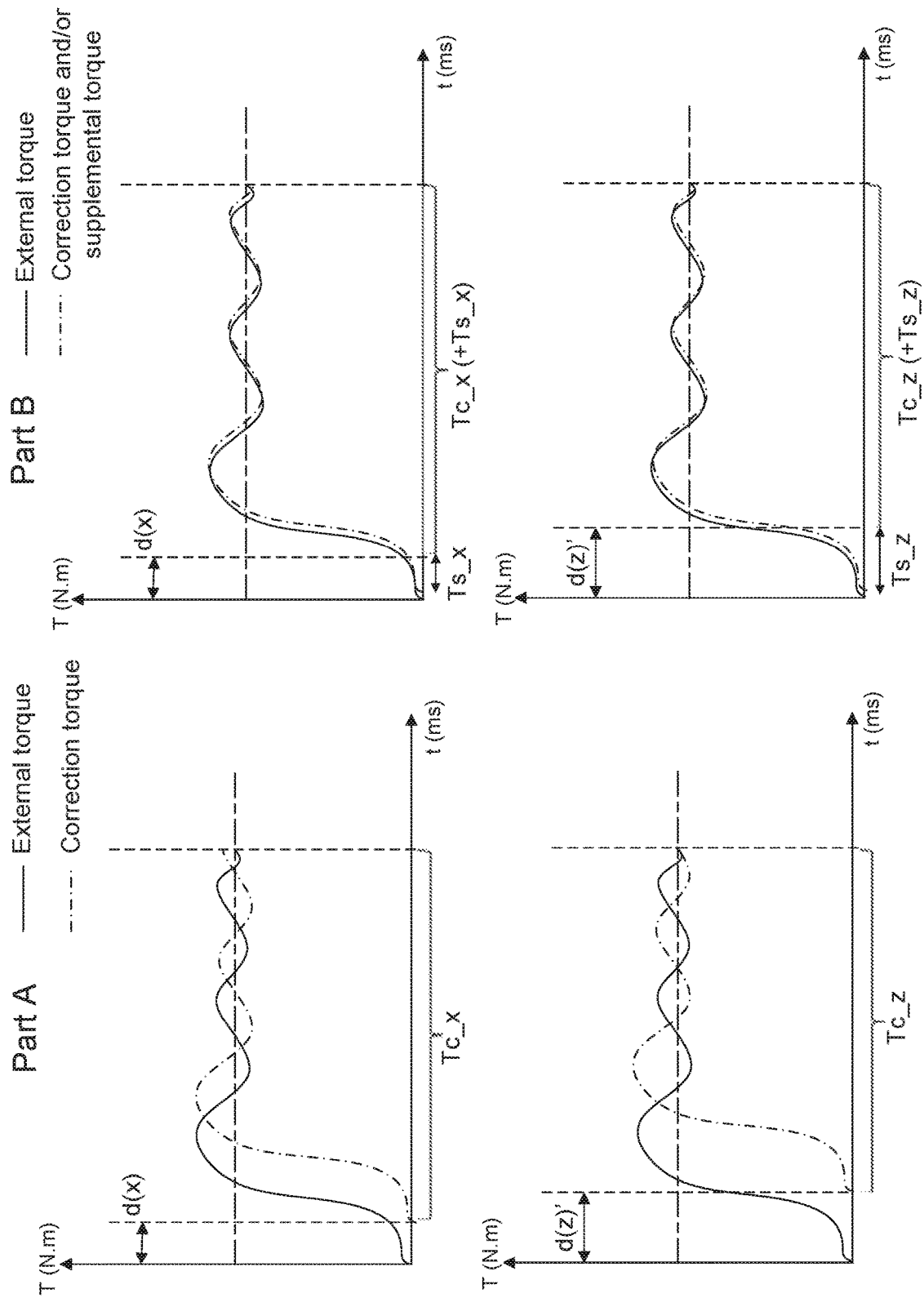
FIG. 9 illustrates the improvement in stabilizing performance of a stabilizing platform, in accordance with some embodiments.

FIG. 9 illustrates the improvement in stabilizing performance of an exemplary stabilizing platform (e.g., stabilizing platform 600) when various rotational devices are used to provide different supplemental torques to compensate for torque transmission delays. Referring to the torque T (N·m) versus time t (milliseconds) plots in FIG. 9, the solid curved lines correspond to the external torques on the payload support structure, and the dotted lines correspond to the correction torques and/or the supplemental torques on the payload support structure, as a function of time.

Part A of FIG. 9 illustrates the transmission delays associated with the correction torques Tc_z and Tc_x of the stabilizing platform 600 in FIG. 6, as previously described in part B of FIG. 8.

Referring to part B of FIG. 9, the rotational devices RW1 and RW2 may be disposed directly on the payload support structure to provide the supplemental torques Ts_z and Ts_x to compensate for the torque transmission delays from the actuators M1 and M2 to the payload support structure. As shown in part B of FIG. 9, the performance (response speed) of the stabilizing platform may be improved through use of the rotational devices. For example, when the sensing system detects the external torque Te_z and Te_x, the controller may control the actuators M1 and M2, and the rotational devices RW1 and RW2, to generate the correction torques Tc_z and Tc_x and the supplemental torques Ts_z and Ts_x, to counteract the external torques Te_z and Te_x. In the embodiment of FIG. 9, the external torques Te_z and Te_x may be assumed to occur at substantially a same time with substantially the same magnitudes, although this need not be a limitation of the disclosure. For example, as previously mentioned, the external torques Te_z and Te_x may occur in any order, at different times, for different time durations, and with different force magnitudes. Since the rotational devices RW1 and RW2 are disposed directly on the payload support structure, the supplemental torques provided by the rotational devices can be almost instantaneously transmitted to the payload support structure.

The supplemental torque Ts_x may be provided to the payload support structure for a duration of the delay d(x), and the supplemental torque Ts_z may be provided to the payload support structure for a duration of the delay d(z)'. The delay d(x) is shorter than the delay d(z)' since the actuator M2 is disposed nearer to the payload support structure than the actuator M1. At the end of the delay d(x), when the payload support structure starts to experience the effect of the correction torque Tc_x, the controller may then control the rotational device RW2 to reduce or remove the supplemental torque Ts_x, by reducing the current supplied to the rotational device RW2. In some embodiments, the controller may completely remove the supplemental torque Ts_x at the end of the delay d(x), and only apply the correction torque Tc_x to counteract the external torque Te_x starting from when the delay d(x) ends.

Similarly, at the end of the delay d(z)', when the payload support structure starts to experience the effect of the correction torque Tc_z, the controller may then control the rotational device RW1 to reduce or remove the supplemental torque Ts_z, by reducing the current supplied to the rotational device RW1. In some embodiments, the controller may completely remove the supplemental torque Ts_z at the end of the delay d(z)', and only apply the correction torque Tc_z to counteract the external torque Te_z starting from when the delay d(z)' ends.

In some further embodiments, the supplemental torques Ts_z and Ts_x may be provided to the payload support structure for the entire duration of the delay d(z)' (which is the longer period of the delays d(z)' and d(x)). At the end of the delay d(z)', when the payload support structure starts to experience the effects of the correction torques Tc_z and Tc_x, the controller may then control the rotational devices RW1 and RW2 to reduce or remove the supplemental torques Ts_z and Ts_x, by reducing the currents supplied to the rotational devices RW1 and RW2. In some embodiments, the controller may completely remove the supplemental torques Ts_z and Ts_x at the end of the delay d(z)', and only apply the correction torques Tc_z and Tc_x to counteract the external torques Te_z and Te_x starting from when the delay d(z)' ends.

In some alternative embodiments, the controller may be configured to modulate the supplemental torques Ts_z and Ts_x, and the correction torques Tc_z and Tc_x, to counteract the external torques Te_z and Te_x, starting from when the delay d(z)' ends. For example, the controller can control each of the rotational devices RW1 and RW2 to generate different amounts of supplemental torque as and when needed, depending on posture information/feedback from the sensing system. The different amounts of supplemental torque can be transmitted almost instantaneously to the payload support structure, and can be used to compensate for any subsequent delays in the correction torque. In some cases, the different amounts of supplemental torque may be minute, with the correction torque providing the bulk of the torque for counteracting the external torque. The different amounts of supplemental torque can also be provided at a high frequency to the payload support structure almost instantaneously, and may be particularly useful when the external torque is fluctuating rapidly. As a result, the stabilizing platform 600 has improved performance, since the response speed of the stabilizing platform is substantially unaffected by the transmission delays d(z)' and d(x) in the correction torques.

Figure 10:
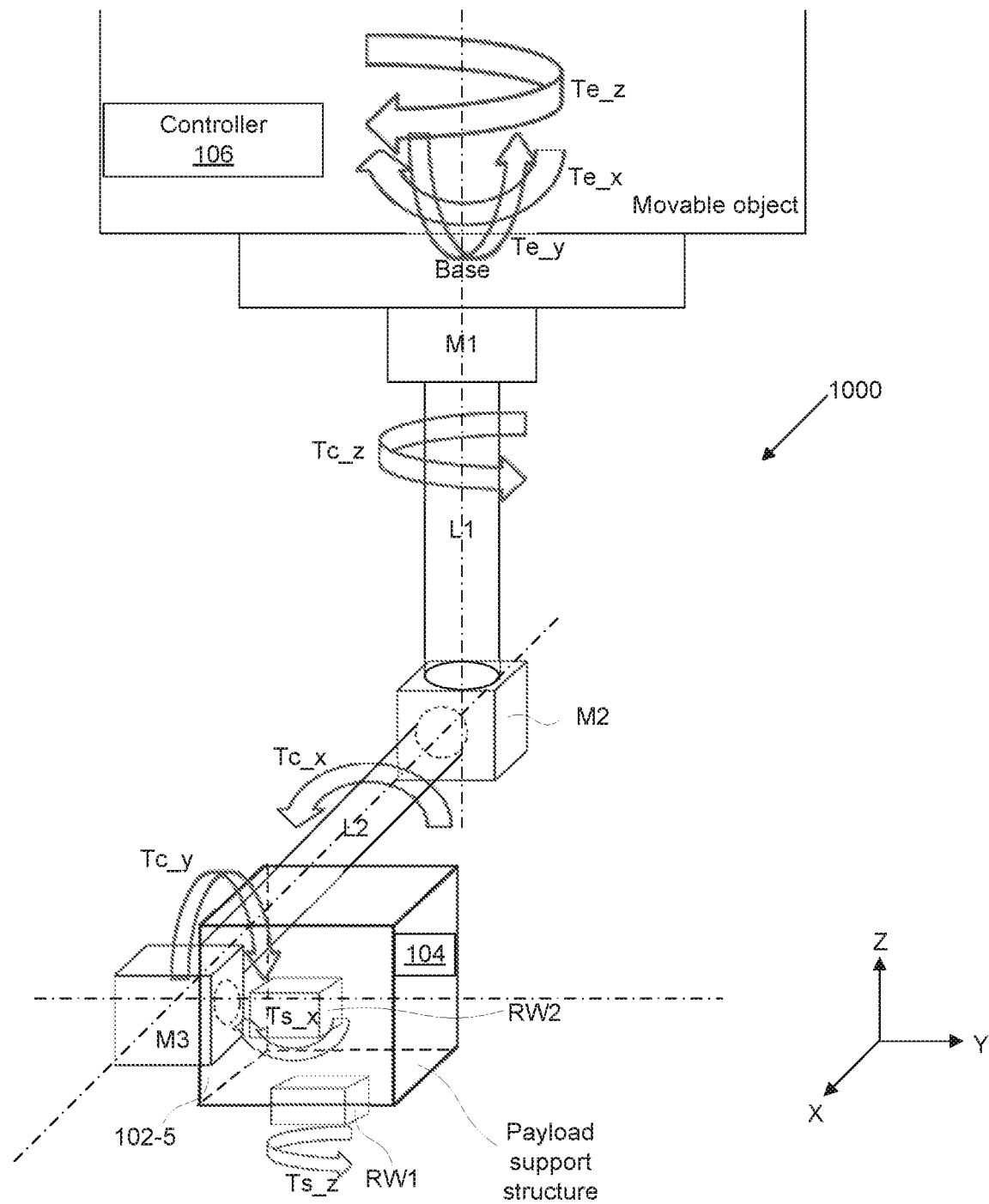
FIG. 10 illustrates a schematic view of a stabilizing platform in accordance with another embodiment.

FIG. 10 illustrates a schematic view of a stabilizing platform 1000 in accordance with another embodiment. The stabilizing platform may be configured to hold a payload device such as an imaging device or a non-imaging device. The stabilizing platform 1000 of FIG. 10 is similar to the stabilizing platform 600 of FIG. 6 except for the following differences. In the example of FIG. 6, the stabilizing platform 600 is a two-axis stabilizing platform that provides two axes of rotation for a payload device mounted in (or on) the payload support structure. The payload support structure in the stabilizing platform 600 may be affixed or rigidly coupled to the carrier component L2, such that the carrier component L2 and the payload support structure move as a whole when actuated by the actuator M2.

In contrast, in the example of FIG. 10, the stabilizing platform 1000 is a three-axis stabilizing platform that provides three axes of rotation for a payload device mounted in (or on) the payload support structure. The three axes of rotation may be orthogonal to each other. The payload support structure in the stabilizing platform 1000 may be rotatably coupled to the carrier component L2, instead of being rigidly affixed to the carrier component L2. For example, the payload support structure in the stabilizing platform 1000 may be rotatably coupled to the carrier component L2 by another actuator M3. The actuator M3 may be configured to generate a correction torque Tc_y to counteract an external torque Te_y. As shown in FIG. 10, the external torque Te_y may be applied to the movable object about its pitch axis (Y-axis) in a clockwise direction.

The external torque Te_y may be similar to the external torques Te_z and Te_x except for their directions (and in some instances, their magnitudes). As previously described, the external forces/torques may be generated by external disturbances, such as wind effects, temperature changes, or external impacts on the payload support structure. The external disturbances may cause the payload support structure to shift outside of a target location. In some instances, the external torques may be generated as a result of certain motion characteristics of the movable object (e.g., sudden acceleration, deceleration, circular flight motion, pitch/roll/yaw, tilt, etc.). The external torques can affect the orientation (e.g., attitude) of the payload support structure, and the stability of the payload device disposed within the payload support structure. When the payload support structure is carrying a payload such as an imaging device, the external torques may affect the quality of images captured by the imaging device.

The actuator M3 may comprise a non-rotating portion coupled to the carrier component L2 and a rotating portion coupled to the payload support structure. In some other embodiments, the non-rotating portion of the actuator M3 may be coupled to the payload support structure and the rotating portion may be coupled to the carrier component L2. When the actuator M3 is a motor, the non-rotating portion may correspond to a stator of the motor, and the rotating portion may correspond to a rotor of the motor.

The actuator M3 may be configured to rotate the payload support structure about the Y axis in response to a signal transmitted from the controller assembly to the actuator M3. Accordingly, the actuator M3 may be configured to directly drive the payload support structure to rotate relative to the base/movable object. Specifically, the actuator M3 can apply the correction torque Tc_y to drive the payload support structure to counteract the external torque Te_y. In some embodiments, the correction torque Tc_y may be substantially equal and opposite in direction to the external torque Te_y. For example, when the external torque Te_y is applied to the movable object in the clockwise direction about the Y axis, the actuator M2 may apply the correction torque Tc_y to the payload support structure in the counter clockwise direction about the Y axis. Specifically, the correction torque Tc_y can help to prevent the payload support structure from moving in the direction of the external torque Te_y, so as to maintain the position and stability of the payload support structure.

The axis of rotation of the actuator M3 may be parallel to the pitch axis of the movable object, and may be orthogonal to the yaw axis and the roll axis of the movable object. In some embodiments, the actuator M3 may be configured to rotate the payload support structure about another axis (not shown) that is oblique to the yaw axis and the roll axis. In some embodiments, the axis of rotation of the actuator M3 may extend through a center of mass of the payload support structure. In some alternative embodiments, the axis of rotation of the actuator M3 may be offset from a parallel imaginary line extending through a center of mass of the payload support structure. Any arrangement of the actuators M1/M2/M3, movable object, base, carrier components L1/L2, and/or the payload support structure relative to one another may be contemplated.

Similar to the stabilizing platform 600 in FIG. 6, the stabilizing platform 1000 in FIG. 10 may be subject to transmission delays in the correction torques Tc_z and Tc_x from the actuators M1 and M2 to the payload support structure. However, in the example of FIG. 10, there may be negligible delay in the correction torque Tc_y since the actuator M3 is coupled directly to the payload support structure. Accordingly, the correction torque Tc_y can be transmitted almost instantaneously from the actuator M3 to the payload support structure.

In the embodiment of FIG. 10, the actuator M3 may be disposed on a portion 102-5 of the payload support structure. The portion 102-5 may be orthogonal to the portions 102-1 and 102-3 of the payload support structure. However, the placement of the actuator M3 need not be limited to the configuration illustrated in FIG. 10. For example, the actuator M3 may be disposed on portions of the payload support structure other than portion 102-5.

In some embodiments, a rotational device for providing a supplemental torque may be disposed on a portion 102-6 of the payload support structure that is opposite to the portion 102-5. Any number of rotational devices and their arrangement on the payload support structure of FIG. 10 may be contemplated. In some embodiments, the rotational device(s) may be disposed within the payload support structure instead of an exterior surface of the payload support structure. In some further embodiments, the rotational device(s) may be disposed directly on the payload device itself.

Figure 11:
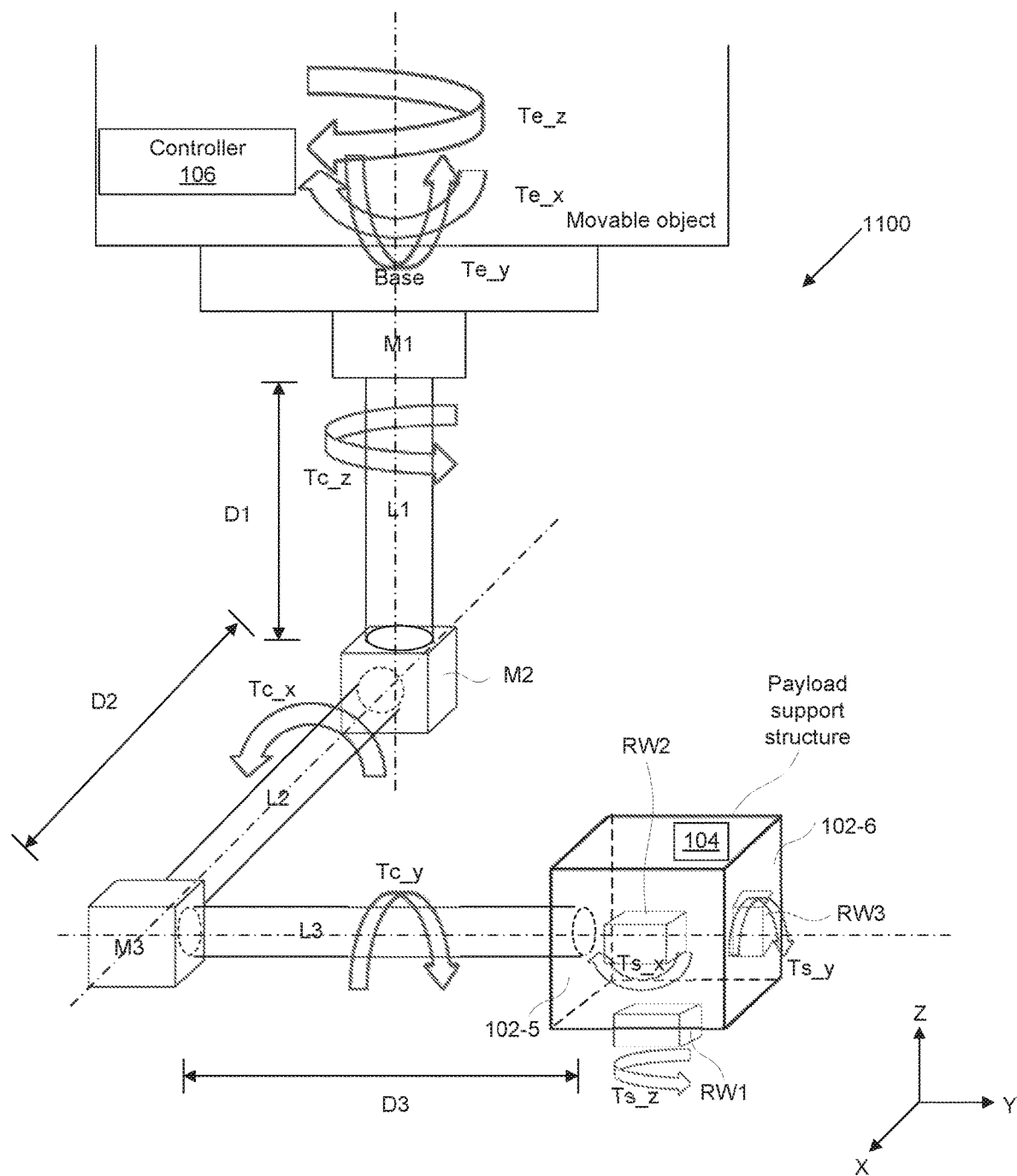
FIG. 11 illustrates a schematic view of a stabilizing platform in accordance with another embodiment.

FIG. 11 illustrates a schematic view of a stabilizing platform 1100 in accordance with another embodiment. The stabilizing platform may be configured to hold a payload device such as an imaging device or a non-imaging device. The stabilizing platform 1100 of FIG. 11 is similar to the stabilizing platform 1000 of FIG. 10 in that the stabilizing platform 1100 is also a three-axis stabilizing platform that provides three axes of rotation for a payload device mounted in (or on) the payload support structure. However, there are some differences between the stabilizing platform 1000 and the stabilizing platform 1100. In the embodiment of FIG. 11, the stabilizing platform 1100 may include a carrier component L3 coupled between the actuator M3 and the payload support structure. The payload support structure may be affixed or rigidly coupled to the carrier component L3, such that the carrier component L3 and the payload support structure move as a whole when actuated by the actuator M3. The stabilizing platform 1100 may further include a rotational device RW3 configured to generate a supplemental torque Ts_y about the Y axis. The supplemental torque Ts_y can be used to compensate for the transmission delay of the correction torque Tc_y from the actuator M3 to the payload support structure.

The rotational device RW3 may be disposed directly on the payload support structure. In the example of FIG. 11, the rotational device RW3 may be configured to provide the supplemental torque Ts_y to the payload support structure in a counter clockwise direction about the Y axis. The supplemental torque Ts_y may be applied in the same direction as the correction torque Tc_y, and in an opposite direction to the external torque Te_y, in order to counteract the external torque. The supplemental torque Ts_y can be used to maintain the position and stability of the payload support structure during the transmission delay of the correction torque Tc_y (i.e., before the correction torque Tc_y reaches the payload support structure).

Unlike the correction torque Tc_y which suffers from transmission delay through the various parts of the stabilizing platform, an effect of the supplemental torque Ts_y can be transmitted almost instantaneously in real-time to the payload support structure, since the rotational device RW3 is disposed directly on the payload support structure. The supplemental torque Ts_y can be used in complementary with the correction torque Tc_y. For example, the supplemental torque Ts_y can be used to counteract the external torque Te_y at the payload support structure, when the payload support structure first experiences the external torque Te_y, and before the correction torque Tc_y from the actuator M3 reaches the payload support structure. When the correction torque Tc_y from the actuator M3 reaches the payload support structure, the supplemental torque Ts_y can then be reduced or removed, by decreasing a current supplied to the rotational device RW3.

In some embodiments, the supplemental torque Ts_y may be used in conjunction with the correction torque Tc_y to mitigate the effects of the external torque Te_y, even after the correction torque Tc_y has reached the payload support structure. For example, the supplemental torque Ts_y can be used to increase the sensitivity of the stabilizing platform, by providing minute torque corrections to the payload support structure in real-time or near real-time, in response to changes in the external torque Te_y. These minute torque corrections from the rotational device RW3 can be used to supplement or augment the correction torque Tc_y provided by the actuator M3. These real-time (or near real-time) minute torque corrections are particularly useful when the external torque/disturbance is occurring at a high frequency, that necessitates increased sensitivity and response speed of the stabilizing platform. An example of such external torque/disturbance may be vibration/jitter of the movable object caused by moving parts in the movable object's propulsion unit.

As shown in FIG. 11, the carrier component L3 may be rotatably coupled to the carrier component L2 by the actuator M3. The actuator M3 may comprise a non-rotating portion coupled to the carrier component L2 and a rotating portion coupled to the carrier component L3. In some alternative embodiments, the non-rotating portion of the actuator M3 may be coupled to the carrier component L3 and the rotating portion may be coupled to the carrier component L2. When the actuator M3 is a motor, the non-rotating portion may correspond to a stator of the motor, and the rotating portion may correspond to a rotor of the motor.

The carrier component L3 may be configured to rotate about the Y axis extending along an axis of rotation of the rotating portion of the actuator M3. The axis of rotation may be parallel to the pitch axis of the movable object. In some cases, the axis of rotation may coincide with the pitch axis of the movable object. In the example of FIG. 11, the payload support structure is rigidly coupled to the carrier component L3. Since the payload support structure is rigidly coupled to the carrier component L3, the payload support structure (and the payload device disposed therein) can rotate about the Y axis when the carrier component L3 rotates. The actuator M3 may be configured to rotate the carrier component L3 about the Y axis in response to a signal transmitted from the controller assembly to the actuator M3. Accordingly, the actuator M3 may be configured to directly drive the carrier component L3 and the payload support structure to rotate about the Y axis relative to the base/movable object. Specifically, the actuator M3 can apply the correction torque Tc_y to drive the carrier component L3 and the payload support structure, so as to counteract the external torque Te_y.

In other embodiments, the axis of rotation of the carrier component L3 may be offset from a parallel imaginary line extending through a center of mass of the movable object. In some embodiments (not shown), the axis of rotation of the carrier component L3 may extend through a center of mass of the movable object. In some embodiments, the axis of rotation of the carrier component L3 may extend through a center of mass of the payload support structure. In other embodiments, the axis of rotation of the carrier component L3 may be offset from a parallel imaginary line extending through a center of mass of the payload support structure. Any arrangement of the movable object, base, carrier components L1/L2/L3, and the payload support structure relative to one another may be contemplated.

In the embodiment of FIG. 11, the rotational device RW3 may be disposed on a portion 102-6 of the payload support structure. The portion 102-6 may be opposite to the portion 102-5 of the payload support structure to which an end of the carrier component L3 is attached. However, the placement of the rotational device RW3 need not be limited to the configuration illustrated in FIG. 11. The rotational device RW3 may be disposed on any portion of the payload support structure other than portion 102-6. For example, in some embodiments, the rotational device RW3 may be disposed on the portion 102-5. In some further embodiments, the rotational device RW3 may be disposed on one or more portions of the payload support structure that are orthogonal or oblique to the portions 102-5 and 102-6. In some embodiments, a plurality of rotational devices may be disposed respectively on a plurality of portions of the payload support structure. Any number of rotational devices and their arrangement on the payload support structure may be contemplated. In some embodiments, the rotational device(s) may be disposed within the payload support structure instead of an exterior surface(s) of the payload support structure. In some further embodiments, the rotational device(s) may be disposed directly on the payload device itself.

The rotational device RW3 may be configured to provide the supplemental torque Ts_y to the payload support structure. The supplemental torque Ts_y may be directly and almost instantaneously provided by the rotational device RW3 to the payload support structure.

The rotational device RW3 may reduce the amount of torque transmission delay. For instance, the rotational device RW3 may reduce the amount of torque transmission delay by at least 1%, 3%, 5%, 10%, 15%, 20%, 25%, 30%, 35%, 40%, 45%, 50%, 60%, 70%, 80%, or 90%, compared to not having the rotational device RW3. The reduction of the amount of torque transmission delay may be on the order of at least 0.001 ms, 0.005 ms, 0.01 ms, 0.03 ms, 0.05 ms, 0.1 ms, 0.3 ms, 0.5 ms, 0.7 ms, 1 ms, 2 ms, 3 ms, 5 ms, 7 ms, 10 ms, 15 ms, 20 ms, 30 ms, 50 ms, or 100 ms, compared to not having the rotational device RW3. In some embodiments, the supplemental torque Ts_y may be provided by the rotational device RW3 to the payload support structure within less than or equal to about: 0.001 ms, 0.005 ms, 0.01 ms, 0.03 ms, 0.05 ms, 0.1 ms, 0.3 ms, 0.5 ms, 0.7 ms, 1 ms, 2 ms, 3 ms, 5 ms, 7 ms, 10 ms, 15 ms, 20 ms, 30 ms, 50 ms, or 100 ms.

In the example of FIG. 11, a rotating portion of the rotational device RW3 is not directly coupled to the payload support structure, such that the rotating portion of the rotational device RW3 can rotate freely relative to the payload support structure or the payload device. The free rotation of the rotating portion of the rotational device RW3 can generate the supplemental torque Ts_y, as described below.

In some embodiments, the rotational device RW3 may comprise a non-rotating portion directly coupled to the payload support structure and the rotating portion configured to rotate freely to provide the supplemental torque to the payload support structure. In some embodiments, the rotational device RW3 may be a rotational motor comprising a stator and a rotor. The stator may correspond to the non-rotating portion of the rotational device RW3, and the rotor may correspond to the rotating portion of the rotational device RW3. The stator of the rotational device RW3 may be directly coupled to the payload support structure. For example, the stator of the rotational device RW3 may be rigidly and directly attached to the payload support structure, so that the supplemental torque Ts_y can be directly transmitted from the stator to the payload support structure without transmitting through any intervening parts. In some other embodiments, the stator of the rotational device RW3 may be directly coupled to the payload device. For example, the stator of the rotational device RW3 may be rigidly and directly attached to the payload device, so that the supplemental torque Ts_y can be directly transmitted from the stator to the payload device without transmitting through any intervening parts. The rotor of the rotational device RW3 may be configured to rotate freely about the Y axis. The axis of rotation of the rotational device RW3's rotor may be parallel to the pitch axis of the movable object. In some embodiments, the axis of rotation of the rotational device RW3 may coincide with the pitch axis of the movable object. In the example of FIG. 11, the rotor is configured to rotate freely in the clockwise direction about the Y axis, which consequently generates the supplemental torque Ts_y in the counter clockwise direction about the Y axis, based on the laws of conservation of angular momentum. Specifically, when the rotor rotates freely about the Y axis, the supplemental torque Ts_y may be directly transmitted to the payload support structure through the stator.

In some embodiments, the axis of rotation of the rotational device RW3 may be parallel to the axis of rotation of the carrier component L3. In some alternative embodiments, the axis of rotation of the rotational device RW3 need not be parallel to the axis of rotation of the carrier component L3. In some embodiments, the axis of rotation of the rotational device RW3 may extend through a center of mass of the payload support structure. In other embodiments, the axis of rotation of the rotational device RW3 may be offset from a parallel imaginary line extending through a center of mass of the payload support structure.

As described above, the supplemental torque Ts_y may be generated by the rotation of the rotor of the rotational device RW3. The supplemental torque Ts_y may be generated by applying an electric current having a first direction (e.g., either a positive electric current or a negative electric current) to the rotational device RW3, thereby causing the rotor to accelerate. The rotor may be configured to accelerate to a predetermined rotational speed.

In some cases, the external disturbance may be continuous (for example, continuous vibration of the movable object and/or the payload support structure during flight, air turbulence, etc.). In those cases, the external disturbance would exert a continuous force/torque on the movable object and the payload support structure. When the external torque Te_y is continuously applied to the movable object and the payload support structure, a continuous current may be supplied to the rotational device RW3, so as to achieve a continuous reaction torque (supplemental torque) against the external torque, in order to maintain an attitude and/or orientation of the payload support structure. However, when the external disturbance is continuous, the rotor of the rotational device RW3 may continue to rotate faster and faster as a result of the continuous current supply. When the rotation speed of the rotor reaches a predetermined rotation speed, a counter electromotive potential generated by the rotation may be substantially the same as a voltage supplied to the rotational device RW3. This phenomenon is known as "rotating speed saturation," and may result in failure of the rotational device RW3 to provide sufficient supplemental torque to counteract the external torque.

To avoid "rotating speed saturation," an electric current having a second direction opposite to the first direction may be applied to the rotational device RW3 to cause the rotor to decelerate, when the rotor exceeds the predetermined rotation speed. For example, a positive electric current may be applied to the rotational device RW3 to cause the rotor to accelerate and to rotate in a clockwise direction. When the rotor exceeds the predetermined rotation speed, a negative electric current may be applied to the rotational device RW3 to cause the rotor to decelerate and to rotate in a counterclockwise direction, thereby causing the rotor to slow down.

In some embodiments, the rotational device RW3 may be a reaction wheel comprising an actuator. In the embodiment of FIG. 11, the reaction wheel may comprise an inertia wheel mounted onto the rotor and configured to rotate freely with the rotor. The rotor and the inertia wheel may be configured to rotate freely about the Y axis. The inertia wheel can be used to increase a length of time for which the supplemental torque Ts_y is provided to the payload support structure. The length of time for which the supplemental torque Ts_y is provided to the payload support structure may be a function of a mass of the inertia wheel. For example, the length of time for which the supplemental torque Ts_y is provided to the payload support structure may increase with the mass of the inertia wheel. The supplemental torque Ts_y may be generated by applying an electric current having a first direction to the rotational device RW3, thereby causing both the rotor and the inertia wheel to accelerate. The rotor and the inertia wheel may be configured to accelerate to a predetermined rotational speed.

The predetermined rotational speed may correspond to a speed at which "rotating speed saturation" occurs (i.e., when the counter electromotive potential generated by the rotation of the rotor and inertia wheel is substantially equal to the voltage supplied to the rotational device RW3). When the rotor and the inertia wheel exceed the predetermined rotation speed, an electric current having a second direction opposite to the first direction may be applied to the rotational device RW3 to cause the rotor and the inertia wheel to decelerate. For example, a positive electric current may be applied to the rotational device RW3 to cause the rotor and the inertia wheel to accelerate and rotate in a clockwise direction. When the rotor and the inertia wheel exceed the predetermined rotation speed, a negative electric current may be applied to the rotational device RW3 to cause the rotor and the inertia wheel to decelerate and to rotate in a counter-clockwise direction, thereby causing the rotor and the inertia wheel to slow down.

The rotational device RW3 may be configured to provide the supplemental torque Ts_y to the payload support structure to compensate for the transmission delay in the correction torque Tc_y. As previously mentioned, the correction torque Tc_y may be generated by the actuator M3. The correction torque Tc_y may be generated and transmitted to the payload support structure when the actuator M3 rotates the carrier component L3 about the Y axis. In some embodiments, the supplemental torque Ts_y may be generated at substantially a same time as the correction torque Tc_y. For example, when the external disturbance exerting the external torque Te_y is detected by one or more inertial sensors in the controller assembly, both the correction torque Tc_y and the supplemental torque Ts_y may be generated at substantially the same time to counteract the external torque Te_y. However, the payload support structure may receive the supplemental torque Ts_y before receiving the correction torque Tc_y. For example, the payload support structure may receive the correction torque Tc_y later than the supplemental torque Ts_y due to torque transmission delay from: (1) the actuator M3 to the carrier component L3, and (2) from the carrier component L3 to the payload support structure. In other words, the supplemental torque Ts_y can be transmitted to the payload support structure before the correction torque Tc_y, even though both the correction torque Tc_y and the supplemental torque Ts_y may be generated at substantially the same time.

The torque transmission delay may be a result of a torsional deformation of a rotating portion of the actuator M3 and a torsional deformation of the carrier component L3. In some embodiments, the torque transmission delay may be in the range from several milliseconds to several seconds.

Referring to FIG. 11, a length of the transmission delay may be a function of a distance D3 measured between the actuator M3 and the payload support structure. For example, the transmission delay may increase when the distance D3 increases. In some cases, the distance D3 from the actuator M3 to the payload support structure may be determined based at least in part on a length of the carrier component L3. For the rotational device RW3 to effectively compensate for the transmission delay, a distance between the rotational device RW3 and the payload support structure should be minimal, and substantially less than the distance D3. For example, in the embodiment of FIG. 11, the rotational device RW3 is disposed directly on the payload support structure to minimize its distance from the payload support structure. Accordingly, the supplemental torque Ts_y can be directly and almost instantaneously transmitted to the payload support structure without any significant transmission delay.

The payload support structure may be configured to experience an effect of the supplemental torque Ts_y before experiencing an effect of the correction torque Tc_y. In some instances, the supplemental torque Ts_y may be reduced or removed, when the correction torque Tc_y is transmitted and experienced by the payload support structure. In some embodiments, the supplemental torque Ts_y may be applied to the payload support structure for a time period corresponding to the transmission delay. When the correction torque Tc_y reaches the payload support structure at the end of the transmission delay, the supplemental torque Ts_y may be reduced or removed. The supplemental torque Ts_y may be reduced or removed by adjusting the electric current to the rotational device RW3, to cause the rotor and/or the inertia wheel of the rotational device RW3 to decelerate. The payload support structure may experience an effect of the supplemental torque Ts_y during the delay before experiencing an effect of the correction torque Tc_y. The supplemental torque Ts_y may be substantially equal to and applied in a same direction as the correction torque Tc_y. In some instances, the supplemental torque Ts_y may be less than the correction torque Tc_y. In some cases, the supplemental torque Ts_y may be substantially equal and opposite in direction to the external torque Te_y, so as to mitigate effects of the external disturbance on the payload support structure.

Figure 12:
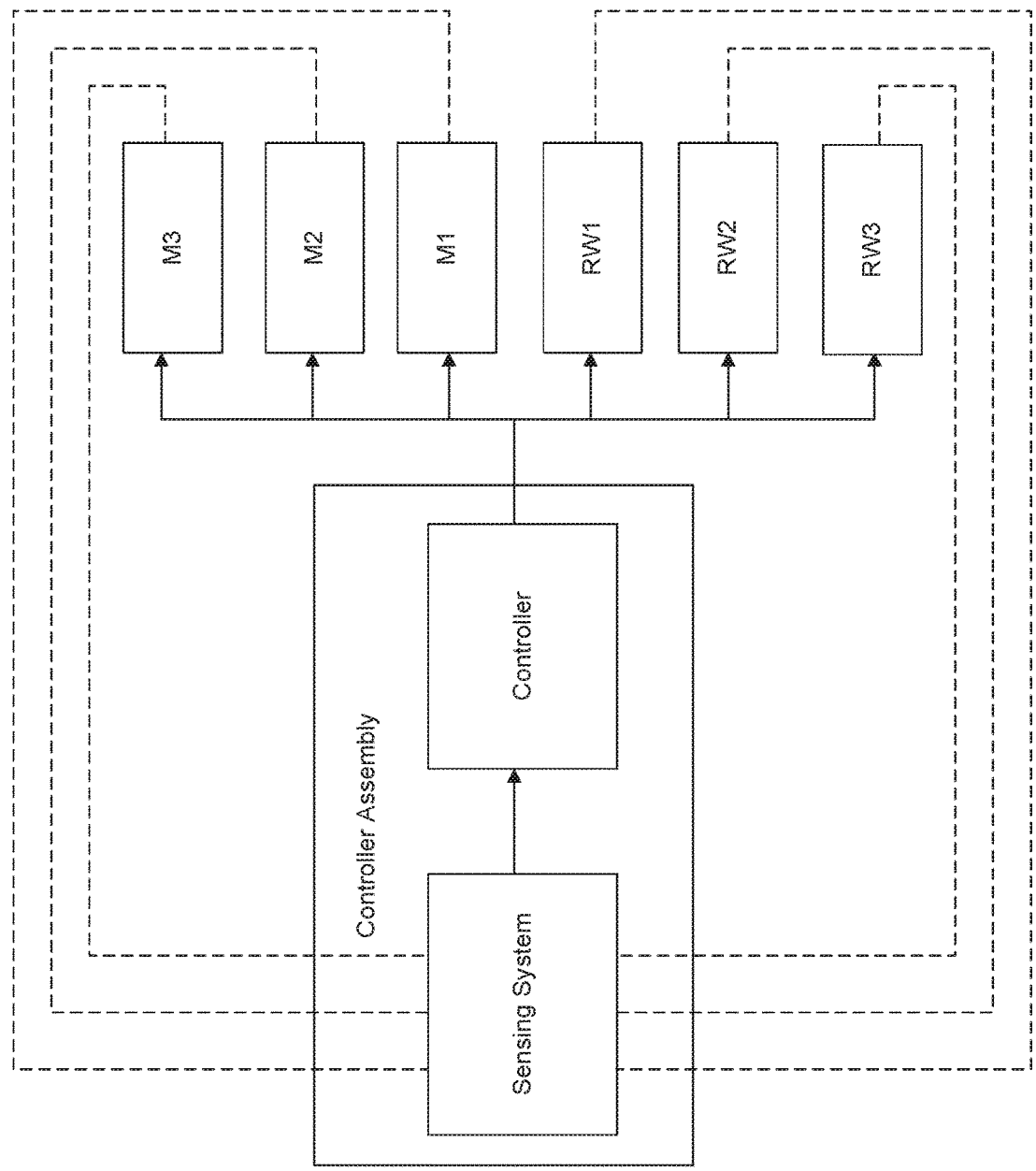
FIG. 12 illustrates a block diagram of a controller assembly and a motor assembly in the stabilizing platform of FIG. 11, in accordance with an embodiment.

In addition to the frame assembly and the motor assembly, the stabilizing platform 1100 may further comprise the controller assembly. Referring to FIGS. 11 and 12, the controller assembly may comprise the sensing system 104 and the controller 106. The controller assembly may be in communication with the sensing system, and with the actuation elements (e.g., the actuators M1/M2/M3, and the rotational devices RW1/RW2/RW3) of the motor assembly. The sensing system may be configured to measure or obtain state information associated with the payload device, the payload support structure, and/or with objects other than the payload support structure or the payload device, such as the frame assembly, the actuators M1/M2/M3, the rotational devices RW1/RW2/RW3, the movable object, and the like. The state information may include angular and/or linear velocity and/or acceleration of any of the above objects, positional information, and the like. Such state information may be relative or absolute. In some embodiments, the sensing system may be configured to measure or obtain state information associated with one or more of the above objects when the objects are subject to external disturbances (for example, weather and/or temperature changes, or impact by external matter such as debris or obstacles, etc.). In the example of FIG. 11, the sensing system may be provided on a portion of the payload support structure. It is noted that the sensing system can be provided anywhere on the stabilizing platform. In some other embodiments, the sensing system can be provided on the movable object itself. Any placement of the sensing system on the movable object and/or the stabilizing platform may be contemplated. In various embodiments, the sensing system may be coupled to the payload device, the payload support structure, the frame assembly, the motor assembly, the movable object, or the like.

The sensing system can include one or more sensors that may sense the spatial disposition, velocity, and/or acceleration of the sensed objects (e.g., with respect to up to three degrees of translation and up to three degrees of rotation). The sensing system may include an inertial measurement unit, motion sensors, proximity sensors, a compass, a global positioning system (GPS) transceiver, or other types of measurement components or sensors. For example, the sensing system may include one or more gyroscopes for detecting angular velocity and one or more accelerometer for detecting linear and/or angular acceleration of an object (e.g., payload device, payload support structure, frame assembly, and/or the movable object). Alternatively, the sensing system can be used to provide data regarding the environment surrounding the objects, such as weather conditions, proximity to potential obstacles, location of geographical features, location of manmade structures, and the like. In some embodiments, the sensing system may be configured to measure state information with respect to more than one rotational axis of the object. In some embodiments, the sensing system may obtain information that relate to at least two of the rotational axes. For example, the measurement member may obtain information related to both the pitch and roll axes of the object. In addition, the state information may pertain to all of the pitch, roll and yaw axes of the object.

In some embodiments, the controller may be configured to calculate posture information of the object based on the state information detected by the sensing system, and to provide one or more motor signals based on the posture information. Such posture information may include the pitch, roll, yaw axes of the object, orientation or inclination of the object with respect to the axes, velocity and/or acceleration, and the like. In some cases, the posture information may be calculated based on angular velocity information (e.g., as provided by the sensing system or from other sources). In other cases, the posture information may be calculated based on both angular velocity information and linear acceleration information. For example, the linear acceleration information may be used to modify and/or correct the angular velocity information.

Based on the calculated posture information, the controller may generate and transmit one or more motor signals to the actuation elements (e.g., the actuators M1/M2/M3, and/or the rotational devices RW1/RW2/RW3) of the stabilizing platform. The motor signals can cause forward rotation, reverse rotation of the actuation elements, and can be used to adjust the speed/torque of the rotations to counteract the external disturbances/torque. In response to the one or more motor signals, the actuation elements (e.g., the actuators M1/M2/M3, and/or the rotational devices RW1/RW2/RW3) can directly drive their respective portions of the frame assembly to rotate in response to the one or more motor signals. As a result, the payload device is allowed to rotate around at least one of the axis about which the external torque is exerted. Such rotation may be necessary for stabilizing the payload device and/or for maintaining a predetermined position or posture.

For example, in the embodiment of FIG. 11, when the payload support structure is subject to external torques Te_z, Te_x, and Te_y, the controller may simultaneously apply electric currents to the actuators M1/M2/M3 and the rotational devices RW1/RW2/RW3, to generate the correction torques Tc_z/Tc_x/Tc_y and the supplemental torques Ts_z/Ts_x/Ts_y, to counteract the external torques. The payload support structure may experience the effect of the supplemental torques Ts_z/Ts_x/Ts_y before the correction torques Tc_z/Tc_x/Tc_y, due to transmission delays in the correction torques. The sensing system may be configured to detect the effect of each of the supplemental torques Ts_z/Ts_x/Ts_y on the payload support structure.

The correction torque Tc_z may reach the payload support structure at the end of a first transmission delay. When the sensing system detects the effect of the correction torque Tc_z on the payload support structure, the controller may reduce or remove the supplemental torque Ts_z by decreasing the current supplied to the rotational device RW1. Similarly, the correction torque Tc_x may reach the payload support structure at the end of a second transmission delay. When the sensing system detects the effect of the correction torque Tc_x on the payload support structure, the controller may reduce or remove the supplemental torque Ts_x by decreasing the current supplied to the rotational device RW2. Likewise, the correction torque Tc_y may reach the payload support structure at the end of a third transmission delay. When the sensing system detects the effect of the correction torque Tc_y on the payload support structure, the controller may reduce or remove the supplemental torque Ts_y by decreasing the current supplied to the rotational device RW3. In the example of FIG. 11, the first transmission delay associated with the correction torque Tc_z may be longer than the second transmission delay associated with the correction torque Tc_x, and the second transmission delay may be longer than the third transmission delay associated with the correction torque Tc_y. The difference in transmission delays is because the correction torque Tc_z has to be transmitted from the actuator M1 serially through the carrier component L1, actuator M2, carrier component L2, actuator M3, and carrier component L3 before reaching the payload support structure. Conversely, the correction torque Tc_x has to be transmitted serially from the actuator M2 through the carrier component L2, actuator M3, and carrier component L3 before reaching the payload support structure. In contrast, the correction torque Tc_y only has to be transmitted from the actuator M3 to the carrier component L3 before reaching the payload support structure.

The controller may be configured to modulate the correction torques Tc_z/Tc_x/Tc_y and the supplemental torques Ts_z/Ts_x/Ts_y, from the actuators M1/M2/M3 and the rotational devices RW1/RW2/RW3, in real-time based on motion data from the sensing system, and the effects of the various torques on the payload support structure at different points in time. In particular, the sensitivity and performance of the stabilizing platform may be improved, by modulating the correction torques and the supplemental torques to achieve smooth torque control (to counteract the external torques).

As previously noted, conventional stabilizing systems may have significant torque transmission delays due to high inertia and/or low structural rigidity. As a result of the torque transmission delays, the phase margin of conventional closed-loop stabilizing systems may be reduced, thereby limiting the performance of the closed-loop control system. In contrast, the closed-loop control system in FIG. 12 has improved phase margin over conventional stabilizing systems, since the closed-loop control system in FIG. 12 includes a plurality of rotational devices configured to apply supplemental torques to the payload support structure to compensate for the torque transmission delays.

Figure 13:
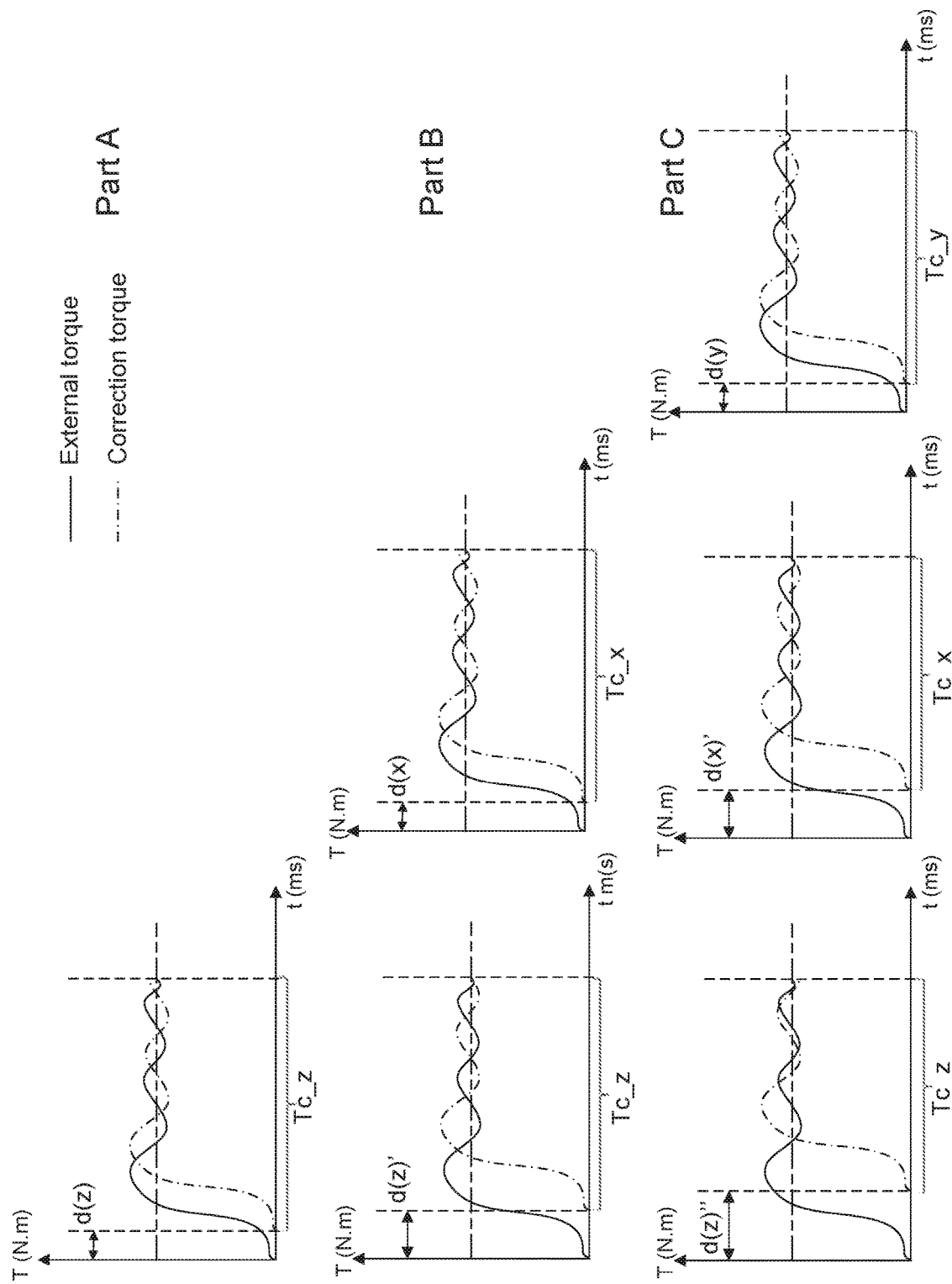
FIG. 13 illustrates the difference in torque transmission delays between the stabilizing platforms of FIG. 1, FIG. 6, and FIG. 11, in accordance with some embodiments.

FIG. 13 illustrates the difference in torque transmission delays between the stabilizing platform 100 of FIG. 1, the stabilizing platform 600 of FIG. 6, and the stabilizing platform 1100 of FIG. 11. Specifically, Part A of FIG. 13 illustrates the transmission delay d(z) of the correction torque Tc_z in the stabilizing platform 100 of FIG. 1; Part B of FIG. 13 illustrates the transmission delay d(z)' of the correction torque Tc_z and the transmission delay d(x) of the correction torque Tc_x in the stabilizing platform 600 of FIG. 6; and Part C of FIG. 13 illustrates the transmission delay d(z)" of the correction torque Tc_z, the transmission delay d(x)' of the correction torque Tc_x, and the transmission delay d(y) of the correction torque Tc_y in the stabilizing platform 1100 of FIG. 11.

Referring back to FIGS. 1, 6, and 11, it may be observed that the stabilizing platform 1100 has the highest inertia and lowest structural rigidity among the three stabilizing platforms, since the stabilizing platform 1100 comprises the largest number of serially connected carrier components and actuators. Comparing Parts A, B, and C of FIG. 11, it may be observed that the transmission delay d(z)" of the stabilizing platform 1100 is longer than the transmission delay d(z) of the stabilizing platform 100 and the transmission delay d(z)' of the stabilizing platform 600, since the correction torque Tc_z in the stabilizing platform 1100 has to travel through additional parts (e.g., the actuators M1/M2/M3 and carrier components L1/L2/L3) before reaching the payload support structure. Likewise, the transmission delay d(x)' of the stabilizing platform 1100 is longer than the transmission delay d(x) of the stabilizing platform 600, since the correction torque Tc_x in the stabilizing platform 1100 has to travel through additional parts (e.g., the actuators M2/M3 and carrier components L2/L3) before reaching the payload support structure. In addition, the transmission delay d(y) of the stabilizing platform 1100 is shorter than the transmission delays d(x)' and d(z)", since the correction torque Tc_y travels a shorter distance (from the actuator M3 to the carrier component L3) before reaching the payload support structure.

Figure 14:
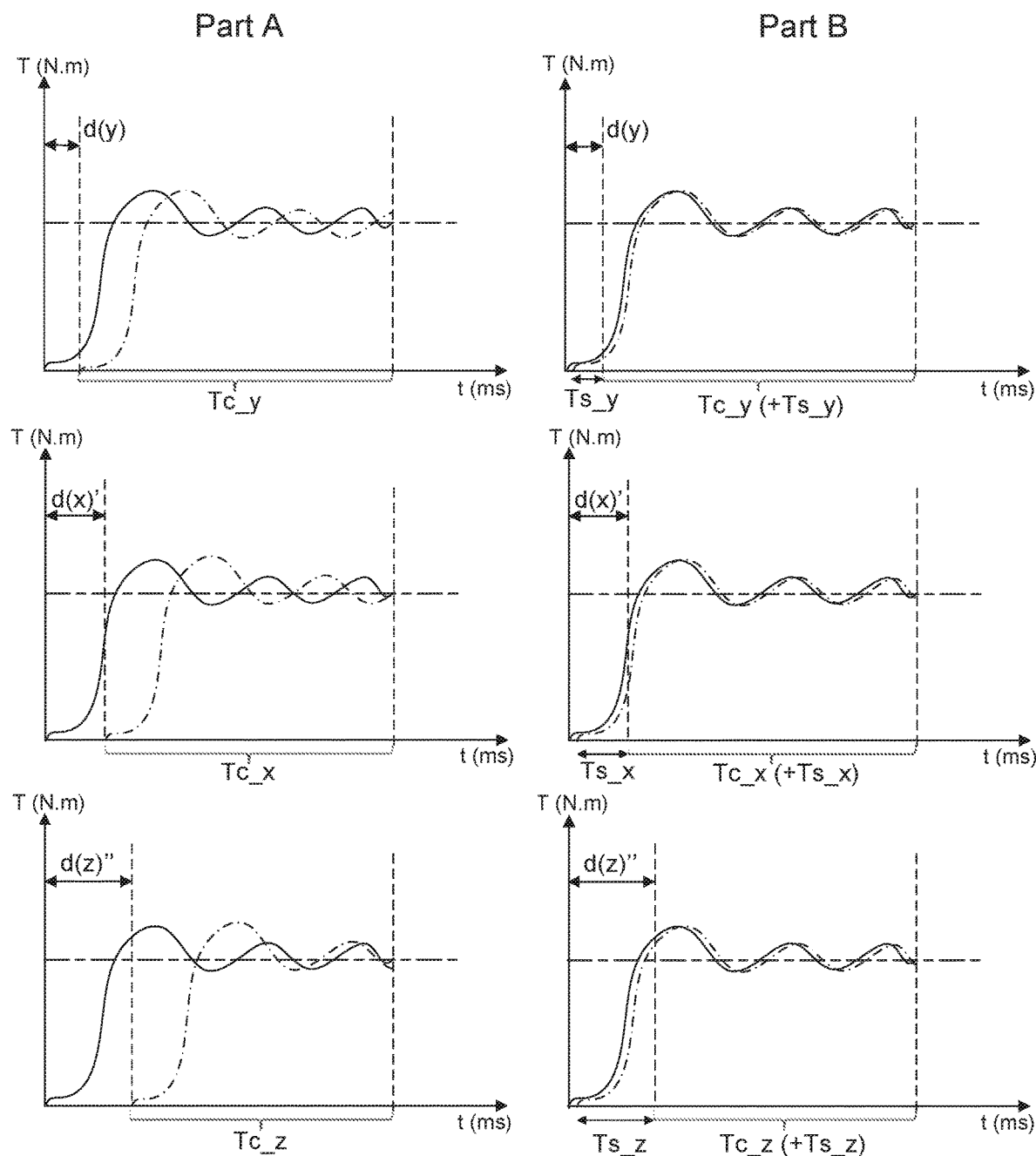
FIG. 14 illustrates the improvement in stabilizing performance of a stabilizing platform, in accordance with some embodiments.

FIG. 14 illustrates the improvement in stabilizing performance of an exemplary stabilizing platform (e.g., stabilizing platform 1100) when various rotational devices are used to provide different supplemental torques to compensate for torque transmission delays. Referring to the torque T (N·m) versus time t (milliseconds) plots in FIG. 14, the solid curved lines correspond to the external torques on the payload support structure, and the dotted lines correspond to the correction torques and/or the supplemental torques on the payload support structure, plotted as a function of time.

Part A of FIG. 14 illustrates the transmission delays associated with the correction torques Tc_x, Tc_x, and Tc_y of the stabilizing platform 1100 in FIG. 11, as previously described in FIG. 13.

Referring to part B of FIG. 14, the rotational devices RW1/RW2/RW3 may be disposed directly on the payload support structure to provide the supplemental torques Ts_z/Ts_x/Ts_y to compensate for the torque transmission delays from the actuators M1/M2/M3 to the payload support structure. The torque transmission delay from each actuator may vary as a function of its distance from the payload support structure. For example, the actuator that is located furthest away from the payload support structure (i.e., having the most number of intervening serially connected parts therebetween) may have the longest torque transmission delay, whereas the actuator that is located nearest to the payload support structure (i.e., having the least number of intervening serially connected parts therebetween) may have the shortest torque transmission delay. Accordingly, the actuators M1/M2/M3 and the rotational devices RW1/RW2/RW3 may be actuated in different orders and for different durations, based on the length of torque transmission delay for the corresponding axis (i.e., X-Y-Z axis), so as to counteract the respective external torques and to mitigate the transmission delay in the respective correction torques.

As shown in part B of FIG. 14, the performance (response speed) of the stabilizing platform may be improved through the use of the rotational devices. For example, when the sensing system detects the external torques Te_z/Te_x/Te_y, the controller may control the actuators M1/M2/M3 and the rotational devices RW1/RW2/RW3, to generate the correction torques Tc_z/Tc_x/Tc_y and the supplemental torques Ts_z/Ts_x/Ts_y, to counteract the external torques Te_z/Te_x/Te_y. In the embodiment of FIG. 14, the external torques Te_z/Te_x/Te_y may be assumed to occur at substantially a same time with substantially the same magnitudes, although this need not be a limitation of the disclosure. For example, as previously mentioned, the external torques Te_z/Te_x/Te_y may occur in any order, at different times, for different time durations, and with different force magnitudes. Since the rotational devices RW1/RW2/RW3 are disposed directly on the payload support structure, the supplemental torques provided by the rotational devices can be almost instantaneously transmitted to the payload support structure.

The supplemental torque Ts_y may be provided to the payload support structure for a duration of the delay d(y), the supplemental torque Ts_x may be provided to the payload support structure for a duration of the delay d(x)', and the supplemental torque Ts_z may be provided to the payload support structure for a duration of the delay d(z)". The delay d(y) is shorter than the delay d(x)' since the actuator M3 is disposed nearer with fewer connections to the payload support structure than the actuator M2. Similarly, the delay d(x)' is shorter than the delay d(z)" since the actuator M2 is disposed nearer with fewer connections to the payload support structure than the actuator M1.

At the end of the delay d(y), when the payload support structure starts to experience the effect of the correction torque Tc_y, the controller may then control the rotational device RW3 to reduce or remove the supplemental torque Ts_y, by reducing the current supplied to the rotational device RW3. In some embodiments, the controller may completely remove the supplemental torque Ts_y at the end of the delay d(y), and only apply the correction torque Tc_y to counteract the external torque Te_y starting from when the delay d(y) ends.

Similarly, at the end of the delay d(x)', when the payload support structure starts to experience the effect of the correction torque Tc_x, the controller may control the rotational device RW2 to reduce or remove the supplemental torque Ts_x, by reducing the current supplied to the rotational device RW2. In some embodiments, the controller may completely remove the supplemental torque Ts_x at the end of the delay d(x)', and only apply the correction torque Tc_x to counteract the external torque Te_x starting from when the delay d(x)' ends.

Likewise, at the end of the delay d(z)", when the payload support structure starts to experience the effect of the correction torque Tc_z, the controller may control the rotational device RW1 to reduce or remove the supplemental torque Ts_z, by reducing the current supplied to the rotational device RW1. In some embodiments, the controller may completely remove the supplemental torque Ts_z at the end of the delay d(z)", and only apply the correction torque Tc_z to counteract the external torque Te_z starting from when the delay d(z)" ends.

In some further embodiments, the supplemental torques Ts_z/Ts_x/Ts_y may be provided to the payload support structure for the entire duration of the delay d(z)" (which is the longest period amongst the delays d(z)", d(x)', and d(y)). At the end of the delay d(z)", when the payload support structure starts to experience the effects of the correction torques Tc_z/Tc_x/Tc_y, the controller may then control the rotational devices RW1/RW2/RW3 to reduce or remove the supplemental torques Ts_z/Ts_x/Ts_y, by reducing the currents supplied to the rotational devices RW1/RW2/RW3. In some embodiments, the controller may completely remove the supplemental torques Ts_z/Ts_x/Ts_y at the end of the delay d(z)", and only apply the correction torques Tc_z/Tc_x/Tc_y to counteract the external torques Te_z/Te_x/Te_y starting from when the delay d(z)" ends.

In some alternative embodiments, the controller may be configured to modulate the supplemental torques Ts_z/Ts_x/Ts_y and the correction torques Tc_z/Tc_x/Tc_y, to counteract the external torques Te_z/Te_x/Te_y starting from when the delay d(z)" ends. For example, the controller can control each of the rotational devices RW1/RW2/RW3 to generate different amounts of supplemental torque as and when needed, depending on posture information/feedback from the sensing system. The different amounts of supplemental torque can be transmitted almost instantaneously to the payload support structure, and can be used to compensate for any subsequent delays in the correction torques. In some cases, the different amounts of supplemental torque may be minute, with the correction torques providing the bulk of the torque for counteracting the external torques. The different amounts of supplemental torque can also be provided at a high frequency to the payload support structure almost instantaneously, and may be particularly useful when the external torque is fluctuating rapidly. As a result, the stabilizing platform 1100 has improved performance, since the response speed of the stabilizing platform is substantially unaffected by the transmission delays d(z)", d(x)', and d(y) in the correction torques.

In the embodiments of FIGS. 1 through 14, one or more rotational devices may be directly coupled to the payload support structure to provide one or more supplemental torques. In some alternative embodiments, the payload support structure may be omitted, and the rotational device(s) may be disposed directly on the payload device itself. In those embodiments, a rotational device may comprise a non-rotating portion directly coupled to the payload device and a rotating portion configured to rotate freely to provide the supplemental torque to the payload device. In some embodiments, the rotational device may be a rotational motor comprising a stator and a rotor. The stator may correspond to the non-rotating portion of the rotational device, and the rotor may correspond to the rotating portion of the rotational device. The stator of the rotational device may be directly coupled to the payload device. For example, the stator of the rotational device may be rigidly and directly attached to the payload device, so that the supplemental torque can be directly transmitted from the stator to the payload device without transmitting through any intervening parts.

In some embodiments, one or more rotational devices may be directly coupled to the payload support structure, and one or more rotational devices may be directly coupled to the payload device. Any number and/or arrangement of the rotational devices on the payload support structure or on the payload device may be contemplated.

Figure 15:
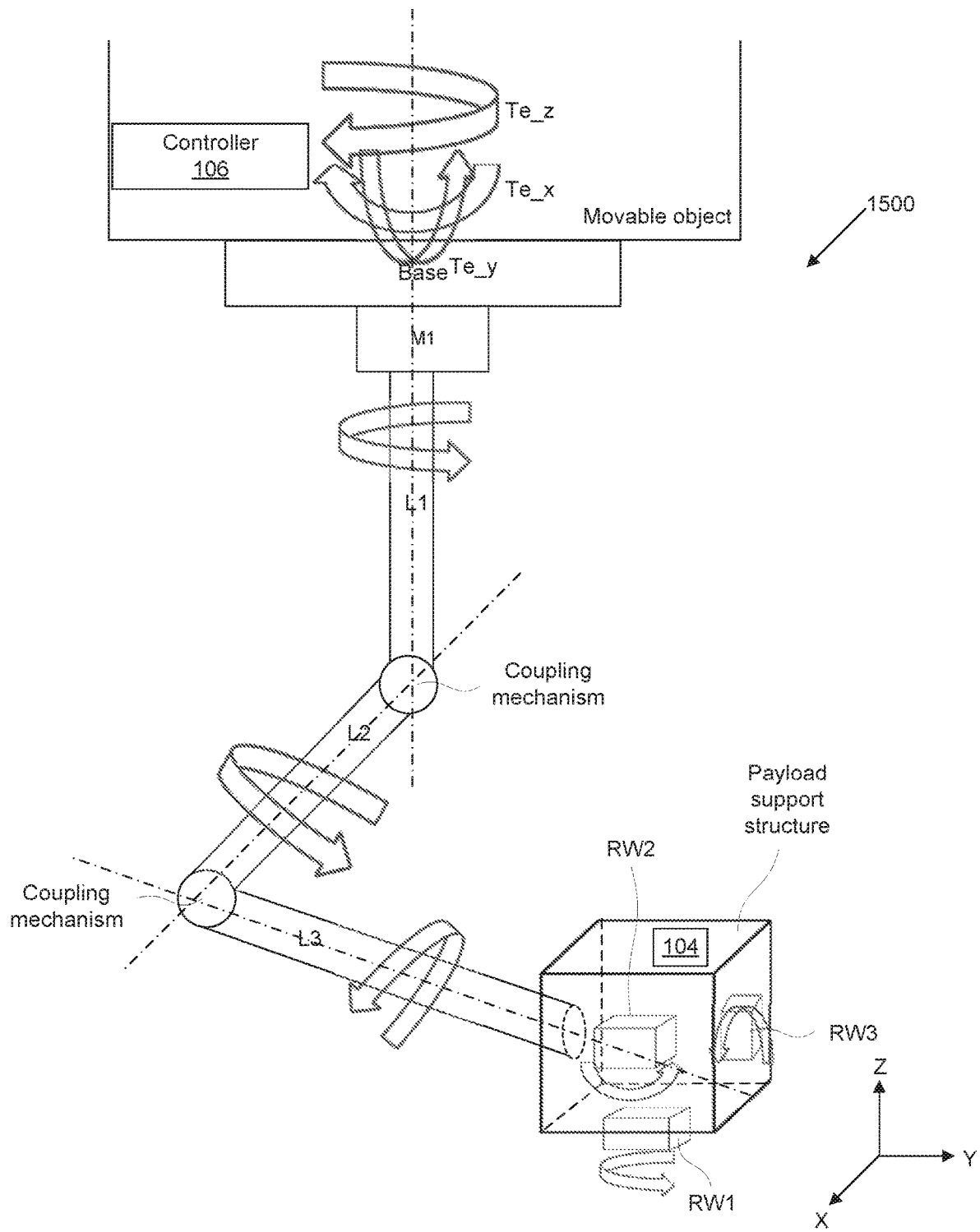
FIG. 15 illustrates a schematic view of a stabilizing platform in accordance with another embodiment.

FIG. 15 illustrates a schematic view of a stabilizing platform 1500 in accordance with another embodiment. The stabilizing platform may be configured to hold a payload device such as an imaging device or a non-imaging device. The stabilizing platform 1500 of FIG. 15 is similar to the stabilizing platform 1100 of FIG. 11 except for the following differences. In the example of FIG. 15 the carrier components L1, L2, and [L3?] may be connected serially using coupling mechanisms instead of using actuators M2 and M3. The coupling mechanisms may comprise rigid couplings or flexible couplings. A rigid coupling is a unit of hardware that is used to join two shafts within a motor or a mechanical system. A rigid coupling may be used to connect two separate systems, such as a motor and a generator, or to repair a connection within a single system. A rigid coupling may also be added between shafts to reduce shock and wear at the point where the shafts meet. An example of a rigid coupling may include a sleeve coupling. A flexible coupling is used to transmit torque from one shaft to another when the two shafts are slightly misaligned. A flexible coupling can accommodate varying degrees of misalignment (e.g., up to 3°) and some parallel misalignment. In addition, a flexible coupling can be used for vibration damping or noise reduction. A flexible coupling can be used to protect the driving and driven shaft members against harmful effects produce due to misalignment of the shafts, sudden shock loads, shaft expansion or vibrations etc. An example of a flexible coupling may include a gear coupling. As shown in FIG. 15, the carrier components L1, L2, and L3 may be disposed obliquely to one another. In some other embodiments, one or more of the carrier components L1, L2, and L3 may be disposed orthogonally to one another. In some alternative embodiments, one or more of the carrier components L1, L2, and L3 may be disposed parallel to one another.

The stabilizing platform 1500 of FIG. 15 may have low structural rigidity due to the serial connections between the carrier components and the use of the coupling mechanisms (in particular flexible couplings). As a result, there may be significant transmission delays as the correction torque Tc_z is serially transmitted from the actuator M1 through the various carrier components and coupling mechanisms. Accordingly, rotational devices RW1/RW2/RW3 may be disposed directly on the payload support structure in the embodiment of FIG. 15, to generate supplemental torques to compensate for the transmission delays in the correction torque Tc_z. In some particular embodiments, the payload support structure may be omitted, and the rotational devices RW1/RW2/RW3 may be disposed directly on the payload device. The actuator M1 and the rotational devices RW1/RW2/RW3 can be controlled using the controller assembly, in a configuration similar to that of FIG. 12.

Figure 16:
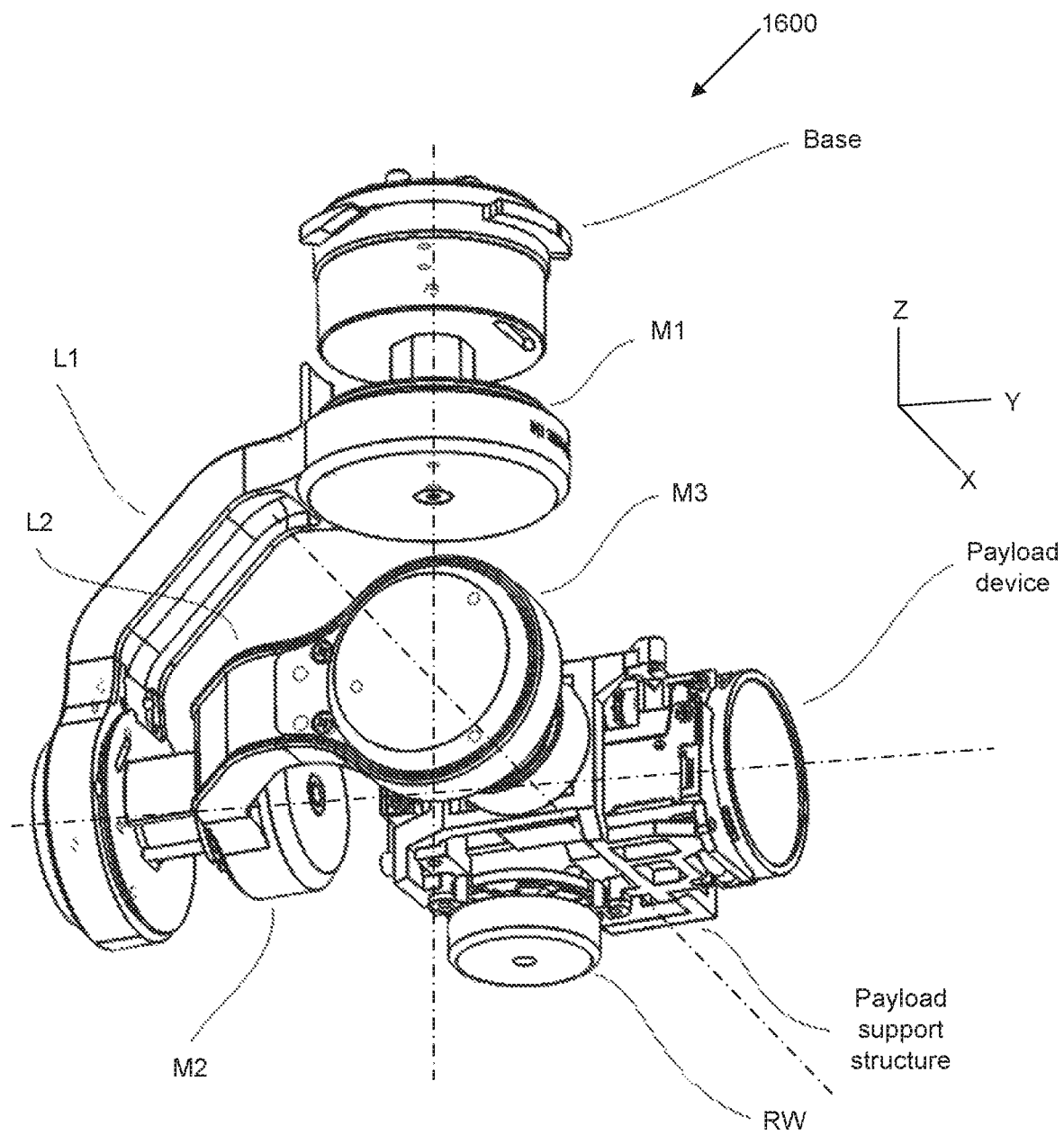
FIG. 16 illustrates a schematic view of a stabilizing platform in accordance with another embodiment.

FIG. 16 illustrates a schematic view of a stabilizing platform 1600 in accordance with another embodiment. The stabilizing platform may be configured to hold a payload device such as an imaging device or a non-imaging device.

Referring to FIG. 16, the stabilizing platform may comprise a base, an outer frame motor M1, an outer frame L1, an intermediate frame motor M2, an intermediate frame L2, an inner frame motor M3, a payload support structure, a rotational device RW disposed directly on the payload support structure, and payload device mounted in (or on) the payload support structure. The base may be mounted to a movable object. The movable object may be an unmanned aerial vehicle. In the example of FIG. 16, the payload device may be an imaging device such as a camera. The rotational device RW may be a motor that is used to achieve the effect of a reaction wheel. Specifically, the rotational device RW can provide a supplemental torque Ts_z to the payload support structure, to compensate for torque transmission delays. The torque transmission delays may include a transmission delay d(z) in the correction torque Tc_z from the outer frame motor M1 to the payload support structure, and a transmission delay d(y) in the correction torque Tc_y from the intermediate frame motor M2 to the payload support structure.

In the example of FIG. 16, the reaction wheel may be a motor that is disposed directly on a bottom portion of the payload support structure, and that can rotate freely about the Z axis. Since a stator of the reaction wheel may be directly mounted on the payload support structure, the supplementary torque can be directly transmitted to the payload support structure (and the payload device mounted thereon) once a sensing system of a controller assembly detects external disturbances/torques. The sensing system may be disposed on the payload device, on the payload support structure, anywhere in the stabilizing platform 1600, and/or on the movable object. The controller assembly may be located on the stabilizing platform and/or the movable object. In some embodiments, the controller assembly may be located remotely from the stabilizing platform and/or the movable object. Accordingly, the payload support structure can receive a fast torque response to mitigate the external torques, and to compensate for the transmission delays in the correction torque Tc_z and Tc_y.

In the embodiment of FIG. 16, the reaction wheel RW may be installed on a row axis of the camera. This is because viewers are typically sensitive to horizontal and vertical jitter in an image on the camera's capture screen, and may not be as sensitive to rotational jitter. Furthermore, since the payload support structure is directly coupled to and driven by the inner frame motor M3, the correction torque Tc_y generated by the inner frame motor M3 can thus be directly applied to the payload support structure with negligible transmission delay.

When the payload support structure is disturbed by a sudden external torque, a controller in the controller assembly can simultaneously apply electrical currents to motors M1, M2, M3, and RW. The correction torque Tc_x generated by the motor M5 and the supplemental torque Ts_z can be applied on the payload support structure almost instantaneously to resist the external disturbance. However, the correction torques Tc_z and Tc_y generated by motors M1 and M2 may not be immediately transmitted to and applied on the payload support structure, due to torque transmission delays arising from high inertia and/or low structural rigidity. When the sensing system detects that the correction torques Tc_z and Tc_y are transmitted to and applied on the payload support structure, the controller may decrease the current supplied to the motor RW accordingly. In some embodiments, the controller may be configured to modulate the correction torques Tc_z/Tc_y/Tc_x and the supplemental torque Ts_z in or near real-time to counteract the external disturbance/torques, so as to achieve smooth torque control of the stabilizing platform.

In the embodiment of FIG. 16, it may be observed that the frames (e.g., outer frame L1 and intermediate frame L2) are shaped differently (e.g., having a curved shape) that are different from those previously described in FIGS. 1 through 15. Thus, the frames in FIG. 16 and the carrier components in the previously-described embodiments will have different moments of inertia. Accordingly, the rotation of one frame about an axis in FIG. 16 may have a different effect on the torque transmission delay(s) compared than the rotation of a carrier component in the previously-described embodiments. For example, the torque transmission delay(s) in FIG. 16 may increase due to greater inertia when rotating the frames.

Although the embodiments of FIGS. 1 through 16 illustrate up to three carrier components connecting the payload support structure to the movable object, up to three actuators providing the correction torques, and up to three rotation devices disposed on the payload support structure providing the supplemental torques, it is to be appreciated that any number of carrier components, actuators, and rotational devices may be provided in various embodiments of the stabilizing platform. The carrier components may be disposed in orthogonal and/or non-orthogonal directions. The carrier components may also comprise multiple stages rotating about a same axis or about different axes. Any number of rotational devices may be disposed directly on different portions of the payload support structure to compensate for different torque transmission delays, and to improve the response time of the stabilizing platform.

Figure 21:
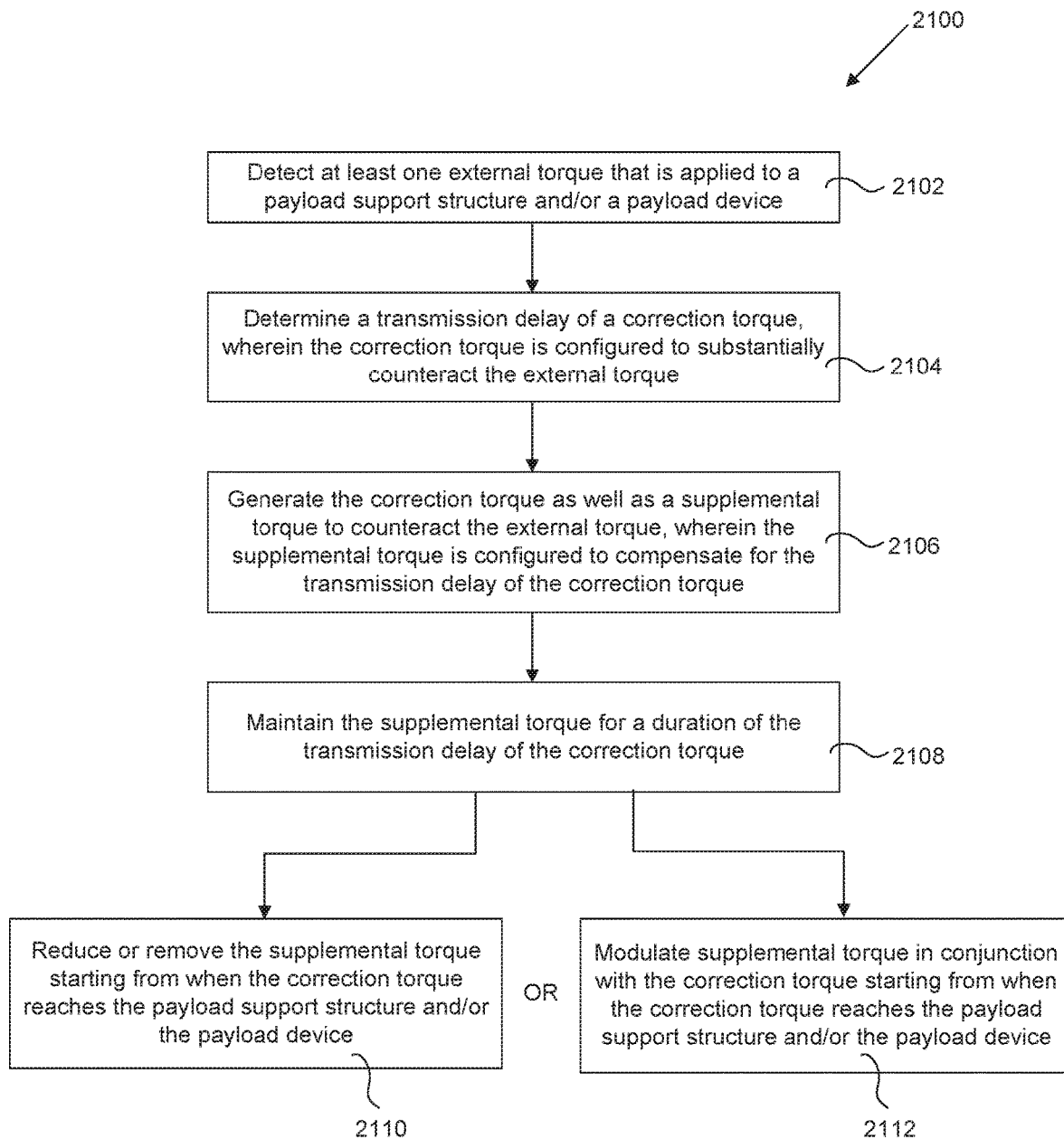
FIG. 21 is a flow chart illustrating an exemplary method of detecting an external torque, and generating a correction torque and a supplemental torque for counteracting the external torque and mitigating transmission delay in the correction torque, in accordance with some embodiments.

FIG. 21 is a flow chart 2100 illustrating an exemplary method of detecting an external torque, and generating a correction torque and a supplemental torque for counteracting the external torque, in accordance with some embodiments. The method may be performed using one or more of embodiments of the stabilizing platform described herein. It will be readily appreciated by one of ordinary skill in the art that the illustrated procedure can be altered to delete steps or further include additional steps.

Referring to FIG. 21, at least one external torque that is applied to the payload support structure and/or the payload may be detected (Step 2102). The external torque may be detected using the sensing system as previously described. Next, a transmission delay of a correction torque may be determined (Step 2104). The transmission delay may be determined using the controller described herein. The correction torque may be configured to substantially counteract the external torque. For example, the correction torque may be substantially equal in magnitude and in an opposite direction to the external torque. The transmission delay may be determined based on at least on the following parameters, and need not be determined in the order as shown: (1) a position of an actuator (configured to generate the correction torque) relative to the payload support structure and/or the payload; (2) a size (e.g., motor size) of the actuator; (3) moments of inertia of serially connected intervening parts between the actuator and the payload support structure and/or the payload; (4) types of joints or interconnections between the actuator and the payload support structure and/or the payload, and any intervening parts therebetween; (5) a dimension (e.g., width, length, thickness) of the intervening parts; and/or (6) structural rigidity of the intervening parts.

Next, the correction torque and a supplemental torque are generated (Step 2106). Both the correction torque and a supplemental torque may be configured to counteract the external torque. In addition, the supplemental torque may be configured to compensate for the transmission delay of the correction torque. The supplemental torque may be generated using a rotational device as described herein. The rotational device may be directly coupled or attached to the payload support structure and/or the payload, such that an effect of the supplemental torque can be transmitted almost instantaneously to the payload support structure and/or the payload. Accordingly, there is minimal torque transmission delay between the rotational device and the payload support structure and/or the payload. The correction torque and the supplemental torque may be generated via control signals that are sent from the controller respectively (substantially at the same time or at different times) to the actuator and the rotational device. The sensing system may be configured to detect the effects of the correction torque and the supplemental torque on the payload support structure and/or the payload, as previously described.

Next, the supplemental torque is maintained for the duration of the transmission delay of the correction torque (Step 2108), so as to compensate for the transmission delay. In other words, the supplemental torque can be used to counteract the external torque prior to the correction torque arriving at the payload support structure and/or the payload.

The supplemental torque may be maintained via the control signal that is sent from the controller to the rotational device.

In some embodiments, the supplemental torque may be reduced or removed, starting from when the correction torque reaches the payload support structure and/or the payload (Step 2110). The supplemental torque may be reduced or removed by the controller adjusting a current in the control signal to the rotational device.

In some alternative embodiments, the supplemental torque may be modulated in conjunction with the correction torque, starting from when the correction torque reaches the payload support structure and/or the payload (Step 2112). The supplemental torque and the correction torque may be modulated by the controller, for example by adjusting the currents in the control signals to the rotational device and the actuator. The modulation of the supplemental torque and the correction torque in real-time can improve the response speed of an exemplary stabilizing platform.

In various embodiments, the carrier comprising the stabilizing platform described herein may be mounted or otherwise coupled to a movable object such as a UAV. During operation, the UAV may be remotely controlled to approach a target object the images of which are to be acquired. Subsequently, the stabilizing platform may be controlled, for example, by the controller assembly and/or a remote control, to stabilize the payload device so as to improve the quality of images captured by the device. For example, the measurement member of the stabilizing platform may calculate posture information of the payload device and/or the UAV and provide motor signals to the motor assembly for directly drive the rotation of the frame assembly to 1) stabilize the payload device with respect to the target object; and/or 2) maintain the payload device at a predetermined posture with respect to the target object.

Figure 17:
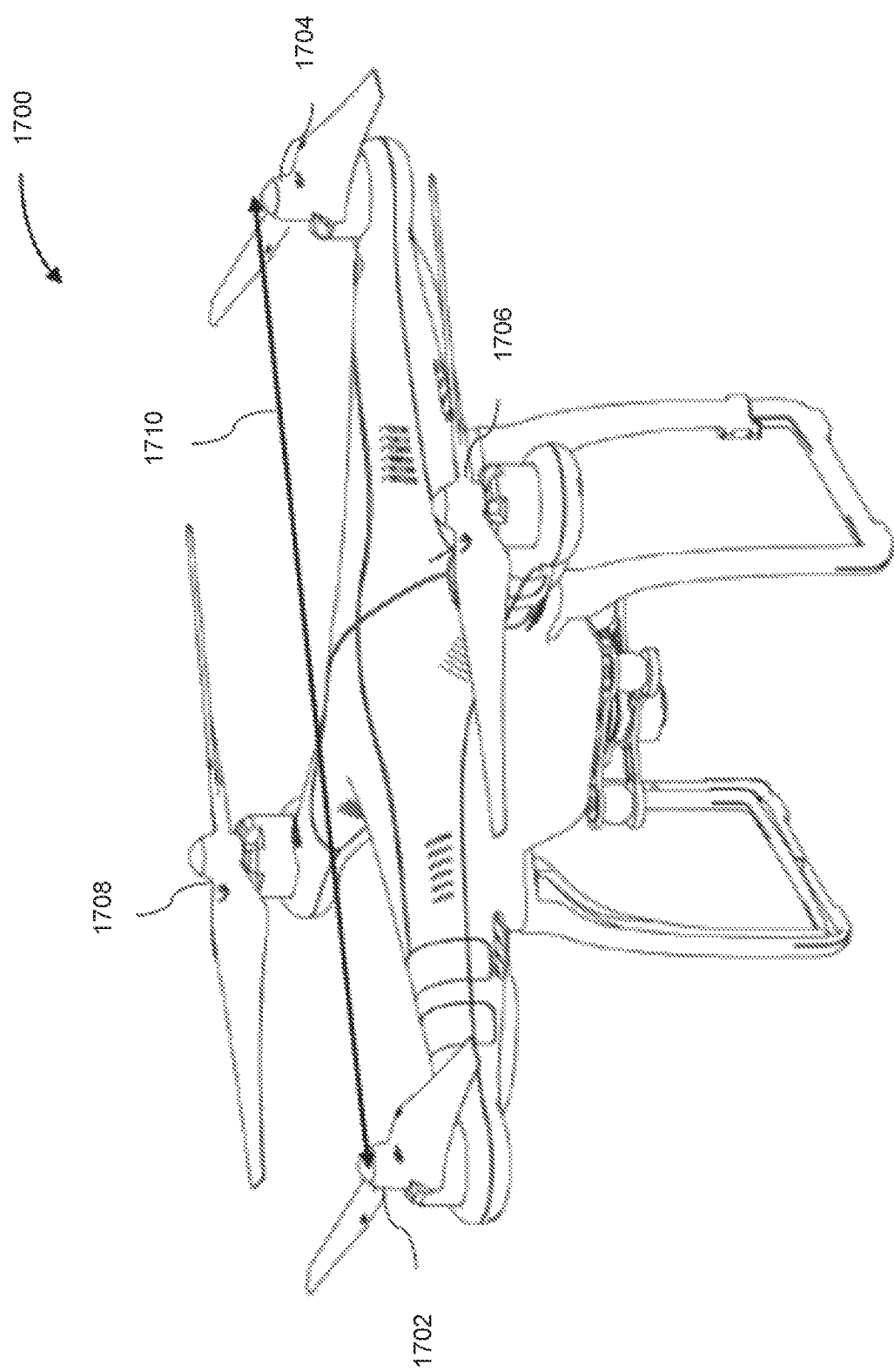
FIG. 17 illustrates an unmanned aerial vehicle (UAV) in accordance with some embodiments.

FIG. 17 illustrates an unmanned aerial vehicle (UAV) 1700, in accordance with embodiments of the present disclosure. The UAV may be an example of a movable object as described herein. The UAV 1700 can include a propulsion system having four rotors 1702, 1704, 1706, and 1708. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1710. For example, the length 1710 can be less than or equal to 2 m, or less than equal to 5 m. In some embodiments, the length 1710 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load may be a payload device such as an imaging device. The load can also include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device configured to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object. In some embodiments, the controller for controlling the actuation elements of the exemplary stabilizing platform may be provided in the terminal.

Figure 18:
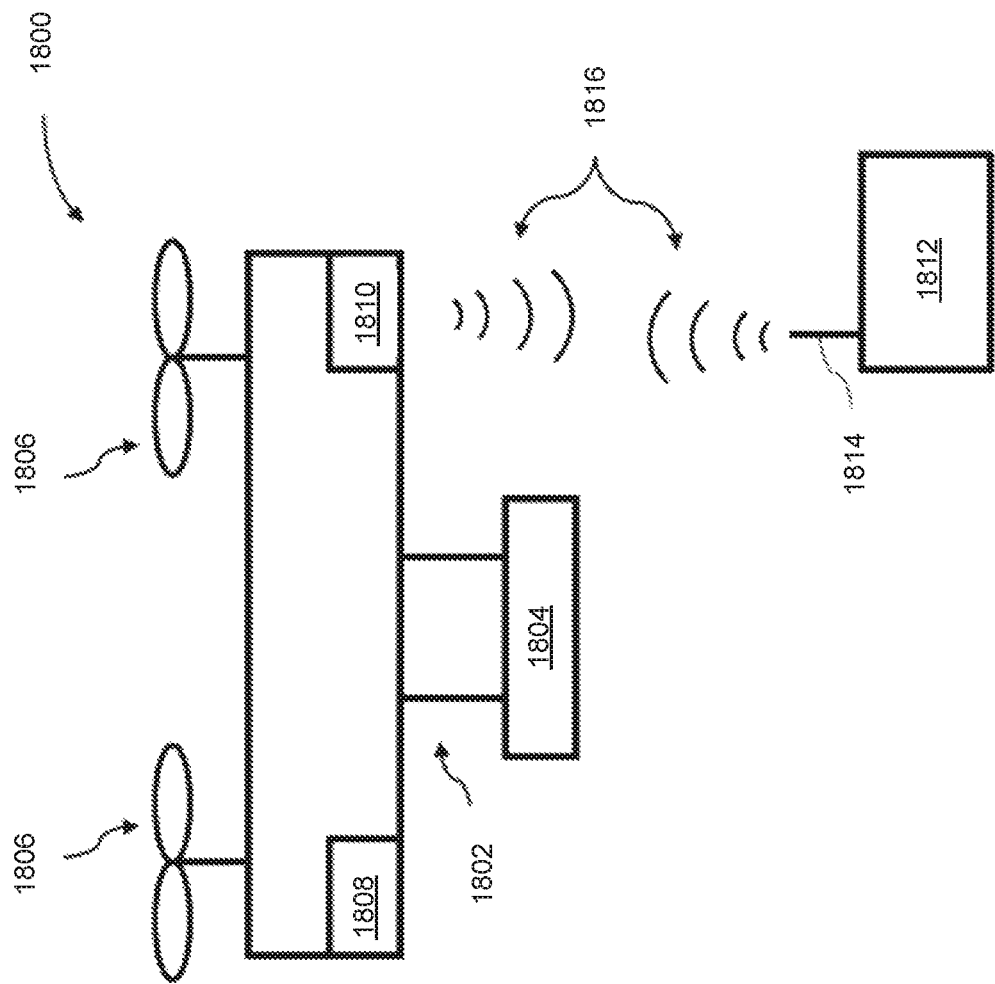
FIG. 18 illustrates a movable object including a stabilizing platform and a payload, in accordance with some embodiments.

FIG. 18 illustrates a movable object 1800 including a stabilizing platform 1802 and a payload 1804, in accordance with embodiments. The stabilizing platform 1802 may include any of the exemplary stabilizing platforms previously described with reference to FIGS. 1 through 16. Although the movable object 1800 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some particular instances, the payload 1804 may be provided on the movable object 1800 without requiring the stabilizing platform 1802. The movable object 1800 may include propulsion mechanisms 1806, a sensing system 1808, and a communication system 1810.

The propulsion mechanisms 1806 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1806 can be mounted on the movable object 1800 using any suitable means, such as a support element (e.g., a drive shaft) as described elsewhere herein. The propulsion mechanisms 1806 can be mounted on any suitable portion of the movable object 1800, such on the top, bottom, front, back, sides, or suitable combinations thereof.

In some embodiments, the propulsion mechanisms 1806 can enable the movable object 1800 to take off vertically from a surface or land vertically on a surface without requiring any horizontal movement of the movable object 1800 (e.g., without traveling down a runway). Optionally, the propulsion mechanisms 1806 can be operable to permit the movable object 1800 to hover in the air at a specified position and/or orientation. One or more of the propulsion mechanisms 1800 may be controlled independently of the other propulsion mechanisms. Alternatively, the propulsion mechanisms 1800 can be configured to be controlled simultaneously. For example, the movable object 1800 can have multiple horizontally oriented rotors that can provide lift and/or thrust to the movable object. The multiple horizontally oriented rotors can be actuated to provide vertical takeoff, vertical landing, and hovering capabilities to the movable object 1800. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1800 (e.g., with respect to up to three degrees of translation and up to three degrees of rotation).

The sensing system 1808 can include one or more sensors that may sense the spatial disposition, velocity, and/or acceleration of the movable object 1800 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1808 can be used to control the spatial disposition, velocity, and/or orientation of the movable object 1800 (e.g., using a suitable processing unit and/or control module, as described below). Alternatively, the sensing system 1808 can be used to provide data regarding the environment surrounding the movable object, such as weather conditions, proximity to potential obstacles, location of geographical features, location of manmade structures, and the like. The sensing system 1808 can also be used to sense the spatial disposition, velocity, and/or acceleration of the payload 1804 (e.g., with respect to up to three degrees of translation and up to three degrees of rotation).

The communication system 1810 enables communication with terminal 1812 having a communication system 1814 via wireless signals 1816. The communication systems 1810, 1814 may include any number of transmitters, receivers, and/or transceivers suitable for wireless communication. The communication may be one-way communication, such that data can be transmitted in only one direction. For example, one-way communication may involve only the movable object 1800 transmitting data to the terminal 1812, or vice-versa. The data may be transmitted from one or more transmitters of the communication system 1810 to one or more receivers of the communication system 1812, or vice-versa. Alternatively, the communication may be two-way communication, such that data can be transmitted in both directions between the movable object 1800 and the terminal 112. The two-way communication can involve transmitting data from one or more transmitters of the communication system 1810 to one or more receivers of the communication system 1814, and vice-versa.

In some embodiments, the terminal 1812 can provide control data to one or more of the movable object 1800, carrier 1802, and payload 1804 and receive information from one or more of the movable object 1800, carrier 1802, and payload 1804 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1806), or a movement of the payload with respect to the movable object (e.g., via control of the carrier 1802). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1808 or of the payload 1804). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1812 can be configured to control a state of one or more of the movable object 1800, carrier 1802, or payload 1804. Alternatively or in combination, the carrier 1802 and payload 1804 can also each include a communication module configured to communicate with terminal 1812, such that the terminal can communicate with and control each of the movable object 1800, carrier 1802, and payload 1804 independently.

In some embodiments, the movable object 1800 can be configured to communicate with another remote device in addition to the terminal 1812, or instead of the terminal 1812. The terminal 1812 may also be configured to communicate with another remote device as well as the movable object 1800. For example, the movable object 1800 and/or terminal 1812 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1800, receive data from the movable object 1800, transmit data to the terminal 1812, and/or receive data from the terminal 1812. Optionally, the remote device can be connected to the Internet or other telecommunications network, such that data received from the movable object 1800 and/or terminal 1812 can be uploaded to a website or server.

Figure 19:
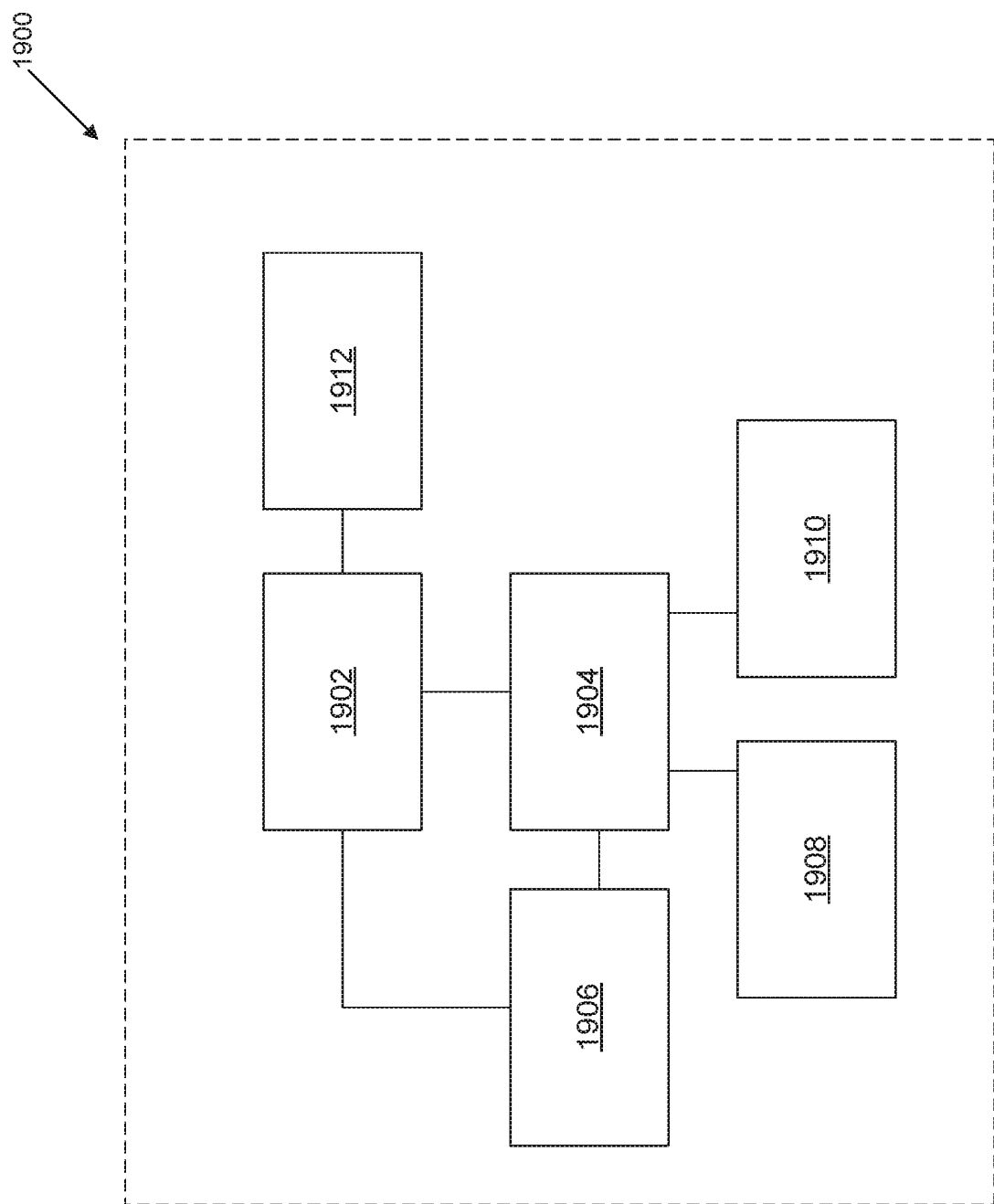
FIG. 19 is a block diagram of a system for controlling a movable object, in accordance with some embodiments.

FIG. 19 is a schematic illustration by way of block diagram of a system 1900 for controlling a movable object, in accordance with embodiments. The system 1900 can be used in combination with any suitable embodiment of the systems, devices, and methods disclosed herein. The system 1900 can include a sensing module 1902, processing unit 1904, non-transitory computer readable medium 1906, control module 1908, and communication module 1910.

The sensing module 1902 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1902 can be operatively coupled to a processing unit 1904 having a plurality of processors. In some embodiments, the sensing module can be operatively coupled to a transmission module 1912 (e.g., a Wi-Fi image transmission module) configured to directly transmit sensing data to a suitable external device or system. For example, the transmission module 1912 can be used to transmit images captured by a camera of the sensing module 1902 to a remote terminal.

The processing unit 1904 can have one or more processors, such as a programmable processor (e.g., a central processing unit (CPU)). The processing unit 1904 can be operatively coupled to a non-transitory computer readable medium 1906. The non-transitory computer readable medium 1906 can store logic, code, and/or program instructions executable by the processing unit 1904 for performing one or more steps. The non-transitory computer readable medium can include one or more memory units (e.g., removable media or external storage such as an SD card or random access memory (RAM)). In some embodiments, data from the sensing module 1902 can be directly conveyed to and stored within the memory units of the non-transitory computer readable medium 1906. The memory units of the non-transitory computer readable medium 1906 can store logic, code and/or program instructions executable by the processing unit 1904 to perform any suitable embodiment of the methods described herein. For example, the processing unit 1904 can be configured to execute instructions causing one or more processors of the processing unit 1904 to analyze sensing data produced by the sensing module. The memory units can store sensing data from the sensing module to be processed by the processing unit 1904. In some embodiments, the memory units of the non-transitory computer readable medium 1906 can be used to store the processing results produced by the processing unit 1904.

In some embodiments, the processing unit 1904 can be operatively coupled to a control module 1908 configured to control a state of the movable object. For example, the control module 1908 can be configured to control the propulsion mechanisms of the movable object to adjust the spatial disposition, velocity, and/or acceleration of the movable object with respect to six degrees of freedom. Alternatively or in combination, the control module 1908 can control one or more of a state of a carrier, payload, or sensing module.

The processing unit 1904 can be operatively coupled to a communication module 1910 configured to transmit and/or receive data from one or more external devices (e.g., a terminal, display device, or other remote controller). Any suitable means of communication can be used, such as wired communication or wireless communication. For example, the communication module 1910 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1910 can transmit and/or receive one or more of sensing data from the sensing module 1902, processing results produced by the processing unit 1904, predetermined control data, user commands from a terminal or remote controller, and the like.

The components of the system 1900 can be arranged in any suitable configuration. For example, one or more of the components of the system 1900 can be located on the movable object, carrier, payload, terminal, sensing system, or an additional external device in communication with one or more of the above. Additionally, although FIG. 19 depicts a single processing unit 1904 and a single non-transitory computer readable medium 1906, one of skill in the art would appreciate that this is not intended to be limiting, and that the system 1900 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1900 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A carrier for controlling torque delivery to a payload, comprising:
   a carrier component configured to rotate about a carrier axis;
   a payload support structure coupled to the carrier component and configured to support the payload;
   an actuator configured to generate a correction torque through the carrier component in response to and to correct for an external torque exerted onto the payload support structure; and
   a rotational device coupled to the payload support structure, comprising:
      a non-rotating portion directly coupled to the payload support structure; and
      a rotating portion configured to rotate freely to provide a supplemental torque to the payload support structure to compensate the correction torque for a torque transmission delay from the carrier component to the payload support structure when the carrier component rotates about the carrier axis, wherein the supplemental torque counteracts the external torque at the payload support structure before the correction torque reaches the payload support structure, and the supplemental torque is applied in a same direction as the correction torque.

2. The carrier of claim 1, wherein the rotational device is a reaction wheel comprising an actuator.

3. The carrier of claim 1, wherein a distance from the actuator to the payload support structure is substantially greater than a distance from the rotational device to the payload support structure.

4. The carrier of claim 3, wherein the distance from the actuator to the payload support structure is determined based at least on a length of the carrier component.

5. The carrier of claim 1, wherein the torque transmission delay is a result of a torsional deformation of a rotating portion of the actuator and a torsional deformation of the carrier component.

6. The carrier of claim 1, wherein the supplemental torque is reduced or removed when the correction torque is transmitted to the payload support structure.

7. The carrier of claim 6, wherein the supplemental torque is reduced or removed by applying an electric current to the rotational device that causes a rotor and/or an inertia wheel of the rotational device to decelerate.

8. The carrier of claim 1, wherein the external torque is generated and transmitted to the payload support structure as a result of external disturbances exerted on the payload support structure.

9. The carrier of claim 1, wherein the rotational device is a rotational motor including a stator and a rotor, the stator being rigidly and directly attached to the payload support structure to transmit the supplemental torque directly to the payload support structure without transmitting through any intervening parts, and the rotor being configured to rotate freely about an axis parallel to a yaw axis of an unmanned aerial vehicle by which the payload is being carried.

* * * * *